(12) United States Patent
Silverstein et al.

(10) Patent No.: US 8,751,319 B2
(45) Date of Patent: Jun. 10, 2014

(54) GIFTING SYSTEM AND METHOD

(75) Inventors: Todd Silverstein, Washington, DC (US); Aaron Whiteman, Stockholm (SE)

(73) Assignee: Cabinall Group L.L.C., Dover, DE (US)

(*) Notice: Subject to any disclaimer, the term of this patent is extended or adjusted under 35 U.S.C. 154(b) by 314 days.

(21) Appl. No.: 12/271,518

(22) Filed: Nov. 14, 2008

(65) Prior Publication Data

US 2009/0070230 A1   Mar. 12, 2009

Related U.S. Application Data

(63) Continuation of application No. 10/701,506, filed on Nov. 5, 2003, now Pat. No. 7,496,527.

(60) Provisional application No. 60/423,846, filed on Nov. 5, 2002.

(51) Int. Cl.
*G06Q 30/00* (2012.01)

(52) U.S. Cl.
USPC ......................................................... 705/26.1

(58) Field of Classification Search
USPC .................................. 705/26, 27, 26.1
See application file for complete search history.

(56) References Cited

U.S. PATENT DOCUMENTS

| | | | |
|---|---|---|---|
| 5,960,411 A | 9/1999 | Hartman | |
| 6,175,823 B1 | 1/2001 | Van Dusen | |
| 6,587,835 B1 | 7/2003 | Treyz | |
| 6,633,849 B1 | 10/2003 | Dodd | |
| 7,496,527 B2 | 2/2009 | Silverstein | |
| 2001/0049636 A1 | 12/2001 | Hudda et al. | |
| 2002/0005774 A1* | 1/2002 | Rudolph et al. | 340/5.61 |
| 2002/0059111 A1 | 5/2002 | Ding et al. | |

(Continued)

FOREIGN PATENT DOCUMENTS

WO   2004042536   5/2004

OTHER PUBLICATIONS http://www.bestbuy.com/site/olspage.js?j=1&id=cat2097&type=page&categoryId=cat10, "Bestbuy.com Help," Feb. 1, 2005 (2 pages).

(Continued)

*Primary Examiner* — Mila Airapetian
(74) *Attorney, Agent, or Firm* — Stolowitz Ford Cowger LLP

(57) ABSTRACT

A scheme for enabling the remote purchasing of products or services based on a recipient's location. In one embodiment, a computer-implemented method for enabling a purchaser to purchase a product or service for a specified recipient different from the purchaser includes: (a) receiving location-based information obtained from a device or token associated with the recipient; (b) generating a list of one or more possible venues based on the location-based information; (c) presenting to the purchaser, via a first communications device, the list of one or more possible venues; (d) receiving from the purchaser a selection of a set of one or more venues from the list of one or more possible venues; (e) receiving, via the first communications device, an instruction from the purchaser to purchase at least one selected product or service for the recipient, the at least one selected product or service to be provided to the recipient in person at any venue in the set of one or more venues; and (f) providing to the recipient, via a second communications device, a notification corresponding to the instruction.

18 Claims, 52 Drawing Sheets

(56) References Cited

U.S. PATENT DOCUMENTS

| | | | |
|---|---|---|---|
| 2002/0143664 | A1 | 10/2002 | Webb |
| 2002/0178078 | A1 | 11/2002 | Otoole |
| 2002/0181009 | A1* | 12/2002 | Fredlund et al. ............. 358/1.15 |
| 2003/0018553 | A1* | 1/2003 | Lindquist ........................ 705/35 |
| 2003/0088497 | A1 | 5/2003 | Belgrano |
| 2004/0114766 | A1* | 6/2004 | Hileman et al. .............. 380/278 |
| 2004/0219936 | A1 | 11/2004 | Kontiainen |
| 2005/0022119 | A1 | 1/2005 | Kraemer |
| 2007/0157021 | A1 | 7/2007 | Whitfield |

OTHER PUBLICATIONS http:://www.engadget.com/entry/4610516738448251/, "Calculating your tab the RFID way," May 13, 2004 (2 pages).

http://www.12snap.com/uk/reception/content_reception.php, "12 snap UK," Feb. 12, 2004 (1 page).

http:/www.opentable.com/info/restindex_network.asp, "Restaurant Marketing and Reservation System," May 13, 2004 (1 page).

http://www.starbucks.com/default.asp?ci=1012 &cookie%255test=1&cookie%5Ftest=1; "Starbucks Homepage:" May 12, 2004 (1 page).

Stolowitz Ford Cowger LLP Listing of Related Cases, May 12, 2011.

Gifts, certificates, Incentives; Incentive, New York Jul. 2001, vol. 175, Iss. 7, p. 41, 15 pages; http://proquest.umi.com/pqdweb?did=75939061&sid=6&Fmt=4&clientId=19649RQT=309 &Vname=PQD.

www.buymeabeer.com/ and related pages; Sep. 14, 2004 (4 pages).

http://help.sap.com/saphelp_crm40/helpdata/en/d9/72f73e0f303d67e10000000a114084/frameset.htm; "Event-Triggered Campaigns;" Feb. 1, 2005 (2 pages).

http://www.smallplanet.net/; "Crowd Surfer from Small Planet;" Feb. 1, 2005 (1 page).

http://www.meetup.com/locale/us/ny/nyc; "New York City Meetups;" May 12, 2004 (3 pages).

http://seattle.bizjournals.com/seattle/stories/2002/07/29/daily31.html; "Puget Sound Business Journal;" May 12, 2004 (2 pages).

http://www.starbucks.com/default.asp?ci=1012 &cookie%255test=1&cookie%5Ftes- t=1; "Starbucks Homepage:" May 12, 2004 (1 page).

http:www.auctionbytes.com/cab/abn/y02/m12/i03/s01, "Amazon Shoppers Can Pick Up Items at Borders Store,"; May 13, 2004 (3 pages).

http://www.bestbuy.com/site/olspage.js?j=1&id=cat2097 &type=page&categoryId=cat10, "Bestbuy.com Help," Feb. 1, 2005 (2 pages).

http://www.theregister.co.uk/2004/04/16/bluetooth_tagging/print.html, "Danes tag kids with Bluetooth," May 13, 2004 (1 page).

http://www.bluetags.com/, "Welcome to Bluelon," Feb. 1, 2005 (1 page).

http://www.engadget.com/entry/4610516738448251/, "Calculating your tab the RFID way," May 13, 2004 (2 pages).

http://www.engadget.com/entry/6167529206452629, "Putting your finger on it . . . ," May 13, 2004 (2 pages).

http://www.12snap.com/uk/reception/content_reception.php, "12 snap UK,"0 Feb. 1, 2005 (1 page).

http://www.exit41.com/, "Exit41," Feb. 1, 2005 (1 page).

http://www.ncr.com/solutions/store_automation/rsa-pos.htm, "NCR Point of Service Solutions," May 13, 2004 (2 pages).

http://newyork.citysearch.com/profile/11520048?cslink=roundup_name_noncust&ulink=r . . . ,"Time Lounge on Citysearch New York," May 13, 2004 (2 pages).

http://www.timoutny.com/, "Time Out New York," May 13, 2004 (3 pages).

http://nyc.dodgeball.com/social/help_basics.php, "dodgeball.com::location-based social software for mobile devices," May 13, 2004 (1 page).

http:/www.opentable.com/info/restindex_network.asp,"Restaurant Marketing and Reservation System," May 13, 2004 (1 page).

USPTO as ISA; International Search Report PCT/US03/35234; Dec. 6, 2005; 3 Pages.

\* cited by examiner

FIG. 1b

Basic System Overview

1. Marketing (pre-login) | Registration/Login | Tour | Registration | Venue Tour | Venue Registration | Contact Us 2. End-User | Friends | Venues | Personal Acct. Settings | Purchases (Shopping Cart)

3. Venue Interface | Description | Menu Items | Account | Claims | Campaigns

4. Member Interface | Account | Campaigns | Statistics

5. Third Party Marketeers | Account | Campaigns

6. Campaign Manager Admin | Campaign Builder | View All Campaigns | Statistics Mining 7. Accounting Admin | Venues | Balances 8. Content Admin - All texts and images 9. User Admin - Access all user accounts.

10. Partner Admin - Members, Marketers, Venues

11. Master - Approval of all flagged items

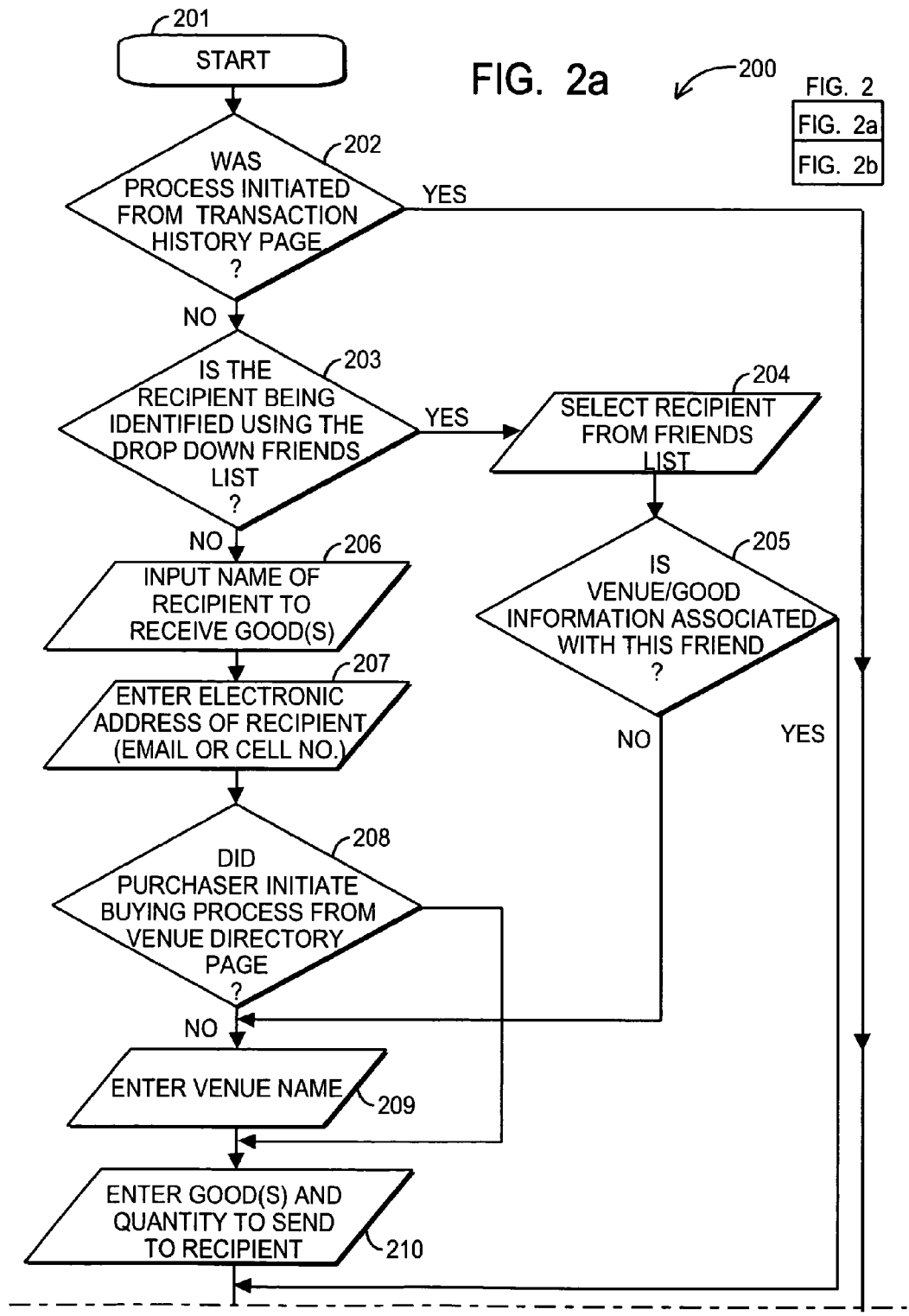

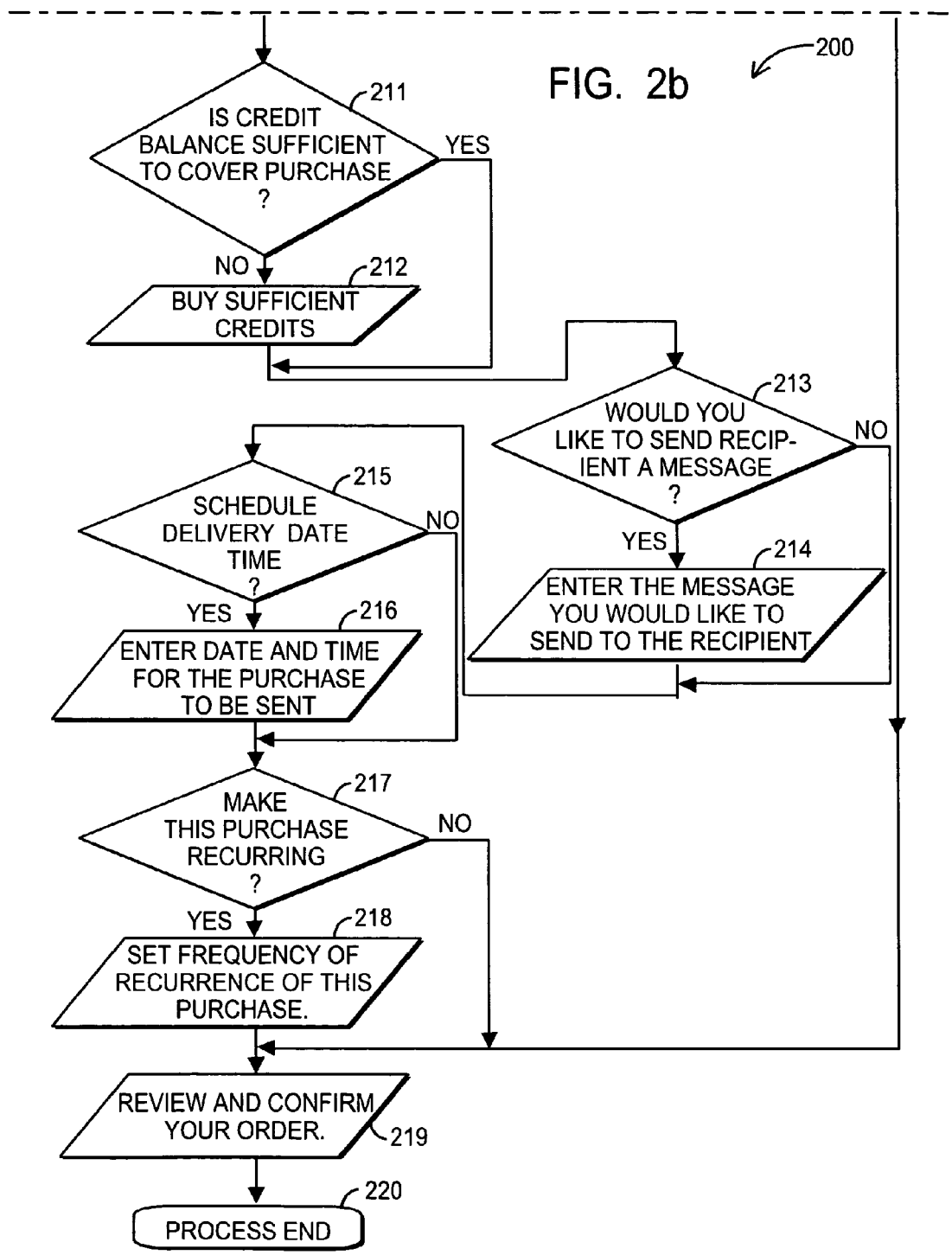

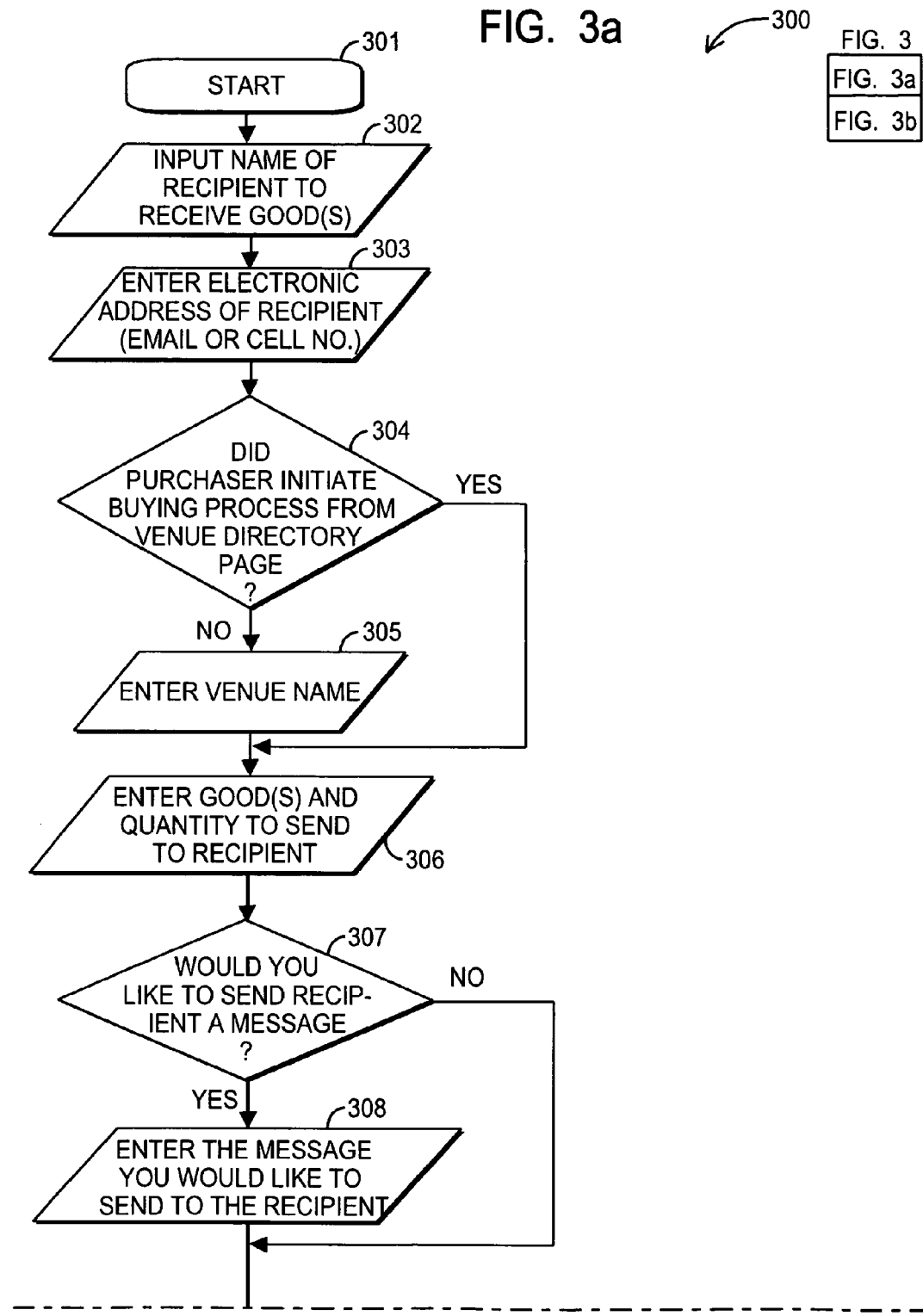

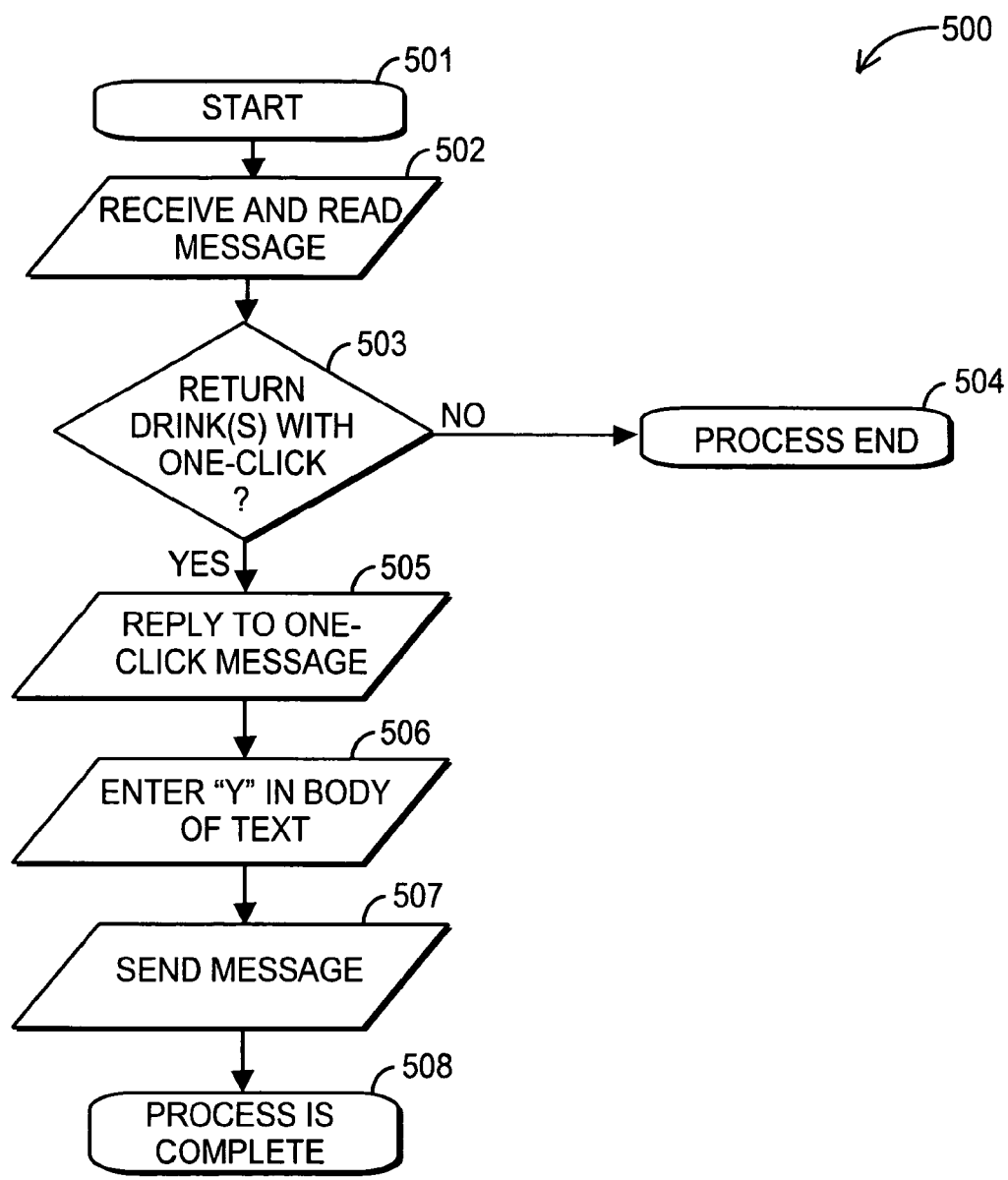

FIG. 6

MAKE PURCHASE

Identify recipient
Enter recipient's name in box or select from friends list
[Todd Silverstein ▼]

Enter email or mobile number of recipient
[todd@hotmail.com]

(optional)
[Hi Todd! Hope you are well and enjoy the drink! Buy one back! Aaron]
Enter a message for the recipient or upload a media file
[c://images/f...] [Browse]

Build your order  Set venue name
[blind tiger ale house ▼] [Search]

[▼] [2 ▼] Select goods and quantity
[heineken]

Schedule delivery (optional)
[2002-12-20 ▼] [18:00 ▼] Enter date and time for delivery Make order recurring (optional)
[days ▼] [7 ▼] Enter recurrence frequency

[Clear] [Review/Confirm]

Tabs: Account | Venue Directory | Make Purchase | Rewards | Friends | Claims home|logout contact: legal | privacy

FIG. 9

VENUE DIRECTORY INFORMATION

Venue information (1 of 2)

- Name: Blind Tiger Bar
- Address: 518 Hudson St.W
- Telephone: 212-555-1234
- E-mail: blind@hotmail.com
- Website URL: www.blindtiger.com
- Brief description: Cosy and intimate bar with a good selection of ales and friendly staff
- Hours of operation: 12:00 - 02:00 Daily Tabs: Account | Venue Directory | Claims | Marketing | Contact Administrator home|logout

[Cancel] [Continue]

contact: legal | privacy

VENUE DIRECTORY INFORMATION home|logout

Account | Venue Directory | Claims | Marketing | Contact Administrator

Venue information (2 of 2)

| Venue Category | | |
|---|---|---|
| club | ▶ | |
| uncool | ▶ | Information |
| karaoke | ▶ | |
| reviews | ▶ | |

Events schedule

| happy hour | 18:00 - 20:00 | beer ½ price |
|---|---|---|
| live bands | 21:00 - 00:00 | daily |
| ladies night | 18:00 - 20:00 | every Tues. |

Goods/Pricing schedule

| heineken bottle | $5 |
|---|---|
| budweiser bottle | $4.50 |
| carlsberg bottle | $6 |
| john smiths | $3.95 |

[Free] Cover charge

[21 +] Admissions/other policies

[Back]  [Add good(s)]  [Add event]  [Save]

contact: legal | privacy

FIG. 11

1100 home|logout

| Account | Venue Directory | Make Purchase | Rewards | Friends | Claims |

FIND A VENUE

Quick search

Search (free text) [ ]

Advanced search

[new york] Venue location*
[live music ▼] Venue category
[happy hour ▼] Specials and events
[heineken] Free text

*required

| name, address | ▼ Views | 3 of 3 results found |

Blind Tiger Ale House
518 Hudson St.,(W 10th St.) NYC
212-555-1234                      details Charlie's Bar
179 West 13th, NYC
212-556-1256                      details Divina bar and restaurant
36 East 22nd, NYC
212-227-1245                      details

[ Search ]

contact: legal | privacy

FIG. 12

CREATE SURVEY survey ▼ Create

General information

Christmas Drinks — Survey title
2002-12-01 — Survey start date
2002-01-01 — Survey close date
10 per question ▼ Reward points  [Edit]

Target profile (optional)
Xmas | M,21-23, USA, Beer

Dear user, this is a survey to all of you having a few drinks this Christmas. — Survey text (text to user asking for participation)

20 — Number of prizes (optional)

You could be the proud owner of the new apple iPod. — Enter prize description (optional)
c://images/f... [Browse] Sponsor logo

[Clear] [Continue]

home | logout

Account | System Setup | User Management | Marketing | System Management

Promotions | Create new promotion | Data Mining | Push Campaign | Reward contact: legal | privacy

FIG. 13

CREATE SURVEY QUESTIONS

Current survey questions

1. How much money will you spend on going out this Christmas?
2. Will you be spending Christmas away this year?
3. Do you think you will buy alcohol as any presents this year?
4. What is your favorite drink during the Christmas period?
5. Do you stock up alcohol for the holiday period?
6. How many people will you celebrate Christmas day with?
7. Do you make any traditional drinks during the hoildays?
8. Is Christmas a religious event for you?
9. What would be your dream Christmas present?
10. Which date do you celebrate Christmas?

Adding question 11
Question label [Rudolf]
Question text [Do you prefer rudolf or dasher?]
Encoding type [encoded list ▶]
How many items in the list? [2]
[rudolf]  Encoding 1
[dasher]  Encoding 2

[Cancel] [Save]

Account | System Setup | User Management | Marketing | System Management
Promotions | Create new promotion | Data Mining
Push Campaign | Reward home|logout contact: legal | privacy

FIG. 14

*1400* home|logout

Account \ System Setup \ User Management \ Marketing \ System Management
Promotions | Create new promotion | Data Mining
Push Campaign | Reward PREVIEW (as seen by user)
Dear Todd,
Many thanks for taking the time to complete this survey. Upon completion of the questions and submission, we will credit your account with 20 credits which you may use on future pruchases. Many thanks!

1. How many drinks do you consume a week? ☐

2. Where will you spend your Christmas vacation? ☐

3. How much do you spend on drinks a week? ☐

4. What time do you normally go out? ☐

5. What drink is your favorite drink? ☐

6. Do you want additional information from us? ☐

[Back]

contact: legal | privacy

FIG. 15

1500 home|logout

Account / Marketing / Contact Administrator
Promotional | Create new promotion
Push campaign | Reward

CREATE REWARD

Program name (internal) [Sir Drinkalot]

Reward name [Winter special]

Reward description [Get your handcrafted glogg glass!!!]

[2002-12-01] Reward posting date

[2002-12-31] Reward close date

[c://photo/glog] [Browse] Reward picture

[club ▼] Category class

[Beer trading Inc.] Reward offered by

[brewery ▼] Company class

[c://images/lo..] [Browse] Reward offered by logo

[28] Points required to redeem the reward

[Credit user/Debit 3 ▼] Service choice

[Clear] [Save]

contact: legal | privacy

FIG. 16

CREATE PUSH CAMPAIGN home|logout

Account | Marketing | Contact Administrator
Promotional | Create new promotion
Push campaign | Reward

[Sir Drinkalot] Campaign name (internal)

[drinks | male, 35-40, USA] [Edit]

[Estimate cost] Estimate cost of campaign

[$25,000] Set campaign cap

[2002-12-01] Set delivery date

[one time ▶] Set frequency

[HTML e-mail ▶] Campaign type

[message ▶] Campaign category

[welcome to the new drinks campaign from c://images/lo..[Browse]] Campaign text - enter text and/or cut-and-paste html or upload graphics

[Set return address ▶] Campaign result will be processed as: url or info included in message body

[Sir@drinksalot.com] Email/URL

[Cancel] [Clear] [Preview] [Save]

contact: legal | privacy

1700 home|logout

Account | Marketing | Contact Administrator
Promotional | Create new promotion
Push campaign | Reward

BUDGET TARGET PROFILE

Select Variables
designer brands
- sunglasses
- footwear
- watches
- clothes
- surfwear
- personal media
age
- 20 - 30
- 31 - 40
gender
- female
- male
country
- sweden sunglasses
oakley
police
addidas
rayban
nike
gucci
mad dog
polaroid Add>>
<<Remove Estimated record matches: 14,909
Number of parameters chosen: 1
Estimated campaign cost: $14,909

Profile
designer brands
- sunglasses
  - oakley
  - mad dog

Cancel   Clear   Save contact: legal | privacy

FIG. 18

EDIT ADMINISTRATOR DETAILS

Current administrators
- Johan Johansson
- Aaron Whiteman
- Todd Silverstein

Change details johnjohansson — Username
******* — Enter current password
******* — Enter new password
******* — Confirm new password

[Cancel] [Delete] [Save]

home|logout

Account | System Setup | User Management | Marketing | System Management

Current Administrators | Add New Administrator contact: legal | privacy

1800

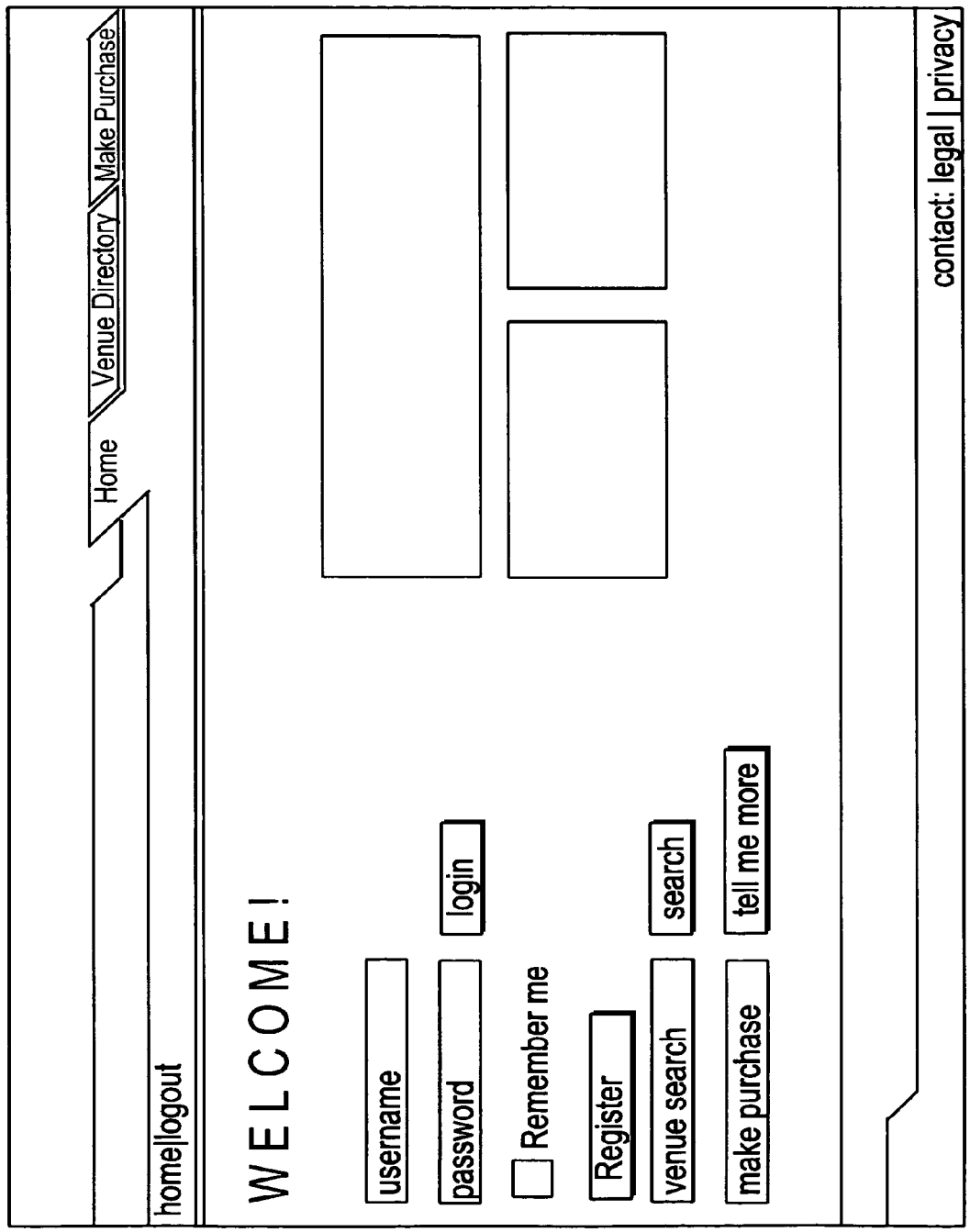

FIG. 25 home|logout

Account / Venue Directory / Make Purchase / Rewards / Friends / Claims

Profile | Payment

EDIT PAYMENT INFORMATION

Credit card details 5521 4415 5487 6589  Credit card number

04/03  MC ▶  Expiry date and card type

Aaron Whiteman  Name on card

åsagatan 43, 112 34 stockholm, sweden  Billing address

[X] Set as primary 5521 4415 5487 6589

4269 ** ** 4521

Cancel   Save contact: legal | privacy

FIG. 31 home

REGISTRATION

User info.
- aaronwhiteman — Username
- ******* — Password
- ******* — Confirm password Payment info. (optional)
- 5521 4568 4589 2234 — Credit card number
- 04/03  MC ▶ — Expiry date and card type
- Aaron Whiteman — Name on card
- åsagatan 43, 112 34 stockholm, sweden — Billing address ☐ Save my details Home | Venue Directory | Make Purchase Purchase credit
- [20] Number of credits to purchase
- Value in selected currency Contact info.
- aaron@hotmail.com — E-mail (required)
- +46 777 555 123 — E-mail or Mobile (optional)

Rewards registration (optional)
- [Register]  [Tell me more]

One-click registration (optional)
- [Register]  [Tell me more]

Referred from (optional)
- [            ] Referral e-mail

[Cancel]  [Submit]

contact: legal | privacy

/— 3300 home | Home \ Venue Directory \ Make Purchase

REGISTRATION (2 of 3)    Register | Rewards Registration

Demographic information

[swedish ▶] Language

[sweden ▶] Country

[stockholm] State/County

[11234] Postal/Zip Code       [28] Age

[male ▶] Gender       [manager ▶] Occupation

[$46,000 - $60,000 ▶] Income

[no ▶] Are you planning to switch jobs in the next six months?

[Back]       [Clear] [Continue]

contact: legal | privacy

PURCHASE  VENUES  MY FRIENDS  MY ACCOUNT  LOGOUT TODD LIGHTNINGROD

CONTACT
primary address/number
secondary address/number
[switch]
WAP pin
cell phone
[brand ▼]
[model ▼]
STORED PAYMENT INFO
◉ VISA ○ MC ○ DI ○ AMEX
cc [   ] exp. date [   ]
street address
zip/postal code/city
[country ▼]

PASSWORD
new password [        ]
confirm new password [********]

OPT-IN SETTINGS
global
◉ on  ○ off
sent to
○ primary only ○ secondary only
◉ both INSTANT RECIPROCITY SETTINGS
active profile
① ② ③ ④
[city ▼]
[venue ▼]
[item ▼]

PROFILE
• occupation: plumber
• income:10 000 0 50 000 $/year
• planning to switch jobs: yes
• own/rent home; own
• frequency of going out: 3-5 days a week
• favorite music: alternative, dance, rock
• favorite magazine: Plumbers Digest
• favorite TV show: Marineworld
• favorite car: Volvo P1800
• favorite sportgame
• favorite travel destination: Stockholm
[edit]

[claims/coupons] [save changes]

FIG. 34b

PURCHASE  VENUES  MY FRIENDS  MY ACCOUNT  LOGOUT TODD LIGHTNINGROD  ⟵ 3420

TODD LIGHTNINGROD

EDIT PROFILE

[ ocupation ◆ ]

income
○ 0-1000 $/year
○ 1000 - 10 000 $/year
● 10 000 - 50 000 $/year
○ 50 000+ $/year are you planning to switch jobs?
○ yes  ○ no own/rent home?
○ own  ○ rent frequency of going out
○ everyday
● 3-5 days a week
○ 1-2 days a week
○ once a month
○ never favorite music
● alternative   ○ metal
○ classic      ○ pop
○ dance        ○ rock
○ funk         ○ soul
○ jazz         ○ I don't like music favorite magazine
[ magazine ◆ ]
[ TV show ◆ ]
[ brand of watch ◆ ]
[ car ◆ ]
[ sport ◆ ]
[ travel destination ◆ ]

[ done ]

FIG. 35

REGISTRATION

User information
- Username: philbrowne
- Password: *******
- Confirm password: *******

Contact info.
- Contact name: Phil Browne
- Contact phone number: +44 207 883 5544
- Contact e-mail: phil@beer.com

- Business name: Beer Trading deposit
- Business address: Highfield Road 12. London, W1K 2PJ
- Business phone number: +44 207 883 0000

Payment info.
- Account name: Beer Trading deposit
- Account number: +44 207 883 5544
- EFT/swift number: bt775439

[Cancel] [Submit]

home | Home contact: legal | privacy

GIFTING SYSTEM AND METHOD

CROSS-REFERENCE TO RELATED APPLICATIONS

This application claims priority to U.S. patent application Ser. No. 10/701,506, filed on Nov. 5, 2003, now issued as U.S. Pat. No. 7,496,527, which claims priority to U.S. Provisional Patent Application Ser. No. 60/423,846, filed on Nov. 5, 2002, the entire disclosures of both of which are incorporated herein by reference in their entirety.

BACKGROUND OF THE INVENTION

The present invention relates, generally, to the remote purchasing of products or services, and more particularly, to an enhanced system and method for the remote purchasing of products or services via a network, wherein a buyer is permitted to indicate as specific physical location where the products or services will be claimed and identify a third-party as the recipient of the products or services.

Currently, there are many issues that arise for a person who would like to remotely purchase a beverage (or food product, or other item) for someone else. First, in typical cases, both the purchaser and the recipient must be physically present at a venue where the purchase transaction takes place. Therefore, the purchaser must be physically and temporally proximate to the target venue in order to purchase a beverage for someone at any given time.

Furthermore, in many cases the person who would like to purchase a beverage may not be aware of the location of a suitable venue, or, more acutely, may not have information about the specific venues that the intended recipient considers suitable. In addition, even once the location of a venue suitable for purchasing a beverage in has been identified, there is, in some cases, a lengthy process of physically locating the venue, and in some cases a situation in which the venue is closed, too busy or otherwise inaccessible.

Another issue facing a purchaser trying to go through this process is the fact that if the purchaser locates the venue, travels to the venue and the venue is open, there is no means of purchasing a beverage for another person without them physically being present at the time of purchase. In most cases there are no means to purchase a beverage for a later date, whereby the recipient of the beverage is able to collect the purchased beverage later that day or on even another day altogether.

The above issues are multiplied if a person wants to buy several beverages for several different persons in different venues and on different days. The purchasing process would have to be repeated several times, and in the case where one would like to make several purchases at widely dispersed locations at roughly the same time, it therefore becomes an unattainable goal.

One known solution to these problems would be to telephone or visit a venue, provide payment and make an arrangement with staff at the venue for the recipient to claim said beverage at a future date. This solution would also require alerting the recipient in enough detail to claim the beverage and the venue in enough detail to positively identify the recipient. This solution suffers from the amount of effort and time involved, uncertainty about properly informing the recipient, uncertainty about whether the venue will truly honor the purchase, and many of the issues (such as identifying and contacting a suitable venue) as described above.

Another known solution, which does not relate to the scope of the invention being discussed, would be to purchase a packaged form of beverage (a bottle of wine, a bag of dried tea) that could be delivered to the recipient in any of the usual fashions. This solution does not typically involve a venue with a specific location as part of the claim transaction.

From the venue's perspective, a very large problem with existing processes for purchasing drinks, as set forth above, is the loss of potential customers and earnings. Unless a venue has established some kind of remote purchasing service, they are losing out on potentially significant revenue generating opportunities and the opportunity for repeat business from new or existing customers.

Another issue that a venue faces today is the issue of making consumers aware of its existence and establishing and maintaining relationships with existing and potential customers. As it stands today there are many means and medias for a venue to use as promotional and information tools, but the fact that there are so many creates a problem for the venue of identifying the effectiveness of many of the tools. Also, many of the media, such as yellow page advertisements, are static, in that they do not provide specific feedback to the venue about their effectiveness or interactivity with a potential customer and cannot be updated frequently. Every venue wishes to be found easily using different tools, but it is increasingly difficult to ensure the information is current (especially, e.g., if the venue hosts a calendar of events), accessible, and inexpensive for both venue owner and customer alike.

Other issues facing venues are the desire to increase customer traffic and revenues and the desire to reduce overall marketing costs. Currently, most venues have a maximum capacity of persons set by the local authorities and thus can only increase revenues by increasing the number of patrons up to capacity, by increasing throughput, or by increasing the profitability of customer purchases. Given that patrons cannot be increased past capacity or throughput increased beyond a certain physical limit, venue owners may be unable to increase their revenues beyond a certain point without adding new capacity or throughput capability. In addition, when a location is too busy it is likely to have an adverse effect on throughput.

Therefore, it is desirable to provide a process and service that reduces the amount of time and effort required by a venue to attract and process customers wherever they may be. It is also a desire on the part of venues to be empowered when using media as an advertising tool. Allowing customers to purchase beverages without physical presence assists a venue in dealing with the issues described above. Remote purchasing creates a level of service to consumers unsurpassed in the industry today.

In addition to customers and venues, other agents that are party to the above process face certain difficulties. Beverage manufacturers and distributors often do not receive direct information about consumer purchases, tastes and behavior from venues. When such information is received it is likely to be anecdotal rather than systematized. As well, marketing activities directed at consumers are not often made directly to consumers, but are proxied through the venues or various consumer-focused media channels.

Marketers who would like to promote third-party products to the consumers who visit these venues also do not have a way to gather information or interact directly with these consumers in a remote fashion, but must be physically present (and often must negotiate the right to be so with the venue owner) or proxy their services through the venue owner and staff.

SUMMARY OF THE INVENTION

The present invention provides a solution to the foregoing issues, as well as additional benefits, e.g., freeing consumers from carrying cash into venues, reducing transaction fees and financial risk for venues, and increasing branding opportunities for manufacturers, distributors and third-party marketers.

Basic Purchasing System/Method

The present invention discloses a system and method for enabling the remote purchasing of products (e.g., alcoholic beverages) wherein, as part of the buying transaction, the purchaser indicates a specific physical location ("venue") where the product will be picked up ("claimed"); may identify a third party as the "recipient" of the product by providing the third-party's e-mail or text messaging address (or another method of electronic contact); optionally can attach a personalized message (and various multimedia files such as photos and audio recordings) to the transaction; and optionally can specify the information required for recipients who are already known to the system to make an expedited return purchase using a feature known as "instant reciprocity," in real or near-real time.

Purchasing Variants

The present invention also enables other purchasing variants including, e.g., barhopping purchases in which a purchase includes multiple drinks at multiple venues; group purchases that enable purchasing for groups; group barhopping purchases; and a "hint-hint" feature that allows an end user to push a broadcast out to his/her friends (or other group of users). A broadcast contains a link (or other transactional pointer) that enables the broadcast recipients to quickly buy a drink for the broadcaster, and brand purchases, wherein a venue or site is selected under the aegis of a larger brand such as a cruise line, hotel chain, restaurant chain, or chain of pubs.

It is contemplated that a user can use a system consistent with the present invention to make a purchase for himself or herself, rather than for someone else. Alternatively, a single franchise, e.g., a coffee chain, might operate a system consistent with the invention as a single-brand remote purchasing engine.

Venue Directory

In addition, the present invention discloses related systems and methods that enable descriptive listing information on participating venues (such as venue address, items in stock and customer ratings) to be accumulated in a distributed fashion, whereby the system administrator can assign (distribute) responsibility for individual items in the listing to different users participating in the system, allowing them to individually provide, manage and update the majority of their own information by interacting with the system and without requiring human mediation; allowing potential purchasers ("end users") to look up via "pull" searching or receive via electronic "push" notification specific pieces of information associated with these venues; and, as needed, allowing the system administrator to manage the activities and content being supplied by other users.

Marketing

Moreover, the present invention discloses related systems and methods that enable system users (dependent on user type and the parameters set by the system administrator) to engage in marketing activities directed at either/both end users and venues wherein, such activities include, e.g., generating "push" and "pull" marketing campaigns that target specific users or are activated by specific system-mediated events; and generating statistics and/or data mining reports on users and their transactions with the system. Such efforts may be tailored to specific circumstances that take into account, among other things: demographics, locations, time, and device and platform information, wherein the providers of aforementioned marketing and advertising services operate as independent agents in purchasing, designing or using these services (but under the jurisdiction of the system administrator and system parameters), and wherein both end users and venues will have various "opt in" preferences that will modify the delivery of these marketing and advertising services to them as individuals. Some of these marketing activities may depend on the use of radio-frequency identification (RFID) or other short-range wireless communications technologies. Furthermore, some of these activities may generate data on users that is encoded in such a fashion that the new information can become the basis of future marketing activities (e.g. using response rate to a campaign, or answers to an encoded survey as "target" variables in a subsequent campaign).

Location-Based Services

Furthermore, this invention includes systems and methods that use RFID or other short-range sensing technologies that can read unique information stored in a chip, tag or card (a "token") carried by an end user to provide additional system functionality, including, e.g., expediting claim redemption by using this token in conjunction with a reader embedded in the venue claim terminal where the claim is being redeemed; using the token, in conjunction with a reader positioned somewhere in the venue (most likely in the doorway) and in conjunction with the networked nature of the venue claims terminals to create a location-based service in which authorized end users can view in real or near real time the whereabouts of other token-carrying users, and initiate a purchasing transaction based on this information; using the token, in conjunction with a reader embedded in the electronic claim terminal at a venue in lieu of a traditional credit card to pay for goods. The tokens may be used for a wide variety of marketing activities, marketing to users based on their location at or near one or more venues.

Friends List and Permissions

Also, this invention includes methods for certain users to generate and manage lists of friends and groups of those friends, and a permissions-based system whereby a user can authorize friends or other users to view data associated with that user such as that user's instant reciprocity information or RFID location.

Accounting

The present invention further may handle transaction and account balance tracking such that they can be billed and reconciled either by the system or by passing this information to a third-party provider.

BRIEF DESCRIPTION OF THE DRAWINGS

FIG. 1b is a software architecture diagram illustrating an exemplary arrangement of modules in a system consistent with one embodiment of the present invention;

FIGS. 2a and 2b are collectively a process flow diagram outlining an exemplary sequence of steps performed by registered end users to make a purchase in an exemplary system consistent with one embodiment of the present invention;

FIGS. 3a and 3b are collectively a process flow diagram outlining an exemplary sequence of steps performed by unregistered end users to make a purchase in an exemplary system consistent with one embodiment of the present invention;

FIG. 5 is a process flow diagram illustrating the transaction process for a disconnected device, including instant reciprocity functionality, in an exemplary system consistent with one embodiment of the present invention;

FIG. 6 is a screen view of an exemplary screen for a registered user to make a purchase, in an exemplary system consistent with one embodiment of the present invention;

FIGS. 9 and 10 are screen views of exemplary venue directory screens, in an exemplary system consistent with one embodiment of the present invention;

FIG. 11 is a screen view of an exemplary screen for finding a venue, in an exemplary system consistent with one embodiment of the present invention;

FIGS. 12 and 13 are screen views of exemplary screens for creating a survey, in an exemplary system consistent with one embodiment of the present invention;

FIG. 14 is a screen view of an exemplary survey preview screen, in an exemplary system consistent with one embodiment of the present invention;

FIG. 15 is a screen view of an exemplary reward creation screen, in an exemplary system consistent with one embodiment of the present invention;

FIG. 16 is a screen view of an exemplary push campaign creation screen, in an exemplary system consistent with one embodiment of the present invention;

FIG. 17 is a screen view of an exemplary target profile building screen, in an exemplary system consistent with one embodiment of the present invention;

FIGS. 18 and 19 are exemplary screen views of administrator management screens, in an exemplary system consistent with one embodiment of the present invention;

FIG. 23 is a screen view of an exemplary login screen, in an exemplary system consistent with one embodiment of the present invention;

FIG. 25 is a screen view of an exemplary payment submenu screen, in an exemplary system consistent with one embodiment of the present invention;

FIG. 31 is a screen view of an exemplary user registration screen, in an exemplary system consistent with one embodiment of the present invention;

FIGS. 32-34b are screen views of exemplary registration and user information collection screens, in an exemplary system consistent with one embodiment of the present invention;

FIG. 35 is a screen view of an exemplary third-party marketer registration screen, in an exemplary system consistent with one embodiment of the present invention;

DETAILED DESCRIPTION OF THE EMBODIMENTS

An exemplary implementation of a system consistent with the present invention is in the beverage (spirits) industry (including bars, restaurants, lounges, nightclubs and other commercial establishments that serve alcoholic beverages), enabling consumers to remotely purchase beverages for themselves or other individuals at participating locations (venues). The following discussion of this particular implementation of the system is meant to be illustrative of system capabilities and functionality but should not limit the application of a functionally identical, but rebranded system to other industry verticals with dispersed physical locations and different types of products. Such a system may be run under both an ASP and a self-host situation without any substantial modification. Further, the system may support operations in which venues are fully independent business entities participating as independent agents in the system or one in which venues are related under an umbrella brand (i.e., they are all franchisees of the same business).

Exemplary Purchase Method

Figure 1:
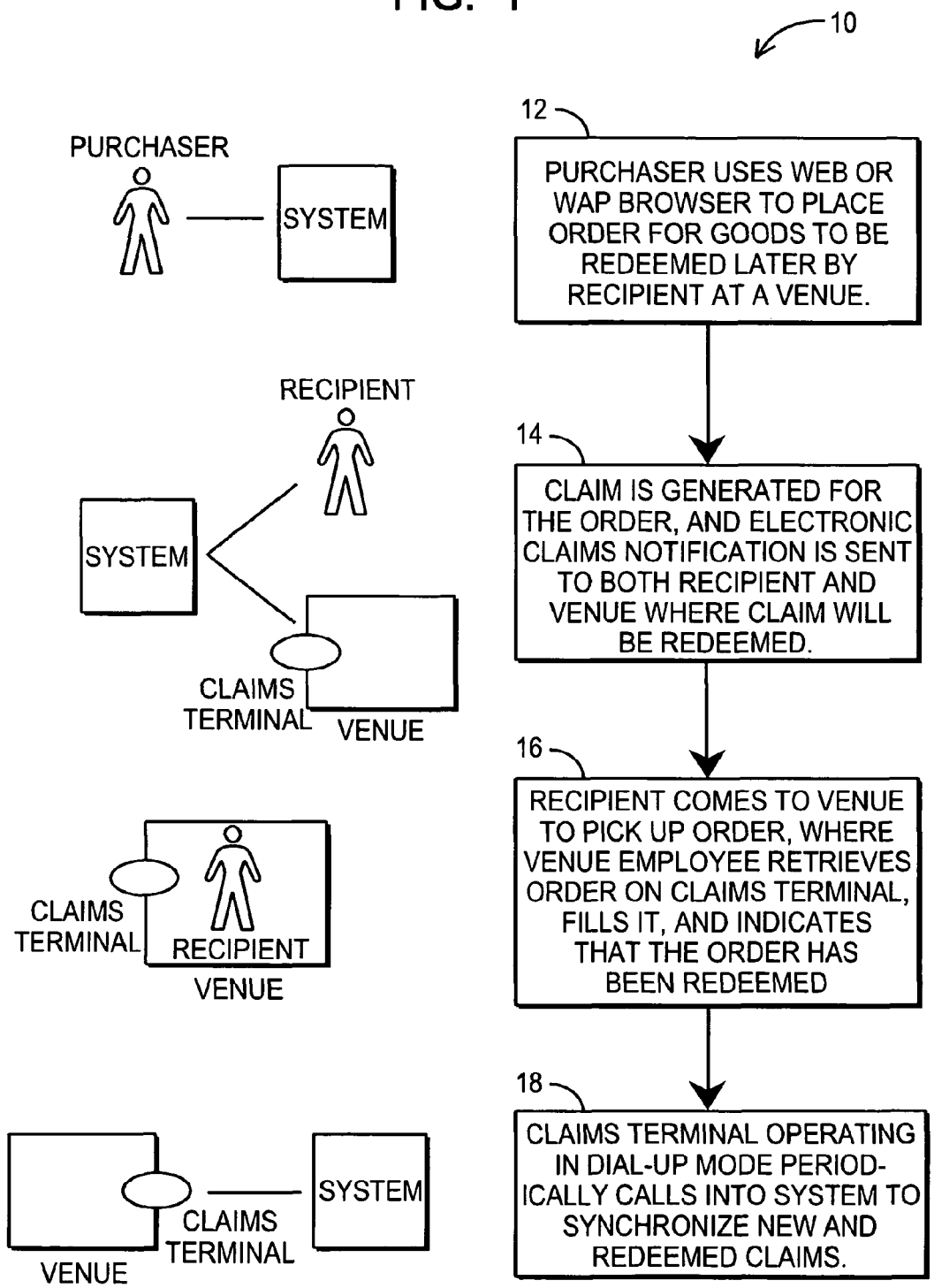
FIG. 1 is a process flow diagram illustrating an exemplary purchase in a system consistent with one embodiment of the invention.

FIG. 1 illustrates the process flow 10 for an exemplary purchase in a system consistent with one embodiment of the invention. As shown, at block 12, the purchaser initiates the process by using a web or WAP browser to access the system and place an order for products to be redeemed later by the recipient at a given location. For example, the purchaser might be a friend wishing to purchase a beverage for the recipient at a selected bar. Next, at block 14, the system generates a claim for the order and transmits electronic claims notification to both the recipient and the venue where the claim is to be redeemed. At block 16, the recipient comes to the venue to pick up the order, and an employee of the venue (e.g., a bartender) retrieves the order using a claims terminal, fills the order (i.e., serves the drink to the recipient), and enters an indication into the claims terminal that the order has been redeemed. At block 18, the claims terminal, which may be operating in a dial-up mode, periodically calls into the system to synchronize new and redeemed claims.

Users

The following table gives a broad overview of the various types of exemplary users that participate in the system and how they might interact with it:

| | ROLE IN SYSTEM | ACCESS POINTS | KEY FUNCTIONALITY |
|---|---|---|---|
| Consumer/ "End User" | Purchaser and Recipient of Products. | Primary: Web interface Secondary: Voice menu/call center Various wireless interfaces (including both WAP and "fat client" implementations, mobile phones, personal digital assistants (PDAs) | Registration/Configuration. Search/Browse venue information. Make/send purchases. Receive purchase notifications. Opt-in participation in marketing activities. Creation of account enabling sharing of favorites/voting/ streamlined purchasing. |
| Venue | A specific location that provides purchased products to consumers and may supply information to end users using the system. Venues may be independent business entities or the separate physical entities of a single business concern (such as the stores of a franchise) | Primary: 1. Web interface for managing venue account and buying services. 2. A connected wireless fat-client application for receiving and managing purchase claims in real time, e.g., a touch-screen terminal. Secondary: None | Registration/Configuration Input/update/manage venue information Set products and prices Participate in various marketing activities. View processed transactions. Process/fulfill purchase claims. |
| Administrator(s) | The party(s) running the system. | Primary: A web interface Secondary: Direct access to system code | Set parameters, look and feel/functionality for all groups. Admit/manage system users. Mine system usage data and participate in various marketing activities. Handle system payments/billing. |
| Member | A company that participates directly in the system or funds its use, e.g., a supplier of products to a venue | Primary: A web interface Secondary: None | Member will primarily run marketing campaigns. They are comparable to third-party marketers from a functional perspective. |
| Third-Party Marketer | An independent third party that wishes to engage in marketing activities to end users or venues. | Primary: A web interface Secondary: None | Purchase/Engage in marketing/advertising activities. |

In the presently described embodiment, the end user web interface is the "main public face" of a remote purchasing system consistent with the invention. It is desirable that end users should first have to register with the system before being permitted to make purchases (e.g., so that the system can notify the purchaser if there is a problem with the order), although it is contemplated that in certain embodiments of the present invention, no registration would be required. It should be recognized that references made herein to unregistered and anonymous users are only applicable to embodiments of the invention wherein registration is not required in order for a user to perform or access certain system functions.

System Architecture

Figure 1A:
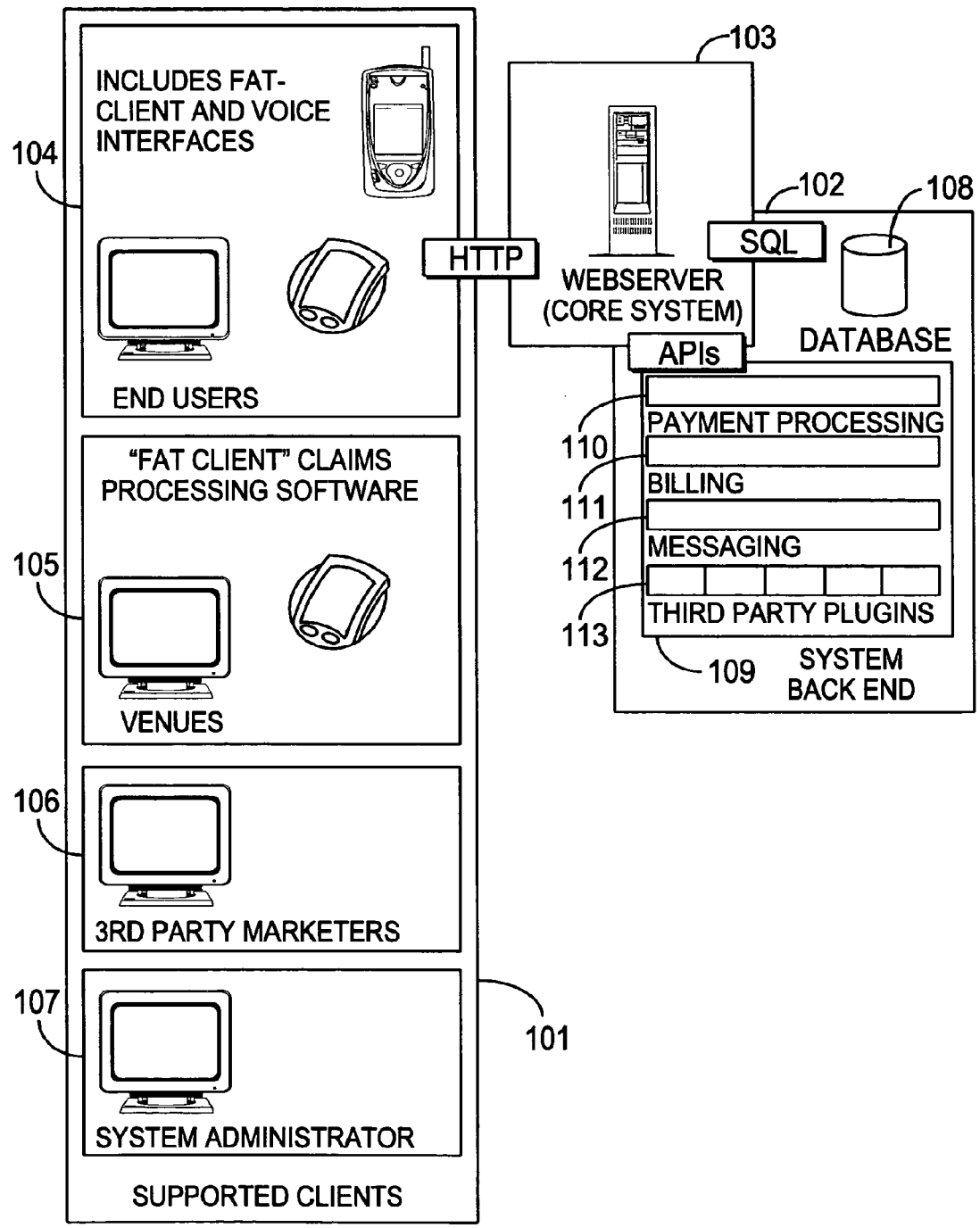
FIG. 1a is a system architecture diagram of an exemplary remote purchasing system consistent with one embodiment of the present invention.

FIG. 1a provides a graphic overview of the system architecture of an exemplary remote purchasing system 100 consistent with the present invention. As shown, a plurality of clients 101 are connected, e.g., using HTTP and standard web browsers, to a system back end 102, with a webserver 103 acting as the core system. The clients 101 may include, e.g., end users 104, venues 105, third-party marketers 106, members (not shown), and system administrators 107. The system back end 102 includes a database 108 (e.g., accessible via SQL) and a plurality of modules 109 in communication with the webserver 103 (e.g., via API calls), which may include, e.g., payment processing 110, billing 111, messaging 121, and third-party plugins 122.

The system 100 follows a common client-server setup supplemented by a powerful database 108. The primary client for all users 104-107 is an Internet web browser. The system may have the capability to support additional markup languages, such as WML for wireless devices via simple transforms. In addition, "fat client" implementations for emerging wireless device platforms may be implemented to provide end users to with a richer experience. In the case of such implementations, certain system resources shown in system 100 presently located on the server 103 will shift over to the client 101 side. In order to participate in the system, venues 105 run a specialized piece of client software on site that allows them to receive and process purchase claims in or near real-time.

A number of third-party software modules 113 may be plugged into the backend 102 via API calls or similar mechanisms to provide additional system functionality. Such modules may include, e.g.: payment processing 110, billing/checkwriting 111, and messaging 112.

The payment processing module 110 may accept and process an array of credit/debit cards and other types of accepted electronic currency, as described in further detail hereinbelow. The billing/checkwriting module 111 may generate physical bills/checks on the basis of internal system criteria, as described in further detail hereinbelow. It is also possible that a system consistent with the present invention might not include a payment processing 110 or billing/checkwriting 111 modules, in which case such functionality would be handled by one or more external systems. It should further be recognized that a system consistent with the present invention may include accounting functionality, whereby an account, "points", or credit balance is kept for each user, and wherein users must "recharge" their balance as necessary to have a sufficient balance to complete a purchase. However, it is contemplated that in certain embodiments of the present invention, purchases by users are made using credit or debit cards, or other payment methods, e.g., direct billing to a user's telephone bill, on a per-transaction basis. In this configuration, the system may store such payment information for each user, as may be appropriate, and it is not necessary that the system keep track of a "balance" for each user. It should be recognized that references made herein to "credits" and "balances" herein are only applicable to embodiments of the invention wherein the system stores an account balance for each user.

A messaging module 112 responsible for all system messaging will support, e.g., email, SMS and MMS messaging. The principal purpose of the messaging client 112 will be to deliver claims notifications to recipients, claims information to venues, and transaction confirmations to purchasers.

In one embodiment, the software modules might be arranged as illustrated in FIG. 1b, wherein the modules include marketing, end-user operations, venue interface, member interface, third-party marketers, campaign manager administration, accounting administration, content administration, user administration, partner administration, and master system administration. The operation of each of the foregoing modules is described in further detail hereinbelow with reference to the individual system functions.

The foregoing described system architectures and system modules are of one exemplary system consistent with the invention, and it is contemplated that other system architectures and modules may be used in various embodiments of the present invention.

Remote Purchasing Description and Process

The concept of remote purchasing as embodied in a system consistent with the present invention is distinctive for a number of reasons, including: it permits a purchase in which a particular physical location (or, e.g., a chain of stores) where a purchase may be claimed; the purchaser need not be physically present at the site where the purchase is made; the purchaser may designate another person as the recipient of the purchase using the recipient's messaging address as their identification; the recipient of a purchase picks up their product(s) in person; optionally, the purchaser can configure their account so that a recipient can buy something in return for the purchaser with a single click ("instant reciprocity"); and the system may be adapted to handle all of the notification and billing issues to support this functionality.

In the system implementation, a purchaser (end user) operating on a supported client first initiates the remote purchasing process, e.g., through one of a number of available entry points:

| End User Type | Remote Purchase Tab in Main Menu | Venue Search Results Page | Transaction History Page | In Response to a Claim Notification via "instant reciprocity" |
|---|---|---|---|---|
| Registered User | Yes | Yes | Yes | Yes, if buyer enabled instant reciprocity and recipient has a balance sufficient to cover the reciprocal purchase price. |
| Anonymous User | Yes | Yes | No | No |

Figure 3B:
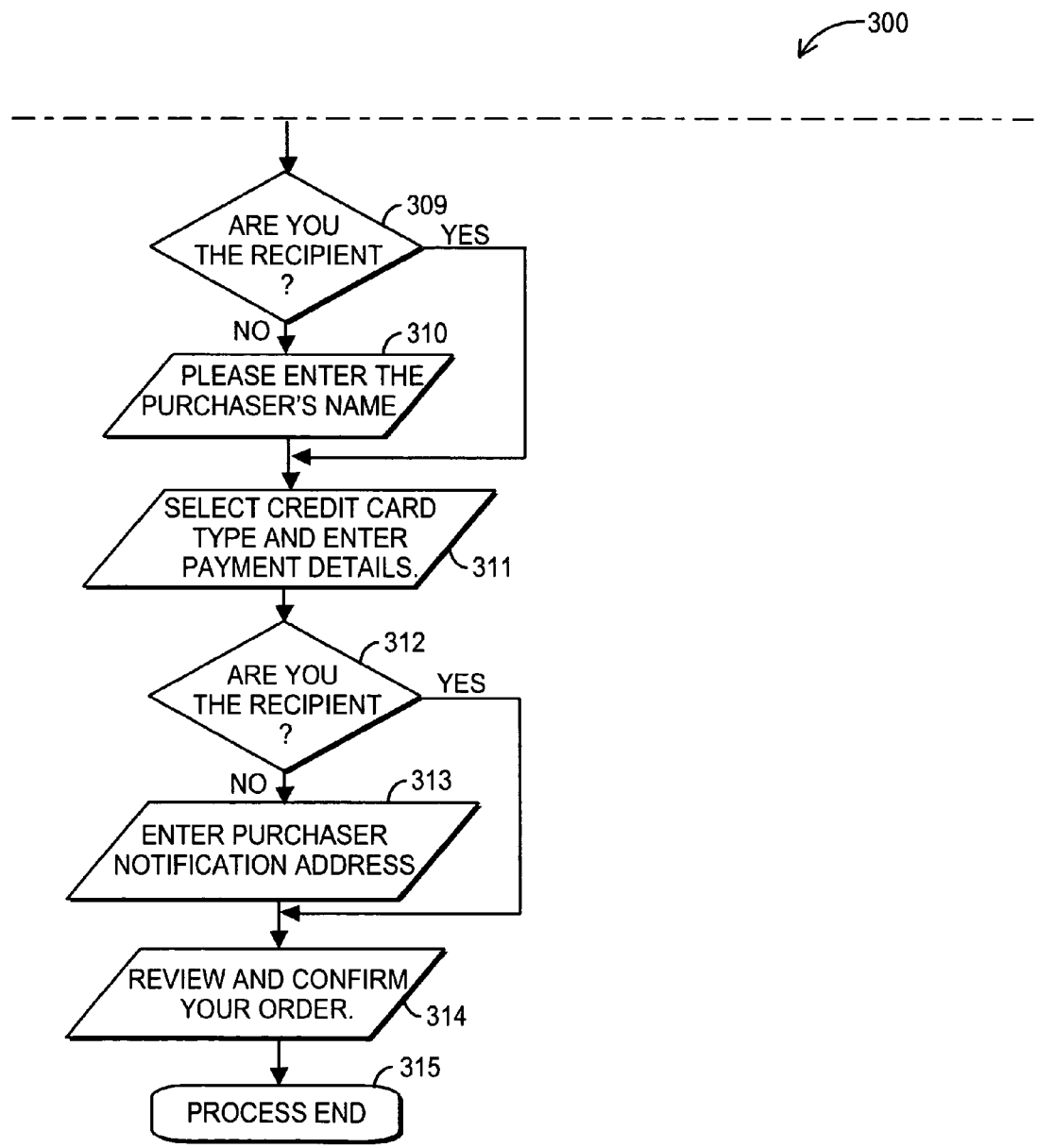

FIGS. 2a and 2b are collectively a process flow diagram 200 outlining an exemplary sequence of steps performed by registered end users to make a purchase, and FIGS. 3a and 3b are collectively a process flow diagram 300 outlining an exemplary sequence of steps performed by unregistered end users to make a purchase.

FIGS. 2 through 5, described hereinbelow, are flowcharts illustrating the architecture, functionality, and operation of one possible implementation of the present invention. In this regard, each block represents a module, segment, or portion of code, which comprises one or more executable instructions for implementing the specified logical function(s). It should also be noted that in some alternative implementations, the functions noted in the blocks may occur out of the order shown in the Figures. For example, two blocks shown in succession may in fact be executed substantially concurrently, or the blocks may sometimes be executed in the reverse order, depending upon the functionality involved, and certain blocks may not always be employed. Moreover, it should be recognized that the order of the blocks may also vary depending on the circumstances and the point at which an end user initiates the purchasing process.

As shown in the flowcharts of FIGS. 2a and 2b and the exemplary screen view 600 of FIG. 6, if the end user (i.e., the purchaser) is registered and logged in, the process begins at block 201, and an initial determination is made at block 202 whether the purchaser has initiated the process from the transaction history page (discussed in further detail below). If not, the purchaser is prompted at block 203 whether to identify the intended recipient by name (may be the recipient himself) from a drop-down friends list. If the recipient is not on the drop-down list, the purchaser is prompted at block 206 to input the name of the recipient, and the email address or cell phone number of the recipient at block 207 (other electronic contact methods may be used, e.g., a pager). A check box or other simple indication (not shown) may be provided to permit the purchaser to add a manually-entered recipient to his or her friends list. It should be noted that at least one electronic address or number (for email or wireless messaging) is required, and that a second address may further be specified. A determination is made at block 208 whether the purchaser initiated the buying process from a venue directory page. If not, the purchaser is prompted to enter the name of the venue at block 209. If so, the process continues at block 210. At block 210, the purchaser enters the products and quantity of products to send to the recipient. At block 211, a determination is made whether there is a sufficient credit balance to cover the purchase. If not, the user may purchase sufficient credits at block 212. If there is already a sufficient credit balance, the process continues at block 213. If, at block 203, the user is identifiable using the drop-down list, the purchaser is prompted to select the recipient from the list at block 204. Once the recipient is selected at block 204 from the drop-down list, a determination is made at block 205 whether there is a venue and/or product associated with the recipient. If, at block 205, it is determined that there is already a venue and/or product associated with the recipient, then the process continues at block 211. If not, the process continues at block 209, for the selection of a venue. At block 213, the purchaser may opt whether to send a message (and/or multimedia file) to the recipient. If not, the process continues at block 215. If so, the purchaser is prompted at block 214 to input the message. At block 215, the purchaser is prompted whether to schedule a delivery date and time (otherwise, the purchase will be immediate). If not, the process continues at block 217. If so, the purchaser is prompted at block 216 to input the date and time for the purchase to be sent. At block 217, the purchaser is prompted whether to make the purchase recurring (e.g., every x minutes, daily, weekly, annually). If not, the process continues at block 219. If so, the purchaser is prompted to set the recurrence frequency at block 218. At block 219, the purchaser is prompted to review and confirm the order, and the process ends at block 220. If, at block 202, it is determined that the process was initiated from the transaction history page, then the process continues at block 219, for review and confirmation of the order. It should be noted that, in the above process 200, if the purchaser is a registered end user and has activated instant reciprocity (as described in further detail below) and the recipient's messaging address is recognized by the system, the purchaser's instant reciprocity information will be included for review.

Figure 7:
FIG. 7 is a screen view of an exemplary screen for an unregistered user to make a purchase, in an exemplary system consistent with one embodiment of the present invention.

As shown in the exemplary flowcharts of FIGS. 3a and 3b and the exemplary screen view 700 of FIG. 7, if the end user is unregistered, the process begins at block 301, and the user (i.e., the purchaser) is prompted at block 302 to input the name of the recipient (which may be the purchaser himself), and the email address or cell phone number of the recipient at block 303. It should be noted that at least one electronic address or number (for email or wireless messaging) is required, and that a second address may further be specified. A determination is made at block 304 whether the purchaser initiated the buying process from a venue directory page. If not, the purchaser is prompted to enter the name of the venue at block 305. If so, the process continues at block 306. At block 306, the purchaser enters the products and quantity of products to send to the recipient. A block (not shown) may be included to add a tip amount from the purchaser to be paid to the server of the products (e.g., a bartender). At block 307, the purchaser may opt whether to send a message (and/or multimedia file) to the recipient. If not, the process continues at block 309. If so, the purchaser is prompted at block 308 to input the message. At block 309, the purchaser is prompted whether he/she is also the recipient, in which case the process continues at block 311. If not, the purchaser is prompted at block 310 to enter the purchaser's name. At block 311, the purchaser inputs payment type and details. A check box or other simple indication (not shown) may be provided to permit the purchaser to store his or her payment information for use in future transactions. An additional block (not shown) may be further provided to permit entry of a coupon or other discount code. At block 312, another determination is made whether the purchaser is also the recipient, in which case, the process proceeds to block 314. If not, the purchaser is prompted to input the purchaser's notification address for confirmation at block 313. The process then continues at block 314 for the purchaser's review and confirmation of the order and ends at block 315.

Successful completion of either of the above sequences 200, 300 will cause payment to be processed and various messages to be generated, e.g.: a confirmation message to the purchaser (if different from recipient), a claim notice to the recipient and a claim notice to the venue associated with the claim. In the case of an unregistered user making a purchase, there may be a delay on notification being sent to the recipient until the charge has successfully cleared.

It should be recognized that appropriate functionality may be provided to permit a purchaser to "clone" an order, so that the identical order (or a slightly modified version thereof) may later be placed without the purchaser having to reenter all of the information.

Prepopulation of Fields

The system may be configured to streamline the buying process for an end user by prepopulating certain fields based on certain conditionals (These conditionals appear in the order in which they might be addressed by the system. It is contemplated that fields will only be prepopulated once, so if a field is already populated, it will not be overwritten by the prepopulation triggered by a later conditional.). Exemplary conditionals include: if the end user initiates the purchasing process from one of the items in their transaction history page, all fields will be prepopulated with the same values as the ones in the historical transaction; if the end user initiates the purchasing process from a venue search results page, the venue field will be prepopulated with the selected venue (and possibly, the products field may be populated with a preselected product, as well, e.g., drink information); when identifying the intended recipient, registered end users who have created a friends list will be able to select from a drop down friends list, wherein if a friend is selected, a number of fields will be prepopulated with the friend's information (recipient name, recipient messaging address, and if there is information on the recipient's favorite venue and product, both of these fields); if the purchaser is a registered end user and has activated instant reciprocity and the recipient's messaging address is recognized by the system, the purchaser's instant reciprocity information will be included for review; if the purchaser is a registered end user and the total cost of the transaction is greater than said user's current account balance, the user will be prompted to buy more credits (e.g., they may have the option of selecting from a drop down list of previously saved payment options whose selection will prepopulate the payment fields and ask for a pin # as confirmation).

Instant Reciprocity

In certain embodiments, there is a special exception to the standard purchasing process flows 200, 300 described above, a feature referred to herein as "instant reciprocity". This feature enables the recipient of a claim to initiate an expedited reciprocal purchase to the original buyer (e.g., with a single keypress). It is contemplated that the instant reciprocity feature would only be available under the following conditions: both the recipient and original purchaser are registered users; the original purchaser has indicated their favorite drink and venue preference as part of their instant reciprocity settings; and the recipient account balance is greater than the price of the original purchaser's favorite drink (or the recipient has previously stored payment information such as a credit card in the system).

Figure 4:
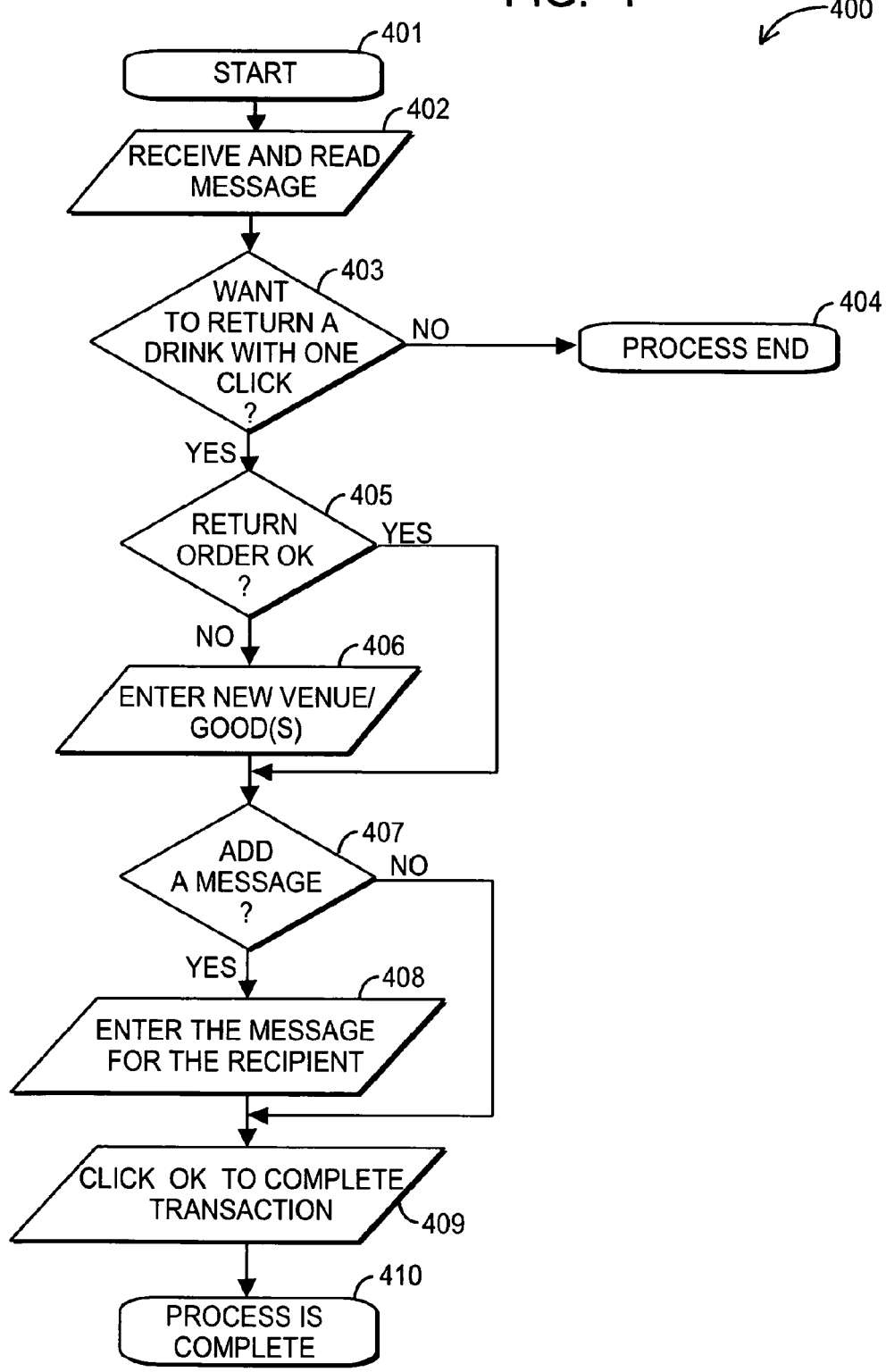
FIG. 4 is a process flow diagram illustrating the transaction process for a fully connected device, including instant reciprocity functionality, in an exemplary system consistent with one embodiment of the present invention.

FIGS. 4 and 5 illustrate exemplary process flows for a instant reciprocity transaction in the cases of a fully connected (i.e., hardwired) and a disconnected device (i.e., capable of messaging), respectively.

Figure 36:
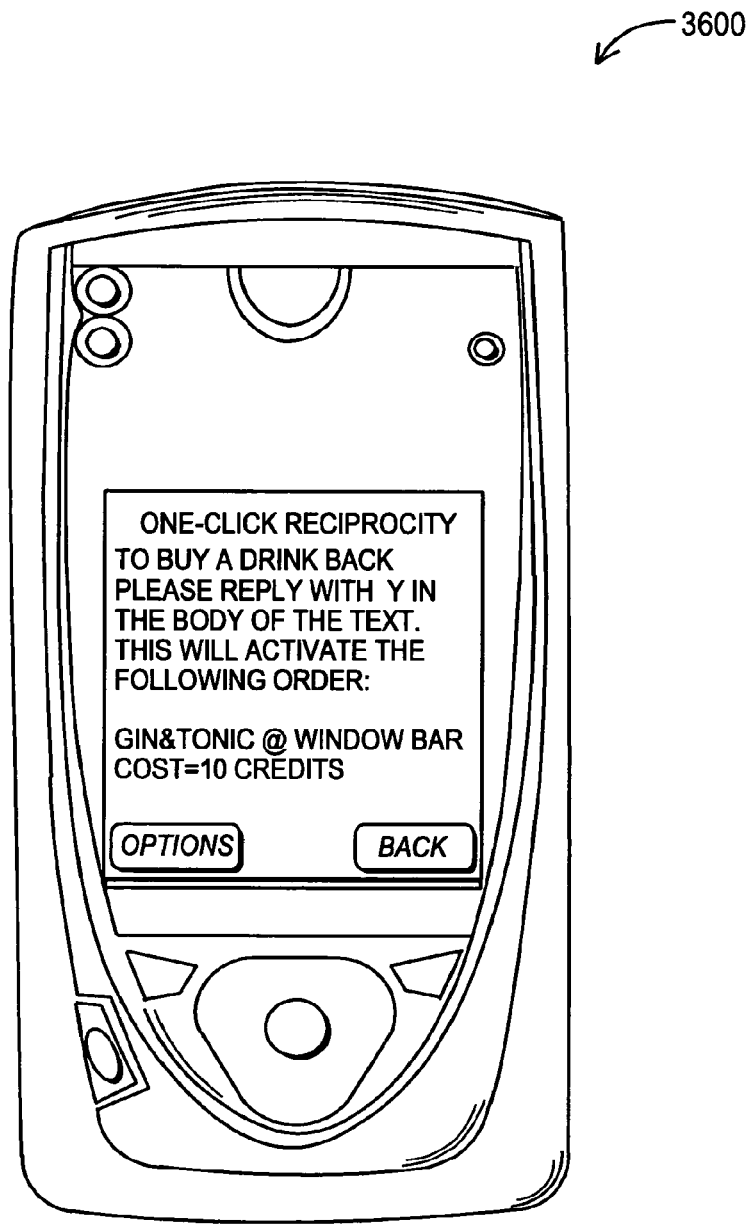
FIG. 36 is a screen view of an exemplary instant reciprocity message on a mobile telephone, in an exemplary system consistent with one embodiment of the present invention.

As shown in FIG. 4, for a fully connected device, the transaction process begins at block 401. The end user (in this case, the recipient, who will also be a purchaser for purposes of this transaction) receives and reads the message sent by the initial purchaser (who is about to become a recipient) at block 402 and is prompted at block 403 whether to return a drink with the instant reciprocity option (e.g., by toggling or clicking an option presented) bringing the transaction up for review, as illustrated in the exemplary screen view 3600 of FIG. 36. If the user chooses not to execute the instant reciprocity option, the process ends at block 404. If the user chooses to execute the instant reciprocity option, then at block 405 the user is presented with the preselected venue and/or product(s) for approval, and if user selects the option that the return order presented to the user is satisfactory, the process continues at block 407. If the return order is not satisfactory, the user inputs a new venue and/or product(s) at block 406, which may be accomplished, e.g., by the user changing the quantity, product or venue by clicking a change option next to each item presented on the user's display. At block 407, the user is prompted whether to add a message, in which case the user inputs a message at block 408. If the user chooses no to add a message, then the process continues at block 409. At block 409, the user confirms the transaction, and the process ends at block 410.

Figure 37:
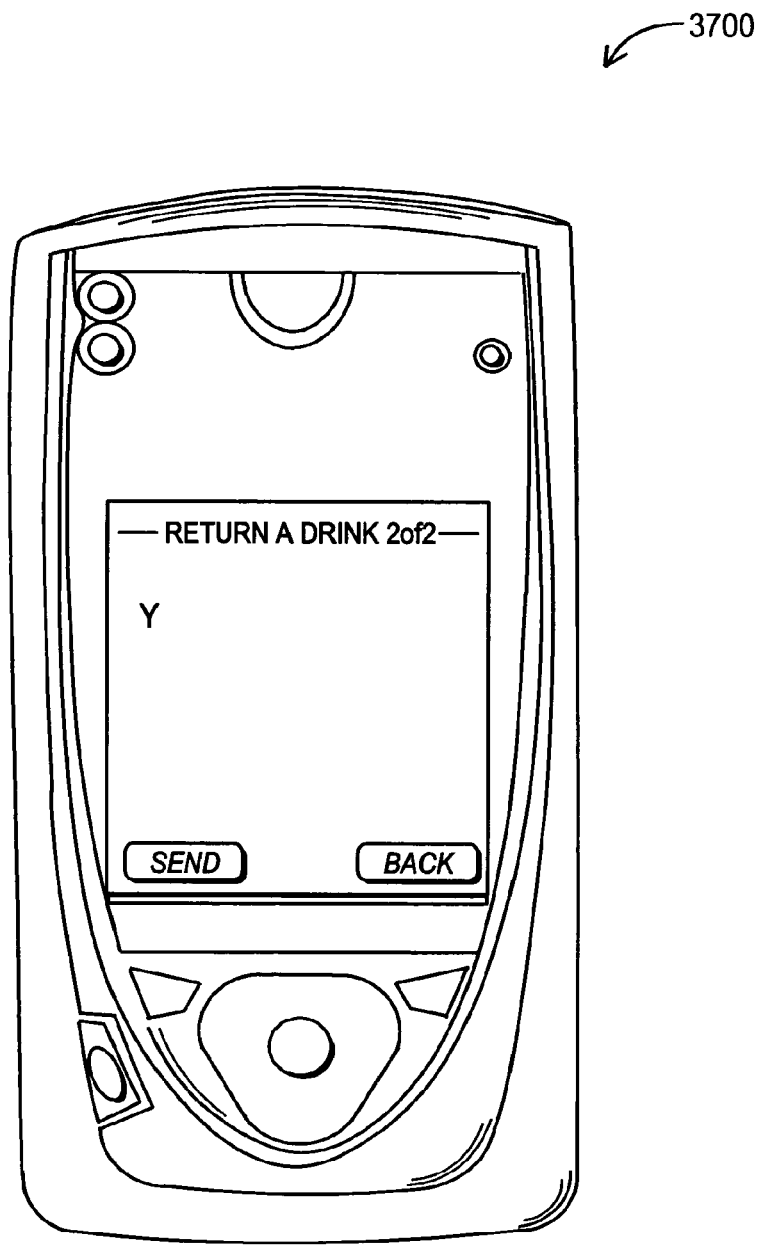
FIG. 37 is a screen view of an exemplary instant reciprocity user confirmation selection message on a mobile telephone, in an exemplary system consistent with one embodiment of the present invention.

As shown in FIG. 5, for a messaging-capable disconnected device, the transaction process begins at block 501. The end user (in this case, the recipient, who will also be a purchaser for purposes of this transaction) receives and reads the message sent by the initial purchaser (who is about to become a recipient) at block 502, (as illustrated in the exemplary screen view 3600 of FIG. 36. The user is then presented with a brief description of the instant reciprocity feature and is prompted at block 503 whether to return a drink with the instant reciprocity option (e.g., by toggling or clicking an option presented in the message) bringing the transaction up for review. If the user chooses not to execute the instant reciprocity option, the process ends at block 504. If the user chooses to execute the instant reciprocity option, then at block 505 the user is prompted to reply to the instant reciprocity message. The user confirms the transaction (e.g., by entering the letter "Y" for "yes" in the body of the return text message, as illustrated in the exemplary screen view 3700 of FIG. 37) at block 506, and the message is sent at block 507. The process ends at block 508. Alternatively, a URL, hyperlink, or other routine may be provided, whereby a single keypress or button click may be employed to activate an instance of instant reciprocity.

Prepopulation functionality, as described hereinabove, may also be provided for instant reciprocity information. Additionally, if text messaging or email is used to activate instant reciprocity, one or more of the following conditions may need to be satisfied: (1) the recipient is a registered user; (2) the original purchaser has indicated a drink and venue preference as part of his instant reciprocity settings and the original recipient has permission to see this information; and (3) the recipient has stored payment information with the system. In this scenario, it should be recognized that the system should desirably prompt the recipient to complete any data items still missing from the transaction (although, if all of the foregoing conditions are satisfied, then no items will be missing from the transaction and the order is ready for processing without further prompting by the system) and/or to change any prepopulated fields provided.

It should further be noted that if the original recipient has also attended to his or her instant reciprocity settings, the foregoing described process can be iterated endlessly, enabling the pair involved in the transactions to send products (e.g., drinks) back and forth in a ping-pong fashion. This iterative behavior may be slightly modified when the RFID find-a-friend feature (described in further detail hereinbelow) is implemented as part of the system. In this scenario, if the original purchase transaction is initiated by finding a friend, when it comes time for the original purchaser to return an instant reciprocity received from the recipient, the initial purchase will be repeated until the RFID find-a-friend registers that the original recipient has left the venue in which he or she had been.

Other Purchasing Variants

In certain exemplary embodiments, e.g., special purchasing variants may be provided, as follows:

For example, in a drink purchasing implementation, a "barhopping" feature may be provided, which would allow a purchaser to add additional venues and drinks to the basic purchase, thereby creating a barhopping itinerary. Additional functionality may be provided for making the itinerary random, wherein the next location is automatically randomly selected by the system, and a claim notification is sent out once the previous drink has been claimed. If the purchaser indicates that he or she wishes to set up a barhopping purchase, the basic venue and drink selection process would cycle until the purchaser indicates that the itinerary is complete.

As another example, a "group purchase" feature may be provided, e.g., for facilitating the purchase of drinks for a group of people at one venue. This may be achieved by using group information previously entered in the friends list, i.e., the purchaser can create groups similar to e-mail distribution lists. In this scenario, a special interface page would allow rapid assignment of drinks to individuals or for indicating that one menu selection should be given to all members of the group. The group purchase features may be combined with the barhopping features in a single transaction.

A further example is a "hint-hint" feature, which would allow an end user to schedule and send out a broadcast message (e.g., to a group of friends) inviting recipients to buy him or her a particular drink at a particular venue. Acting on the hint-hint would involve a process similar to that of instant reciprocity for registered users, but otherwise might require an expedited registration, wherein an offer to fill out a longer marketing registration would be sent to these users at a later point) before recipients can complete the transaction.

Still another example is a "brand purchase" feature, wherein a brand is any company that represents multiple venues, such as a chain of brewpubs, a line of cruise ships or a chain of hotels. An end user looking to make a purchase at one of these branded venues would be able to find any of these locations through the normal venue search, or alternatively, the end user would be able to click on a brand purchase icon, which would retrieve and display a list with all of the venues associated with the brand. Once the user has made his venue selection, the purchase transaction would proceed normally.

It is contemplated that a user might use a system consistent with the present invention to make a purchase for himself or herself, rather than for someone else, without requiring any additional functionality, simply by specifying the user's own email address, or phone number. Alternatively, a single franchise, e.g., a coffee chain, might operate a system consistent with the invention as a single-brand remote purchasing engine. Additionally, a virtual "shopping cart" or "basket" may be provided to permit a purchaser to arrange one or more purchases and thereafter provide payment information in a single instance, rather than having to do so for each individual product or service purchased. Such a shopping cart may further be configured to permit a plurality of products and/or services from a plurality of venues to be purchased in a single payment transaction.

Claims Notification and Redemption

A system consistent with the present invention may be configured such that a successfully completed remote purchasing transaction (as described hereinabove) generates a record in the system known as a claims record. Items associated with this record may include, e.g., the following data: claim number (set by system; next available claim record number), claim code (random multi-digit alphanumeric, numeric, or other claim ID used to claim the product), redemption venue ID (a pointer to the information about the venue where the product will be claimed), products information (information about the products to be claimed), purchaser ID (if they are a registered user, a pointer to the information about the sender, and if not, information describing the purchaser collected during the purchasing process), a message, including attached files (if the purchaser provided them), recipient name and/or ID number (if a registered user, a pointer to the information about the recipient, and if not, the information describing the recipient collected during the purchasing process), date/time of completed transaction, date/time claimed (blank field indicates an open claim), and purchaser/recipient interface types (for data mining).

Figure 8:
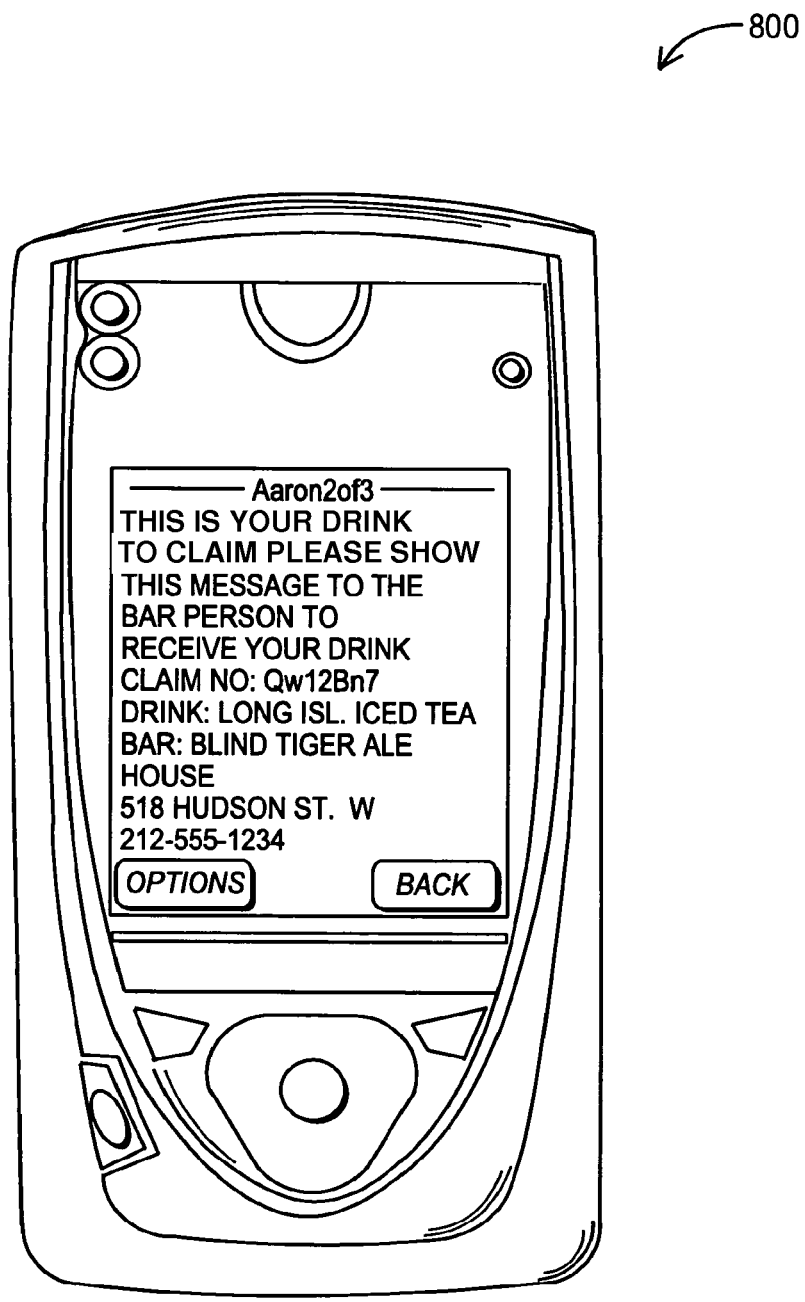
FIG. 8 is a screen view of an exemplary claims notification message on a mobile telephone, in an exemplary system consistent with one embodiment of the present invention.

The claims record may be used to build a number of different messages for delivery to various parties in the transaction. The messages may include, e.g.: a claims notification message (a message to the recipient that identifies what has been purchased to the recipient), the claim location (with all the information needed to claim the purchase), seek additional information or reply to the sender (as illustrated in the exemplary screen view 800 of FIG. 8), purchaser confirmation message (if the purchaser is different from the recipient, a message confirming that the system has successfully processed and dispatched the claim, including updating the purchaser's transaction history to show this new record), and delivery of claim to venue (a record delivered to the venue claims processing software in real or near-real time with the claim information; this information is automatically updated in the list of open claims that need redemption.

It is contemplated that, to claim the product(s), the recipient simply visits the venue to which the claim was attached and gives a member of the staff the claim code. The venue staff member checks the code against the record in venue claims software, provides the specified product(s) and selects the redeem option in the venue software to indicate that the claim has been processed (the venue client is described in further detail hereinbelow). In the event that recipient has lost or misplaced the claim, the system is configured so as to permit the venue to identify the recipient even without the claim code (In certain embodiments, the claim record may contain the name of the recipient, so that a recipient can make a claim by showing appropriate identification). In addition, both the sender and recipient can interact with the system to "regenerate" the claim by supplying the messaging address of the recipient (the "unredeemed claims" tab in the user interface is described in further detail hereinbelow). Uncollected claims may remain open and active for the period of time (e.g., 90 days) set by, e.g., the system administrator. The system may be adapted to periodically review and close unredeemed claims that have exceeded the preset collection period. The system may further be configured to send a reminder notice a certain number of days before a claim is closed, in order to remind the recipient to pick up their outstanding claim.

Venue Directory

One of the distinctive features of a system consistent with the present invention is the way it builds up and manages information about the venues participating in the system. This may be done in a distributed fashion whereby different users are responsible for inputting, managing and updating their own information. Because the effort of collecting and maintaining information in the system is broadly distributed, it becomes possible to provide up-to the minute information on such items as daily events (e.g., live music or the day's drink specials). Furthermore, the distributed approach increases the likelihood that venue information is accurate and that errors are rectified efficiently. As well, by pushing work out to system agents, the administrator saves time and resources, and can grow the directory quickly and organically.

System users (primarily end users) are able to look up venue records both for information purposes and as part of the purchasing process (as discussed hereinabove).

In one embodiment, the cluster of information about a venue that both describes it and is publicly accessible to all system users is called a listing. When a venue submits a registration to become a member of the system (described in further detail hereinbelow), a large part of this registration consists of items that will appear in the listing. The set of items that comprises a complete listing may be defined by the administrator (listing setup is further described hereinbelow). Some of these items may be preset and locked by (or under the auspices of) the administrator or consist of end user generated content which the venue will be unable to change. In general, however, it is contemplated that the venue would be responsible for the majority of items that appear in the listing. However, the listing may additionally include items generated by end users of the system, such as a rating (e.g., on a scale of 1-10; used to determine the top-rated or top 5% for each city), wherein such information should desirably be made non-changeable by the venue.

It should be recognized that a listing should typically not become active (and be publicly available) until the system administrator approves the venue's initial registration. After this initial approval, a venue can access and change venue modifiable items at any time via the venue web interface (this process is described in further detail hereinbelow).

As illustrated in the exemplary screen views 900, 1000 of FIGS. 9 and 10, items in the venue listing may include, e.g.: venue name, address, telephone, email (if any), nearest subway or bus stop (if any), website URL (if any), hours of operation, brief description, venue category information, products/pricing schedule (some may be preset and locked by administrator), daily event information (e.g., drink specials/ happy hour, events schedules), cover charge (if any), and admissions/other policies (21+ etc). Venue category information may be selected from lists preset by the administrator, and may include, e.g., type (club, bar, restaurant), typical patron type (frat boy, pretty girl), events types (live music, DJs), and awards (Michelin stars, reviews). It should be noted that, for certain fields, it may be desirable that only the system administrator be able to modify certain fields in the venue directory, e.g., the brief description of the venue.

In a system consistent with the present invention, other system users (primarily end users) are able to look up venue records both for information purposes and as part of the purchasing process (as described hereinabove). The system supports both a string matching quick search, and more precise searching in which search strings are tied to a specific field in the venue listing (as shown in the exemplary screen view 1100 of FIG. 11). As well, several views of the search results may be available, e.g.: alphabetical, by user rating, showing live events (if any) and showing specials (if any). Some of the fields associated with a venue may comprise user-generated content, e.g.: overall rating and the number of raters.

In an alternative embodiment, a system consistent with the present invention employing a distributed directory system may be used as a discount purchasing system. In this scenario, because each venue has distributed control over its own listing, including products/services being offered, the system could be used by individual stores as a means for moving excess inventory.

Additionally, multiple language support may be provided as an additional feature of these listings, as well as of any other portion of the system.

Marketing Campaigns

A system consistent with the present invention may include marketing campaign functionality that enables system users (dependent on user type and the parameters set by the system administrator) to engage in a wide variety of marketing activities directed at either/both end users and venues. Such activities include, e.g., generating "push" and "pull" marketing campaigns that target specific users or are activated by specific system-mediated event, and generating statistics or data mining reports on users and their transactions with the system, wherein such efforts may be tailored to specific circumstances that take into account factors such as demographics, locations, time, and device and platform information. The providers of such marketing and advertising services may operate as independent agents in purchasing, designing or using these services (e.g., as "Third-Party Marketers") and under the jurisdiction of the system administrator and various system parameters, including, for both end users and venues, "opt in" preferences that will modify the individual delivery of these marketing and advertising services to them. It should be recognized that all marketing and advertising activities in a system consistent with the present invention may be achieved via "marketing campaigns," i.e., marketing actions (or series of actions) undertaken by a system user and directed at end users and/or venues in the system. Additionally, a variety of statistical and data mining activities may be performed based on data accumulated through the use of marketing campaigns, as will be explained in further detail hereinbelow.

In an exemplary embodiment, campaigns are defined by three primary traits: (1) WHO, i.e., the target of the action(s); WHEN, i.e., when the action(s) will start and how long it will last; and (3) WHAT. Through the selection of a series of functional campaign blocks from among a set of available functional campaign blocks, the campaign creator builds a precise definition of the marketing action(s), including inputs and outputs. The concept of functional campaign blocks, as contemplated by the present invention, is best compared to the use of objects in object-oriented programming, wherein each of the functional campaign blocks, like objects, has a state and a set of operations to transform the state. A plurality of functional campaign blocks may be instantiated and concatenated to create a marketing campaign, as described hereinbelow. Alternatively, instead of using functional campaign blocks to construct a campaign, the campaign creator may have the opportunity to (or may be forced to) choose the campaign type from a list of pre-built campaign templates (e.g., provided by the system administrator).

Campaigns may be performed by many types of users, e.g., the system administrator, members (the companies providing products to venues, e.g., alcohol companies), venues (e.g., bars), and third-party marketers (other brands). Though the actions undertaken by these different types of users will be similar, several operational differences may exist. For example, only the system administrator should be able to view raw user data, and all other groups should instead see category totals or summary data. The system administrator should be able to view and modify all user campaigns using a "campaign manager" module that permits the administrator to view campaigns, e.g., by user and launch date, in addition to other views. Other user types should have their registrations approved by the system administrator before they are permitted by the system to perform marketing activities. Of course, different users will have different restrictions/pricing schedules on their marketing activities.

Figure 17A:
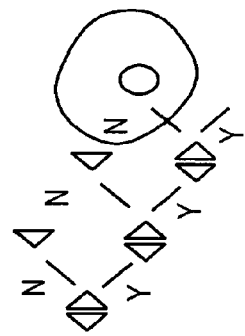
FIG. 17a is a screen view of an exemplary campaign manager screen, in an exemplary system consistent with one embodiment of the present invention.

As the exemplary screen view 1710 of FIG. 17a illustrates, the campaign manager may be embodied as a graphical "digital dashboard" through which system agents can view, search and edit campaigns, as well as create and schedule new campaigns. A campaign may be created from scratch using functional campaign blocks, by specifying the three primary traits: identify WHO the campaign will be directed at, define WHEN the campaign or campaign elements will launch and be in effect; and construct the WHAT of the campaign. In the exemplary screen view 1710, the campaign creator has already set the WHO and WHEN blocks of the campaign and is now working on detailing a WHAT block (circled):

In order to simplify and automate the process of defining the WHO, WHEN and WHAT of a campaign, the system may provide campaign creators with a series of functional campaign blocks which can be mixed and matched to create an endless variety of campaigns. An exemplary set of functional campaign blocks is provided in the following table:

| WHO | WHEN | WHAT |
| --- | --- | --- |
| External Initiation (Special registration check) | One-time | 1-Way Broadcast (this block can act as an "end codon" to a campaign) |
| Internal Initiation via Profile Construction (Variants: In response to campaigns, subgroups) | Ongoing | 2-Way Broadcast |
| Internal Initiation via End User Event | Repeat at Intervals | Encoded Form |
| Internal Initiation via Specific Users (Administrator only) | Date Range | Coupon for use during purchase (this block can act as an "end codon" to a campaign) |
| | Phased Date Range | Coupon for redemption at venue (this block can act as an "end codon" to a campaign) |

The WHO blocks indicate not only the targeted user but also who/what is responsible for first contact with those users. The WHO blocks may include external initiation, internal initiation via profile construction, internal initiation via end user event, and internal initiation via specific users.

In the case of external initiation, the agent conducting the campaign will make first contact with the targeted users via their own external channels. For example, a company might have a list of 200,000 SMS numbers and will broadcast a teaser message to those users that contains a link to an encoded form (see WHAT blocks hereinbelow) in the system. Because respondents to externally initiated campaigns may not yet be registered users of the system, externally initiated campaigns should have a unique entry URL where the respondent will be asked if they are already a system user. If not, they may need to fill out a short form registration before continuing on with the campaign.

In the case of internal initiation via profile construction, the agent builds a profile of the users who will be targeted for the campaign. The items available for selection as variables in the profile include items about users gathered during registration (such as sex and home city), items accumulated as a result of user activities (e.g., users who have made a transaction within the last 30 days, or users who have made a transaction at a particular venue X) and items accumulated as a result of previous campaigns (e.g., new variables about taste in watches captured by an encoded marketing form (see WHAT blocks below), or respondents to a previous campaign x). This last source of items for profiles has two special considerations for agents building new campaigns: first, as part of the profile, the agent will be able to select targets of a previous campaign at the level of respondents/non-respondents to the earlier campaign; and second, an agent may be allowed to divide the target population in subgroups so that different campaign texts or styles can be tested against one another for effectiveness. The agent may be able to make divisions based on random assortment or building sub-profiles. When a subgroup is created, the campaign elements are copied in and can then be filled out in parallel. A target profile may be constructed by using a dashboard-like interface in which profile categories (the data variables) are dynamically derived from the table labels in the system database. Exemplary table labels may include: city of residence, age, gender, primary messaging type, last transaction date, preferred brand of watch, respondents to prior campaign A, and nonrespondents to prior campaign A. Target profiles may be constructed in a two-step process: first, the agent selects a variable of interest (such as gender) to add to the profile; and second, the agent indicates the desired value(s) of that variable (e.g., male). For fully encoded items this choice may be presented as a pull-down list), and for numeric or string items, it may be an input field of the appropriate type and may include recognition of conditionals such as: >, =, <, and, or, includes. An agent may be able to select multiple variants of an encoded item that includes more than two choices. The foregoing two-step process is repeated until the profile is complete.

In the case of internal initiation via end user event, this kind of campaign is selected to reward or provide an incentive to end users for performing certain kinds of actions in the system. Several exemplary types of events may be chosen from upon selection of this option: activated registration (when a user has both registered and made at least one valid transaction); marketing registration (when a user completes his or her opt-in marketing registration, this can initiate a campaign that rewards him or her for this); transaction (transactions encapsulate goods, recipients and venues, and an agent creating a campaign specifies which transaction types and the number of times an end user should engage in that transaction type to initiate the campaign; this may be one way a company might perform a "buy 4, get the 5th free" campaign, or, the agent could create a campaign to reward people who make city-to-city transactions, etc.); and RFID proximity event (occurs when an end user carrying an activated RFID card enters or exits a venue (described in further detail hereinbelow).

In the case of internal initiation via specific users, the administrator (but desirably not other types of system users) can select specific users for a campaign.

The WHEN blocks indicate when the campaign will run, and the system logic desirably ensures that the selected WHEN is compatible with the WHAT of the campaign. the WHEN blocks may include: one-time (a one-off campaign, usually a message, and associated with a single date); repeated at intervals (when a one-time campaign will be repeated, wherein in addition to the start date, a repeat interval is specified in days); ongoing (campaigns that run continuously, associated with a start date); date range (campaigns that will run for a period of time, then end, associated with a start date and an end date); and phased date range (campaigns that will run in phases, and include start dates and end dates for each round of the campaign).

The WHAT blocks are used to build the core of the campaign and are similar to objects in object-oriented programming languages in that each WHAT block is "described" by variables whose values change in different "instances" of the block. The WHAT blocks may include 1-way broadcast, 2-way broadcast, encoded form, "use during purchases" coupon, and "redeem at venue" coupon.

For a 1-way broadcast, a message is sent to an end user that has no reply-to address, using, e.g., e-mail, MMS and/or SMS message types.

A 2-way broadcast is similar to a 1-way broadcast, except that this block includes variables defining where the response will go and how it will be processed.

An encoded form is a form accessed via a unique URL that the system provides. The encoding should be used to dynamically create new tables in the database that will enrich the information associated with various users. The encoding process may be expanded to include error-checking parameters associated with each form item. The form may include the following exemplary fields: general information (e.g., form title, which can be used as the database table label; co-sponsor logo; and number of questions) and information per question (e.g., question label, which may be used as the table column label; text of question; and answer encoding type with accompanying text, such as single answer-number, single answer-text string, and encoded list providing number of items and item labels). Exemplary screens for designing a survey 1200, 1300 are illustrated in FIGS. 12 and 13, and fields specified may include both general information and information per question. General information might include, e.g.: survey title (can be used as database table label), date survey goes out, date survey will be closed, rewards points (per question or for the survey as a whole), target specific user profile (otherwise survey will go to all users who have opted in), survey text (to go in the email asking the end user to respond), number of prizes (0 if none; any other value causes the system to select this number of end users who have completed the survey as winners); and cosponsor logo. Information per question might include, e.g.: question label (used as table column label), text of question, and answer encoding type (e.g., single answer-number, single answer-text string, and encoded list (provide number of items and item labels). By providing the foregoing information, the survey text may automatically be flowed into the encoded form design template and can be assigned its own unique URL, and an end user might see the survey as shown in the exemplary screen view 1400 of FIG. 14. Because of the tight encoding associated with surveys, each survey can be described as a new data table (or the extension of an existing data table) in the database. This new table will be dynamically linked to the existing user profile tables in order to expand the number of fields associated with each user. In addition, new table column headings may become available in the list of parameters used in future profile construction and data searching/mining/analysis operations (described in further detail hereinbelow).

A "use during purchase" coupon is an electronic message similar to a claim notification that has a unique coupon ID. It may represent a discount, e.g., of 10-100% off of some type of product and may be associated with a specific product and/or venue, though it need not be, e.g., in the case of external coupons. Coupons are not automatically applied, but are entered during a purchase transaction. This code can be checked to ensure that it has not been used yet, and that it fulfills the associated (if any) conditions for the items it represents. The discount then applied to a purchase price will be billed instead to the coupon issuer. Coupons are good for a time period set during coupon creation, e.g., 90 days. In addition, at the time of creation it can be specified whether a coupon can be used in the case where the recipient is also the purchaser. The number of coupons to issue can also be specified.

A "redeem at venue" coupon is a coupon for a non-system product (for example, a new alcoholic drink that is being promoted). Venue terminals may support the redemption of these coupons, which may include variables defining the venues at which the coupon will be accepted.

A wide variety of marketing activities are all attainable by combining functional blocks. The invention should not be construed as limited to the foregoing functional block descriptions, and it should be understood that new activities not specifically mentioned herein may simply be enabled by adding additional functional blocks to the set of those discussed hereinabove.

The system may alternatively or additionally be configured such that a user creating a marketing campaign provides information to the system by following a series of prompts or using pre-built campaign templates provided by the administrator, whereby the system determines the appropriate selection of functional blocks and automatically creates the marketing campaign. For example, information for which the campaign creator might be prompted to create an exemplary "push" campaign (as illustrated in the pre-built templates of the exemplary screen views 1600, 1700 of FIGS. 16 and 17) might include: campaign name (internal name for the campaign), target parameters (sets the parameters describing the target recipients), get estimate (provides estimate of the cost of campaign based on current statistics; result may vary from the estimate, especially in the case of a time differential between campaign creation and launch), set campaign cap (caps the price spent on campaign), set delivery date, set ongoing/one-time (if ongoing will set schedule of frequency), campaign type (plain text or html email/messaging, or both), campaign category-coupon or message, campaign text (fields for designing the campaign; these obey the limits, such as number of text characters, for the type selected above; a designer is able to cut and paste HTML and graphics into an HTML email text field), show preview (shows preview of campaign, including administrative wrapper that goes around all items), and how the campaign results will be processed. With regard to the method of processing the campaign results, the system may support the following exemplary options: set return address for response (can be URL), and no return address (response information included in message body as link or other). The system then takes all of the entered information, determines the appropriate functional blocks and values, and creates an appropriate campaign comprising of a set of functional blocks. For example, a template might be permitted for a venue to "push message (event notification) to recent patrons (last 30 days)". In this scenario, the template would automatically set the WHO to internal initiation via profile construction, selecting those patrons who have redeemed a claim at the venue in the last 30 days. The WHEN would automatically be set to one-time, but might still prompt for the date the message goes out. The WHAT block would automatically be set to 1-way broadcast. It should be noted that, although the template may automatically make block selections and preset some of the values for variables associated with the blocks, other items, such as the message text, may still need to be filled out by the agent selecting the template.

Another example of a marketing campaign might be a reward point program that allows participating end users to accumulate reward points which can be redeemed for various rewards may be created using "internal initiation via end user event" as the WHO block and "ongoing event" as the WHEN block, combined with a WHAT functional block designed to handle accumulation of reward points and, e.g., transmission of point balances and available rewards to an end user. In such a program, exemplary events triggering accumulation of points might include an end user completing a purchase transaction, a new end user registering, and completion of an opt-in marketing survey. It is contemplated that venues, third-party marketers and/or the administrator could all list rewards in the system, and for venues and third-party marketers, it may be desirable to have a monthly fee associated with posting a reward. The system may be configured to permit a venue or third-party marketer creating a reward to supply information such as that shown in the exemplary screen view 1500 of FIG. 15, and the system may use that information to select the appropriate functional blocks for constructing the campaign (rather than the venue or third-party marketer having to do so). As shown in FIG. 15, such exemplary information might include: program name (internal name for reward), reward name (name of the reward as it will appear in the rewards listings), reward description (description of the reward as it will appear in the listings), reward offered by whom, reward offered by logo (can be uploaded), reward first posting date (if the administrator is approving rewards, it is desirable for this date to be at least a week in advance of the present date), reward closing date, category class (from encoded list set by administrator), company class (from encoded list set by administrator), points to redeem the reward, and how the reward will be serviced. With regard to how the reward will be serviced, the system may support the following exemplary options: (1) to treat the reward points as a special transaction credit to the user and debit to the party offering the reward, wherein that credit can be bounded to a venue or an administrator "locked" product; (2) to connect the user to an external URL for redemption, wherein the end user's transaction ID can be forwarded to this URL and the system can support validation querying through an XML/SOAP API or similar protocol; in this case the party offering the reward will be responsible for reward redemption; or (3) send the user a reward coupon to their preset messaging address (it is desirable that this information NOT be passed on to the venue or third-party marketer), wherein each coupon has a unique ID associated with it, and the agent providing the reward may access/print an alphabetized list of IDs through its respective interface.

A further example of a marketing campaign might involve a "buy n get nth free" feature, which could be used by a brewing company to promote its beer by giving a user the $5^{th}$ beer at no cost after buying four beers. In this case, the WHO would be internal initiation via end-user event, wherein the transaction is associated with the particular brand of beer. The WHEN might be ongoing. The WHAT would be a single block, i.e., the "use for purchase" coupon set at 100% discount and associated with the corresponding brand of beer.

Data Mining, Searching and Statistical Analysis

It should be understood that campaign-based marketing activities, as described hereinabove, are desirably used to generate, augment and enrich stored data regarding the users of the system, to permit such data to be used for a wide variety of marketing purposes (i.e., that further generate and augment user data), thereby creating a feedback loop. Such data may be accumulated both via event-mediated activities of users, e.g., purchase history, or entrance into a venue (see RFID discussion hereinbelow) and via profile building activities, e.g., a user's profile data or answers to surveys.

A system consistent with the invention may support three exemplary main types of data mining, searching and statistics functionality: (1) data searching (or mining) that identifies a subset of users based upon search criteria set by the user (as used, e.g., in creating a marketing campaign, as described hereinabove), (2) descriptive and comparative statistical analysis (including graphical representations) of system data, and (3) predictive analysis and mining of system data to identify undiscovered relationships and perform basic forecasting.

It is contemplated that a system consistent with the invention may accumulate three types of interrelated raw data for storage in one or more databases. This data includes user data (descriptive data directly associated with a user of some kind, e.g., registration information on users, and venue listings information); transaction data (records associated with transactions, which records are linked with user data through the users and venues that participate in each transaction); and campaign data (a specialized form of user data including which users were contacted or participated in various campaigns, and for campaigns using encoded forms, the new user data associated with that form).

In addition to the user data collected on registration and through transactions, the database schema may include various internal data sets associated with users in order to facilitate the data mining process. Such variables may include, e.g.: for end users, date of registration, date of most recent activity, total transactions initiated, total transactions received, date of last marketing activity received, and date of last marketing activity responded to; for venues, date of registration, date of most recent system activity, date of most recent transaction, and total transactions processed; and for members and/or third-party marketers, date of registration, date of most recent system activity, date of most recent transaction, and total transactions processed.

Data searching (or mining) that identifies a subset of users based upon certain search criteria: In its simplest form, the identification of a subset of users based upon search criteria is not really data mining at all as much as a search of database records. An element of mining does, however, enter into more complex searches, where the agent performing the search may choose to treat the search criteria as a "profile" that will serve as the basis for including/excluding records using data mining techniques. Data searching may take place under two exemplary circumstances, depending on the end user: In the first case, a venue, third-party marketer or administrator wishes to engage in a marketing campaign, as described hereinabove. In the second case, the administrator wishes to isolate a subset of the data for analysis. The architecture may support the export of this data as either an ASCII, tab-delimited file (or other common data file type). In both cases, the agent performing the search will construct a "target profile"

by selecting from any of the data variables (labels) in the system. The list of variables might include the following exemplary data: venue location (geographic data, e.g., town/city), purchaser demographics (e.g., age, primary messaging type), recipient demographics (e.g., language, sex), and transaction information (including time/chronographic data, e.g., time sent, redemption time). Target profiles may be built in a two-step process (which may be done, e.g., using the campaign manager): First, the agent will select a variable of interest (such as gender) to add to the profile. Then, the agent will indicate the desired value of that variable (such as male). For fully encoded items this choice will be presented as a pull-down list; for numeric or string items, it will be an input field of the appropriate type but will also recognize conditionals such as: >, =, <, and, or, includes.

Descriptive and Comparative Statistical Analysis: Once a data set has been isolated, the system may support the generation of descriptive and comparative statistics (especially graphical representations) on the basis of this data. Such analysis may take place under three exemplary main circumstances: (1) venues, third-party marketers and the administrator planning a marketing campaign are able to view summary statistics showing the total number and percent of records that matched the search profile, as well as the number and percent of records matching each of the search items; (2) venues, and third-party marketers are able to examine a fixed set of summary statistics regarding their own transactions (such as claims transactions or the results of an advertising campaign) in the system, and may be able to compare those results against an average baseline; and (3) the administrator is able to perform direct statistical analysis of the data or a selected subset of the data. This functionality may include, e.g.: univariate and multivariate correlation analysis; graphing of univariate/multivariate data including distribution of Y and time series plots; fit Y by X modeling; multivariate fit modeling (regression and nonlinear analysis); and time series analysis, including forecasting models.

Predictive Analysis and Mining of Data: The system may also support predictive analysis and mining. Some of the following exemplary data mining techniques may be supported: dependency detection and prediction techniques (identifying relationships, especially dependent ones, from among the data), classification and clustering (isolating distinct segments and groups from the data on the basis of driving variables), market basket analysis (processing transactional data in order to find those groups of products that are sold together well; one also may search for directed association rules identifying the best product to be offered with a current selection of purchased products; and deviation detection (a task of determining the most significant changes in some key measures of data from previous or expected values). This type of analysis may take place under the following exemplary circumstances: by the administrator to better identify trends and patterns in the data as well as to make forecasts about transactions; and to generate recommendations of various kinds (e.g., to end users as a "recommend one" feature to help locate venues they would like based on their profile; to venues to recommend the number/type/price of products to include for sale through the system; or to users engaged in marketing activities to suggest potential targets for a greater chance of success).

Alternatively or additionally, further export functionality may be provided, to permit certain users (e.g., the system administrator) with functionality related to viewing, isolating, analyzing and exporting specific sections of data for mining or analysis in other, e.g., statistical, software packages. This functionality may include providing various users with pretabulated (and/or graphed) statistics, dynamically using column labels for use in marketing campaigns initiated via profile construction, allowing the system administrator to search, view and export a subset of data via a similar process of profile construction (e.g., as ASCII or tab-delimited files), and allowing the system administrator to view items in the database directly.

RFID Location-Based Services

Radio frequency identification (RFID) systems represent a relatively new, non-line of sight alternative to traditional identification systems, e.g., barcode and barcode reader systems. A basic RFID system comprises three components: an antenna or coil, a transceiver (with decoder), and a transponder (RF tag) or other "token" electronically programmed with unique identification information. The antenna emits radio signals to activate the tag and read and write data to it. Antennas are the conduits between the tag and the transceiver, which controls the system's data acquisition and communication. Since antennas are available in a variety of shapes and sizes; they can even be built into a doorframe to receive tag data from persons or items passing through the door. If constant interrogation is not required, the field can be activated by a sensor device. Often the antenna is packaged with the transceiver and decoder to become a reader (a.k.a. interrogator), which can be configured either as a handheld or a fixed-mount device. The reader emits radio waves in ranges of anywhere from one inch to 100 feet or more, depending upon its power output and the radio frequency used.

When an RFID tag passes through the electromagnetic zone, it detects the reader's activation signal. The reader decodes the data encoded in the tag's integrated circuit (silicon chip) and the data is passed to the host computer for processing. RFID tags come in a wide variety of shapes and sizes. Animal tracking tags, inserted beneath the skin, can be as small as a pencil lead in diameter and one-half inch in length. The tags are categorized as either active or passive. Active RFID tags are powered by an internal battery and are typically read/write. Passive RFID tags operate without a separate external power source and obtain operating power generated from the reader. Passive tags are consequently much lighter than active tags, less expensive, and offer a virtually unlimited operational lifetime, although they have shorter read ranges than active tags and require a higher-powered reader. Read-only tags are typically passive and are programmed with a unique set of data (usually 32 to 128 bits) that cannot be modified. Read-only tags most often operate as a license plate into a database, in the same way as linear barcodes reference a database containing modifiable product-specific information.

RFID systems are also distinguished by their frequency ranges. Low-frequency (30 KHz to 500 KHz) systems have short reading ranges and lower system costs. They are most commonly used in security access, asset tracking, and animal identification applications. High-frequency (850 MHz to 950 MHz and 2.4 GHz to 2.5 GHz) systems, offering long read ranges (greater than 90 feet) and high reading speeds, are used for such applications as railroad car tracking and automated toll collection. However, the higher performance of high-frequency RFID systems incurs higher system costs.

The significant advantage of all types of RFID systems is the noncontact, non-line-of-sight nature of the technology. Tags can be read through a variety of substances such as snow, fog, ice, paint, crusted grime, and other visually and environmentally challenging conditions, where barcodes or other optically or magnetically read technologies might be useless.

RFID tags can also be read in challenging circumstances at remarkable speeds, in most cases responding in less than 100 milliseconds. The read/write capability of an active RFID system is also a significant advantage in interactive applications such as work-in-process or maintenance tracking. Though it is a costlier technology (compared with barcode), RFID has become indispensable for a wide range of automated data collection and identification applications that would not be possible otherwise.

As implemented in a system consistent with the present invention, RFID technology may be used, e.g., to expedite claims processing, provide a location-based service (i.e., "find a friend"), and to permit an RFID card to be used as a credit card.

Figure 17B:
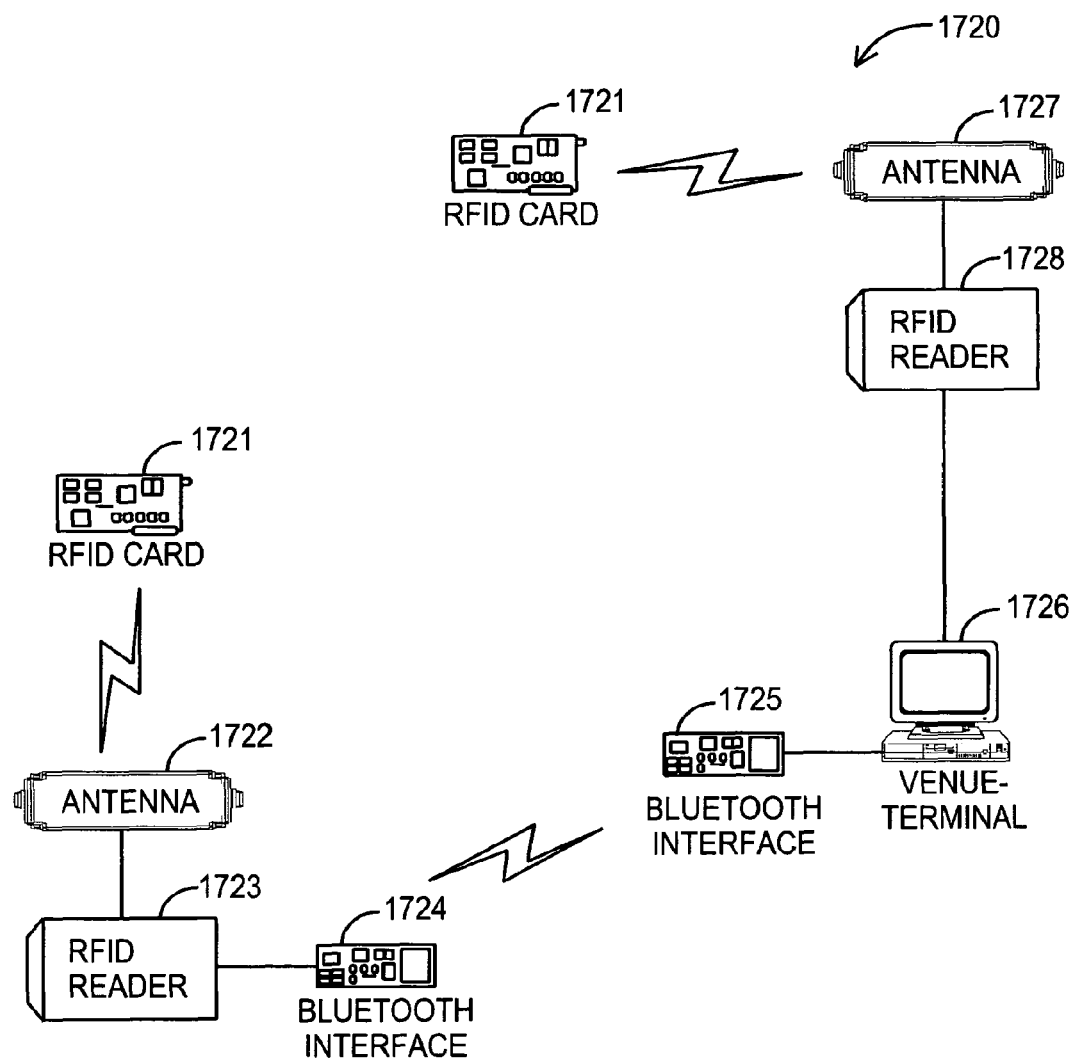
FIG. 17b is a system architecture diagram of an exemplary remote purchasing system incorporating RFID technology, consistent with one embodiment of the present invention.

FIG. 17b illustrates an exemplary system 1720 for RFID implementation for a single venue, in one embodiment of the present invention. As shown, the system includes a venue claims terminal 1726 (described in further detail hereinbelow) and a remotely located RFID reader 1723 having an antenna 1722. Bluetooth interfaces 1724, 1725 are provided for both the venue claims terminal 1726 and RFID reader 1723, so that these devices can wirelessly communicate with one another. The RFID reader 1723 and/or antenna 1722 may be placed near a doorway at the venue, so as to capture the comings and goings of end users carrying RFID cards 1721. In this scenario, after reading the cards 1721 of people coming in and going out, the RFID reader 1723 then transmits that information to the venue claims terminal 1726, e.g., using a Bluetooth connection. The venue claims terminal 1726 in turn can then upload or download this information to the central system (not shown), as needed. It is contemplated that an additional RFID reader 1728 and antenna 1727 having an extremely short range may further be supplied to the venue claims terminal 1726, e.g., to permit a patron to hand his or her RFID card to the bartender, who can wave it in front of the additional RFID reader 1728 to retrieve the patron's claim or to charge to the patron's card by using it as a proxy for his or her stored credit card or other payment method. Passive RFID cards 1721 would need to be distributed to end users, which may be facilitated, e.g., through various promotions, such that the RFID card 1721 acts as a token that identifies the user to the system. The user may have to enter a number printed on the card to "activate" it and/or specify user preferences (e.g., whether the user wants the card to be useable with the "find a friend" feature). This number, which is then read from the card, can then be linked to a particular user. In certain embodiments, data could also be written to the card, although only being able to read data from the card is sufficient to take advantage of basic RFID functionality.

In order to speed up claims processing even further and eliminate the need for end users to carry claim codes around with them, the use of RFID can shift the identification process to the card carried by the end user, such that when the user wishes to claim a product (e.g., a beverage) or service, he or she simply hands the venue employee (e.g., bartender) his or her RFID card 1721. The venue employee waves the card in front of the short-range reader 1727 at the venue terminal 1726 and this will retrieve any outstanding claims without data input, thereby increasing the convenience for both parties. For this feature to work most efficiently, the claim information downloaded by the venue claims terminal 1726 should desirably include the card ID of the recipient (when there is one), so that the central system only needs to be queried in the case that there are no matches for that ID.

The use of RFID in a system consistent with the invention can also enable location-based services, by combining the networked venue claims terminals 1726 with RFID technology installed in participating venues. The configuration of such services includes the RFID reader 1723 positioned near the door of the venue, which notes the entrance and exit of end users who are both carrying their RFID card 1721 and who have agreed to participate in location-based services. The RFID reader 1723 relays (e.g., via Bluetooth) this information to the venue claims terminal 1726, where it is further relayed to the central server (not shown), establishing a complete "map" of which individuals are in which venues in real or near-real time. To protect user data privacy, the system may be configured so as not to store such information permanently and/or to overwrite or erase location data relating to an individual when the RFID sensor 1723 reads the card ID for the second time, indicating the individual has left the establishment.

Further functional protections for end users may be inherent in the setup and operation of the system, e.g., if a user does not sign up for or carry their RFID card 1721 with them, they will not be visible to the system (although other methods may be provided for "logging in", e.g., by having a bartender swipe the RFID card 1721 at a venue claims terminal); in addition, the card may have information providing multiple ways for a user who has signed up for the service to toggle this feature on and off, e.g., an SMS number to which a user can send a message from the phone indicated as his or her phone messaging address, which would trigger an SMS reply showing the changed status of the service; or alternatively, the WAP end user menu may be configured to allow an end user to turn on and off location services; or alternatively, the web end user menu may be configured to allow an end user to turn on and off location services.

A "map" based on RFID location information may be used in a system consistent with the invention to provide other services. For example, location-sensitive promotions may be used, such as a greeting or coupon sent to an end user when they enter a particular venue. These promotions may be ongoing campaigns triggered by an RFID proximity event (marketing campaigns are described in further detail hereinabove). For other registered users who have the ability to see someone's location, the ability to "find a friend" or see what friends are actually out at the moment may be provided. This feature may be accessible, e.g., under the friends tab of the end user web interface and the "find a friend" link in the end user WAP interface. In addition to seeing where a friend is, the end user may, of course, initiate an expedited purchase for this friend at their current location.

Moreover, an RFID card may be useable as a credit card in a system consistent with the invention, wherein, instead of ringing up a purchase on their own system, the venue employee would indicate the total charge on the venue claims processing terminal. In this configuration, the end user would desirably have to both carry the card into the venue and have a credit card on file with the system. Just as with a traditional credit card, those venue claims terminals that run in a "disconnected" (e.g., dial-up) mode would have to check with the system to make sure a credit card is both stored and valid.

It should further be noted that a permissions system may be used to define strictly which end users have access to location information for friends or other users, i.e., whether they are able to view data associated with a given end user, such as Instant Reciprocity information or RFID location information for the user whose information will be shared. Since the present invention contemplates that an end user can use a WAP mobile phone to communicate with the system, when the end user logs into the web interface, new permissions requests from other users may be displayed, and a return email or SMS message, or clicking on a link provided, may be used to grant permission. Email reminders may be provided when there have been one or more permissions requests outstanding for a period of time, e.g., two weeks. A secondary matching procedure may be necessary to address potential synchronization problems. For example, if a user has a friend in her friends list who has registered with the system using different messaging addresses from the ones the user has entered, trying to match the messaging address would result in failure. The secondary matching procedure would use alternative data, such as a name match and/or the friend's having bought or received a claim from the other user. It is further contemplated that there may be situations where the system could generate permissions requests automatically, which could be a user-selectable setting, e.g., a user might want to request permission to see anyone for whom the user buys a drink. In certain embodiments, a user may be able to request permission from another user only a certain number of times or at a certain interval. A permissions request can either be pending, granted or denied. Once permissions have been granted, it the "grantor" would have the ability to revoke sharing permission as well.

Further RFID card functionality may include features for activating and/or requesting an RFID card to use with the system. It should also be recognized that other user identification devices may be used in a system consistent with the invention, e.g., an account or identification number, a charge/credit/debit card, a loyalty/affinity card, a customer identification card, a wand or tag, or even a driver's license.

While the location-based services as described herein are described as implemented using Radio Frequency IDentification (RFID), it should be recognized that alternative location-based methodologies may be used in a system consistent with the invention, e.g., Global Positioning System (GPS) or other wireless location services, e.g., BLUETOOTH®, 802.11 or mobile telephony tower-based triangulation. Tokens (i.e., devices) for RFID or other wireless technologies that may be used with a system consistent with the invention include chipless tags, coil-on-chip devices, contactless smart cards, key fobs, and even mobile telephones. Thus, it is contemplated that many types of tokens and token detectors employing a wide range of technologies may be employed in a system consistent with the present invention.

System Administration

Figure 19:
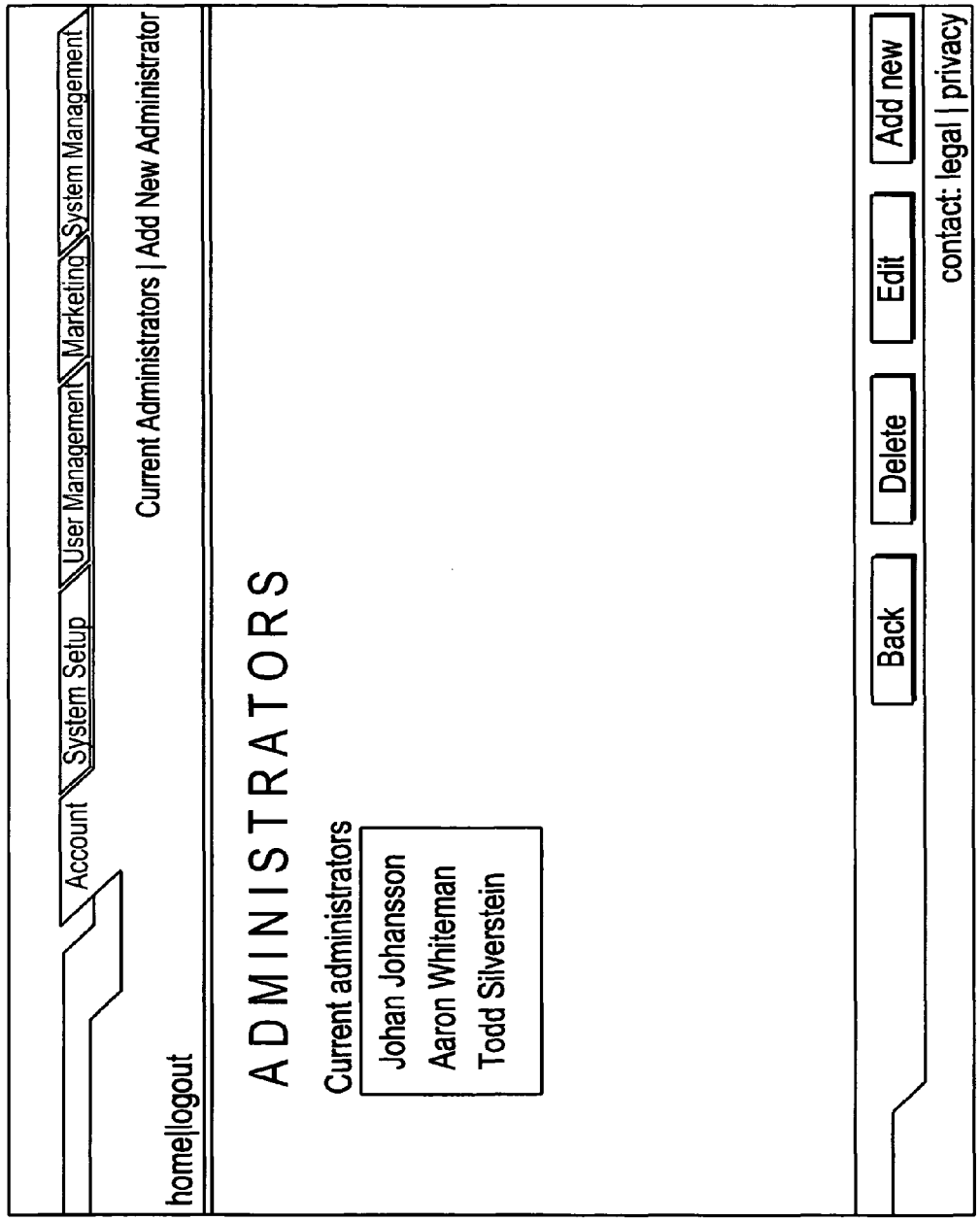

It is contemplated that a system administrator controls the structure and operating parameters of the system as well as daily system operation and management. For day-to-day system operations, the system administrator may access most functionality directly through a web interface. The interface may be organized into five main categories (as illustrated in the exemplary screen views 1800, 1900 of FIGS. 18 and 19): account (which includes editing/deleting current administrators, and name and password, and adding a new administrator), system setup, user management, marketing/mining, and system management.

Figure 20:
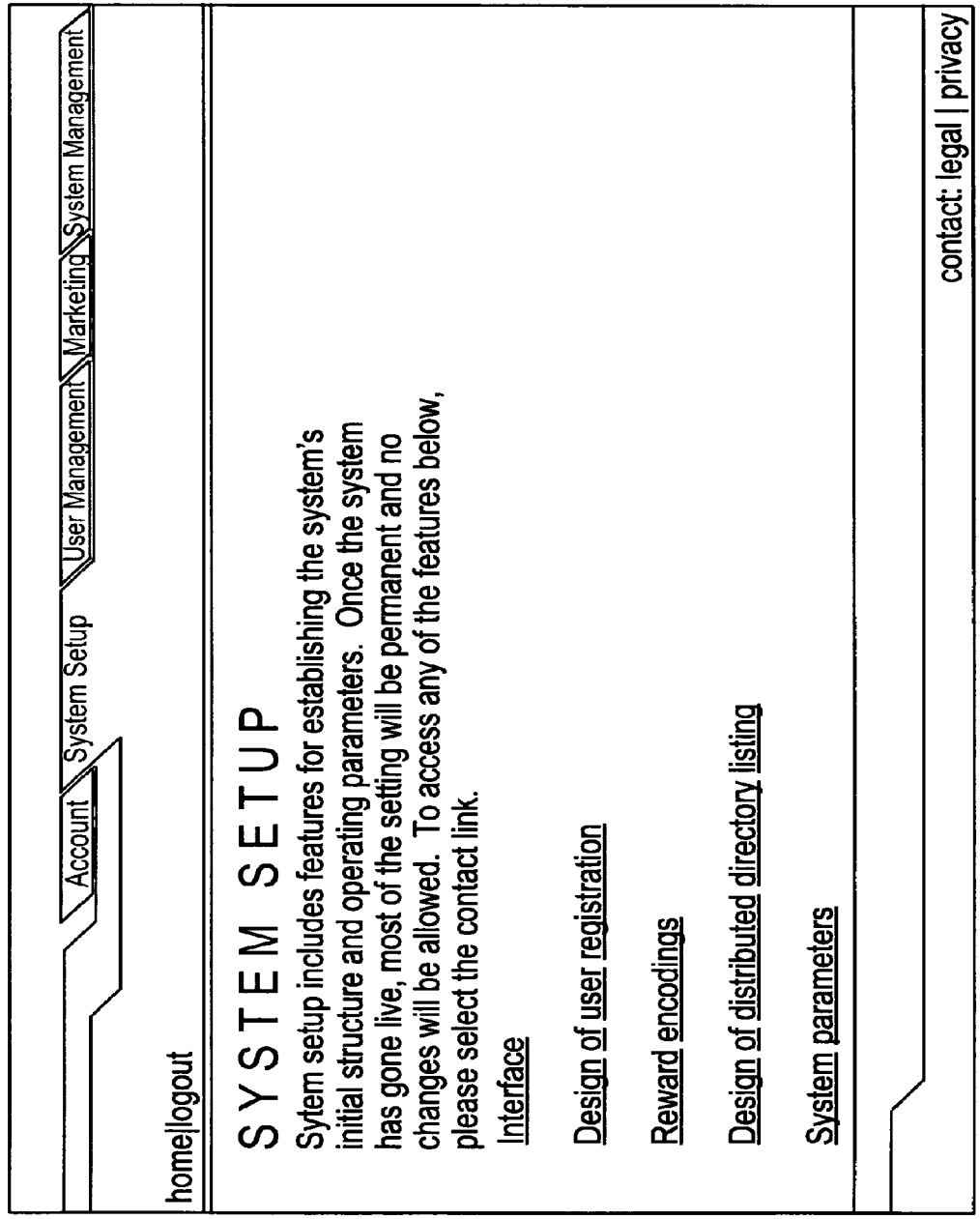
FIG. 20 is a screen view of an exemplary system setup screen, in an exemplary system consistent with one embodiment of the present invention.

System setup may include features for a system administrator to establish the system's initial structure and operating parameters, and once the system is operating, most of these settings will not be able to be changed. Exemplary features (as illustrated in the exemplary screen view 2000 of FIG. 20) include: interface, design of user registrations, design of distributed directory listing, and system parameters. The system interface may have an editable style sheet, color palette and logo area, and options may be provided for editing the style sheet, color palette, and logo (including uploading a new logo and choice of placement). Design of user registrations may include functionality for the administrator to construct registrations for each user type by selecting from a list of supported fields. In the case of the end user, there may be two registrations, one to use the system and a separate registration for the rewards program. Custom fields may also be supported. In addition to selecting and ordering the fields, the administrator may provide the following exemplary information for each field: whether the field is required on registration; for numeric fields, minimum and maximum values (if any), for text fields, minimum and maximum number of characters, and for encoded fields, and number of responses and labels. For the design of distributed directory listing, the administrator may construct a directory listing by selecting fields from a list. Venue items in the listing may automatically be included in the venue registration. The system may also support custom listing fields. The following exemplary information may be provided for each item selected: if not implicit, the user type who can modify this field; certain fields associated with encoded responses that may require the administrator to set the number of encoded responses and attach labels to the responses; for custom fields, the administrator may have to supply the field name, the data type and associated encodings if any; whether the field will be preset with a response, and if preset, whether it is locked; whether the item is required or not; and an important part of this process will be structuring the fields describing the products that can be purchased through the system. The administrator may encode the product subcategories. When a slot for a product is added to the listing, the administrator can attach it to a particular subcategory or let a venue put a product of any type into the field. System parameters (which may be subdivided into general, campaign, purchase, and account parameters) may also be set by the administrator. For example, general parameters might include countries banned from participating in the system. Campaign parameters might include the total number of open campaigns allowed, the days in advance all campaigns must be scheduled (so that the system administrator can receive each campaign mailing in advance of the community), and for each user group (venue, member, third-party marketer), the number of campaigns allowed per individual, the base cost per person per campaign for MMS, SMS, and e-mail, and the additional cost per variable for MMS, SMS, and e-mail. Purchase parameters might include the surcharge per transaction, the length of time in days before an open claim is closed (90 days), the number of days before a claim is closed to send reminder notice (i.e., 0 days means no notice will be sent), and the number of bad transactions (or bad cards) before an end user is banned from the system. Purchase parameters may also include, for those users who are new (e.g., in the first month of service), a cap on the user's first transaction, a cap on any single transaction thereafter, and a cap for total purchases in a 48-hour period; and for users who do not store cards on file but have made a purchase that cleared more than a month ago, and a cap for any single transaction, a cap for total purchases in a 48-hour period; and for those users who have stored cards on file and made a purchase with the currently stored card more than a month ago, a cap for any single transaction and a cap for total purchases in a 48-hour period. Account parameters may include, for each user group (venue, member, third-party marketer), the registration fee (if any), monthly fee (if any), the frequency of account reconciliation (probably every 2 weeks), the minimum value of an account balance to lead to a transaction, the maximum coupon debit allowed (coupons may be good for up to, e.g., a maximum of 90 days), and the maximum outstanding account balance (wherein, when exceeded, either immediate reconciliation or a freeze on account might occur).

Figure 21:
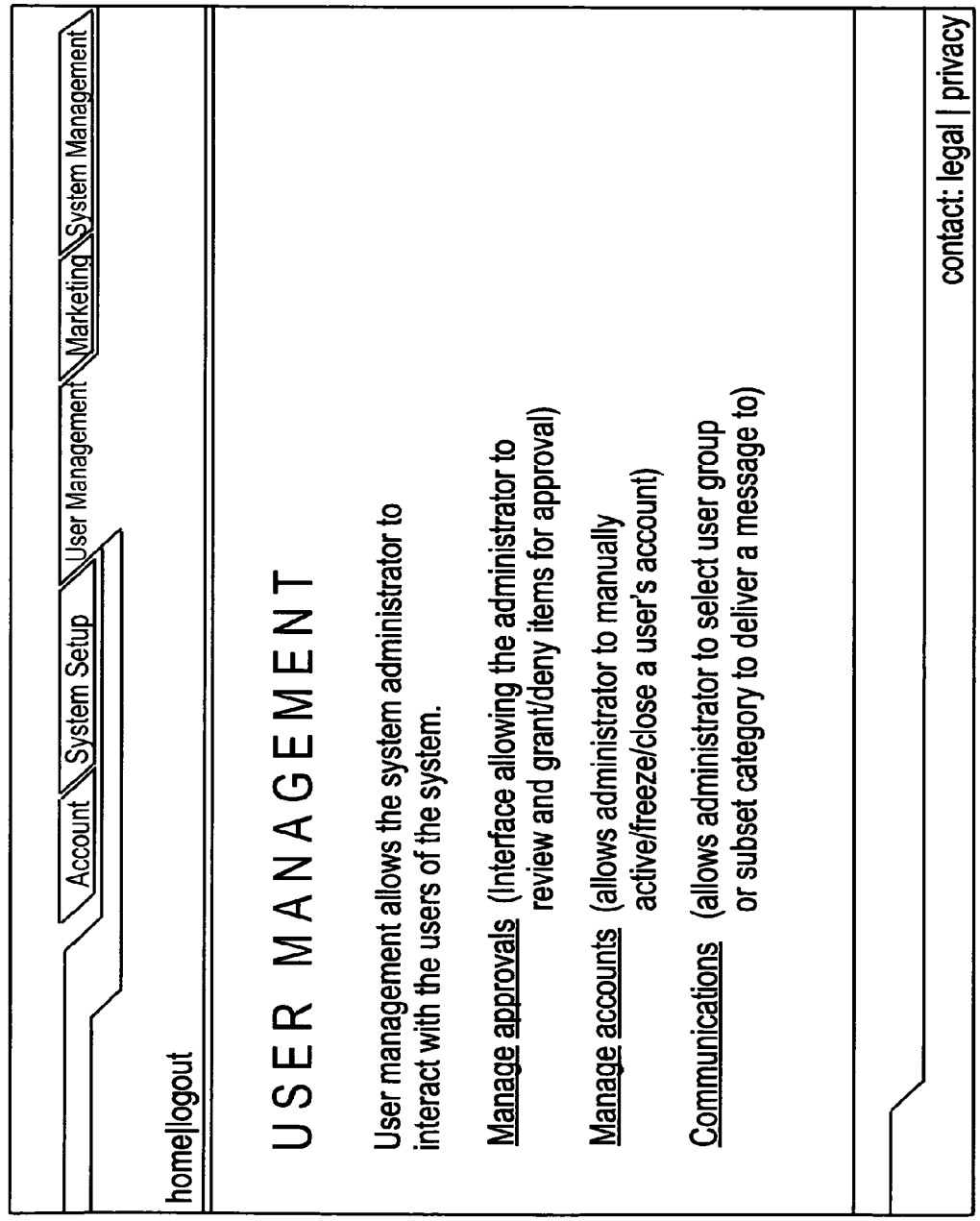
FIG. 21 is a screen view of an exemplary user management screen, in an exemplary system consistent with one embodiment of the present invention.

User management functionality may include the following exemplary features for interacting with system users (as illustrated in the exemplary screen view 2100 of FIG. 21): manage approvals (an interface allowing the administrator to review and grant/deny items for approval that can be viewed by category/type, e.g., venue/third-party marketer registration, push campaigns, rewards, closing of accounts), manage accounts (an interface allowing the administrator to manually activate/freeze/close a user's account, wherein a deactivated account will fail at login; in addition, there may be a list of banned messaging addresses, wherein if the address corresponds with a user account, the account is automatically frozen), and communications (an interface allowing the administrator to select user group or subset category to deliver a message to, wherein messages are be processed to the default messaging contact address associated with the user record).

Marketing and mining functionality may include the following exemplary tools for marketing to users and mining system data (as illustrated in the exemplary screen views 1200-1600 of FIGS. 12 through 16): promotions (including an itemized list of promotions, wherein the user can view active or all, and can modify a service that has not been delivered, delete/cancel a service that has not been delivered, user the service as a template for new, and view summary statistics for services that have been delivered), create a new promotion as either a push campaign (specifying a coupon, message and/or survey) or a reward system, and data mining (including capabilities to view/search data, export data, and perform analysis and mining (described in further detail hereinbelow).

Figure 22:
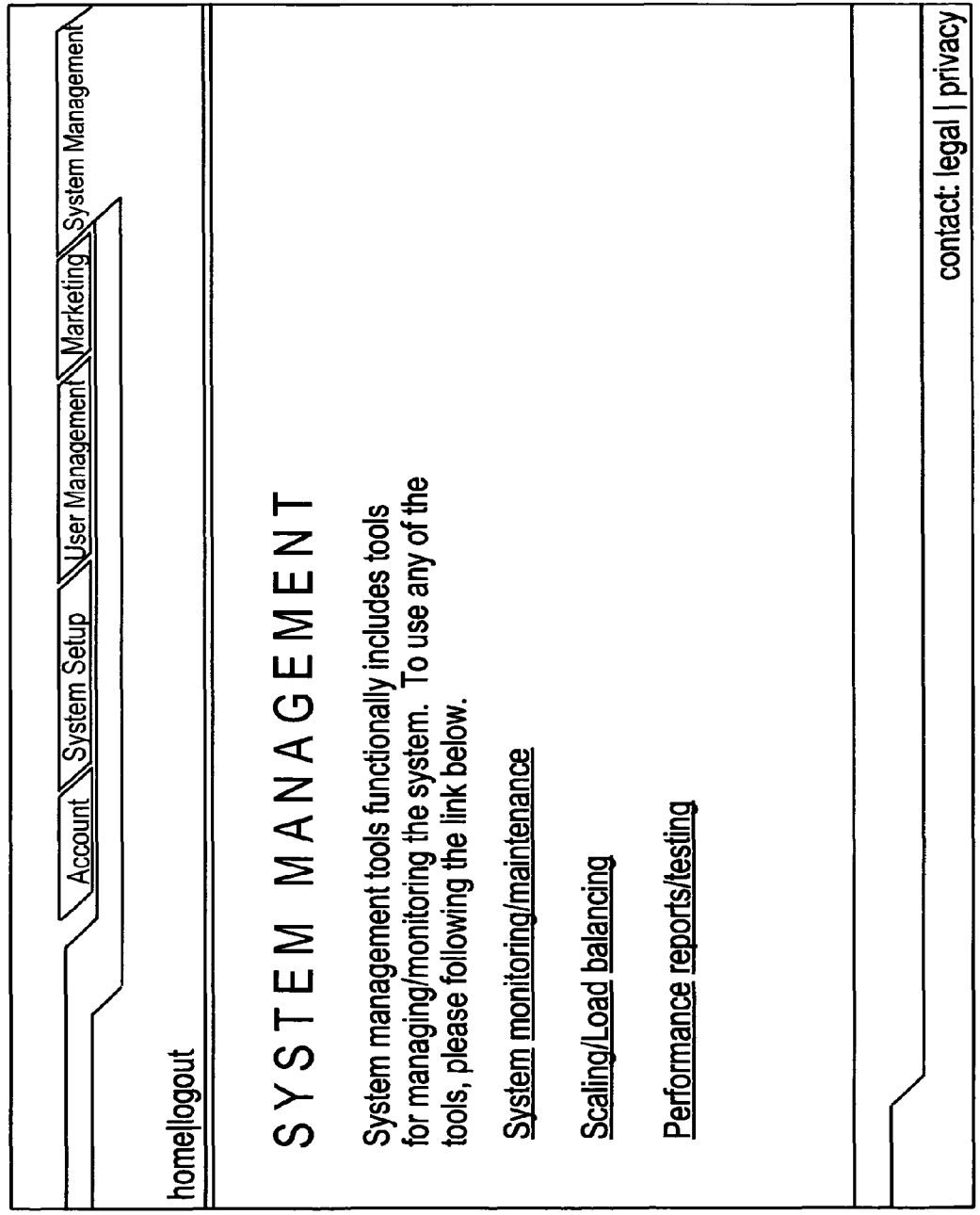
FIG. 22 is a screen view of an exemplary system management screen, in an exemplary system consistent with one embodiment of the present invention.
Figure 23A:
FIG. 23a is a screen view of an exemplary legal drinking age certification screen, in an exemplary system consistent with one embodiment of the present invention.

System management functionality may include the following exemplary tools for managing/monitoring the system (as illustrated in the exemplary screen view 2200 of FIG. 22): system monitoring/maintenance (allows the administrator to check uptime and performance/responsiveness of server software, communications with venue client software, and messaging and system activity; maintenance functionality may allow system components to be taken offline without affecting other components), scaling/load balancing (a setting that allow for load balancing and scaling of the system across multiple machines), and performance reports/testing (system performance or responsiveness testing modules).

In the case of a self-host business model, the system administrator may be responsible for selecting and integrating third-party solutions to the system. Of course, the system administrator is likely, in most cases, to have access to the core system code and hardware, thereby enabling an administrator that wants to add functionality or equipment to the system directly to do so by modifying the codebase or system equipment.

Payment Processing, Billing and Reconciliation

Several kinds of financial transactions may take place in a system consistent with the present invention, and it is contemplated that such a system may handle payment processing for purchases or various system fees, or alternatively, that such functionality is handled externally, or by a third-party provider. System fees may include, e.g., one-time registration fees and/or ongoing monthly fees. User may also incur fees as they buy services and when coupons they have issued are used by end users during transactions. Likewise, account balances may be kept for venues, which may be credited for goods they provide and may be paid by the system. It is contemplated that such venue accounts would be reconciled biweekly, and funds transferred if the owed balance is higher than a level set by the administrator. At the time of reconciliation, the system may also generate an e-mail to the venue indicating which products have been given out to assist the venue with reordering supplies.

In general, during reconciliation periods, it is desirable that the system would bill a credit card associated with an account for debits and to credit that card (or perform an electronic fund transfer) to accounts with credits in order to minimize human interaction. In certain embodiments, it is possible in the case of members and third parties that invoices would have to be generated and payments collected manually, and in this scenario, the administrator is provided with a mechanism for manually adjusting balances to reflect payments received.

It is contemplated that transactions that take place in a system consistent with the present invention may or may not involve direct payment processing. The system may maintain a series of account balances associated with individual users, venues and third-party marketers, whereby, as transactions flow through the system, these balances are adjusted (e.g., as illustrated in table below). This methodology may be employed in order to guarantee better service and reduce fraud risk. Operating under the parameters set by the system administrator, these balances may be periodically examined and if they meet certain criteria are cleared via a reconciliation process that initiates billing or payment processing. The following table provides a set of exemplary transactions that might take place in the system:

| User Type | Transaction | System Activity | Notes |
| --- | --- | --- | --- |
| Anonym. End User | Anonymous transaction | Processes payment charge directly. | Transaction will not be released until charge clears. |
| End User | Opens account/Adds to user balance | Processes payment charge. Credits user balance same amount | |
| End User | Makes product purchase | Debits the end user's credit card or payment type amount of purchase less any coupon or promotion credits. The coupon or promotion credits are debited from the account of the issuer. | Can be immediate process or batched |
| End User | Uses RFID card as credit card in venue | Debits user balance amount charged and credits venue amount charged less transaction fees | |

-continued

| User Type | Transaction | System Activity | Notes |
|---|---|---|---|
| End User | Pays for product with a buy n get nth free "coin" | Instead of user balance being debited price of product, administrator is in the form of a credit to the venue. | |
| End User/Venue | Redeems or fFulfills a product claim | Credits venue balance amount of claim minus transaction fees | |
| Venue/ Member/ Third-Party Marketer | Purchases marketing or advertising services | Debits buyer's account cost of those services. | May prompt immediate payment processing. Some services, e.g., coupons and pay-per-response may be debited as they are used |
| Venue/ Member/ Third-Party Marketer | Opens account | Debits account balance registration fees (if any) | |
| Venue/ Member/ Third-Party Marketer | Monthly period ends | Debits account balance monthly fees (if any) | |
| Venue | Cancels or refunds claim | Credits user balance amount of transaction. Debits vendor that amount minus transaction fees. | |
| Venue | Reopens claim | Debits venue balance amount of claim minus transaction fees. | |
| Venue/ Member/ Third-Party Marketer | Closes account | Processes payment to/from venue in amount of balance to clear balance to zero | Requires administrative approval |
| System administrator | Uses marketing or advertising services | If applicable, credits participating system balances. | This category may include administrator supported discounts/rewards, tokens |
| System administrator | Reconciles account balances | Processes or provides payment in amount of balances to venue/marketing accounts to zero them out. | Minimum clearing parameters may be set by administrator. |
| System administrator | Closes an account | Processes or provides payment in amount of balance to zero out. | Override by administrator. |

In order to prevent fraud on the part of individuals making anonymous one-off transactions, the system administrator is able to cap the total of each anonymous purchase. In addition, because the recipient is captured in the claim record, the administrator is also able to cap how many anonymous transactions a single recipient can receive in a twenty-four hour period. Finally, the system may keep track of recipient messaging addresses in cases where the payment information later proves to be fraudulent or contested. The administrator is able to set the number of repeat incidents that cause these addresses to be banned from the system. The administrator may also be able to set caps for new users, e.g., during a probationary period, for users who do not have stored payment in the system, and may be able to block the use of credit or debit cards originating from certain fraud-prone countries.

With the exception of anonymous end users and registered end users who choose to re-enter their payment information each time they wish to transact, the system may be adapted to store payment information for each system user. This information will generally be collected at the time of registration, and may be changed at any time by the system user (login is required). This information will be used in processing payments or generating bills associated with the account.

For individual payment processing and account reconciliation, certain transactions in the system result in immediate individual payment processing or account reconciliation, e.g.: when a registered end user purchases credits; when an anonymous user makes a one-off transaction; and when a venue or third-party marketer account balance crosses a threshold set by the administrator. For batch processing and account reconciliation, excluding the special cases that prompt individual processing, account reconciliation (and accompanying payment processing/billing) may normally be done in batches at a frequency and under the parameters set by the administrator. A reconciliation will generate a batch of payments requiring electronic payment processing, a batch of payments for physical billing and a batch of payments for check generation. In addition, it will produce itemized log files for each of the accounts that have been reconciled. The system may connect to a third-party solution provider via an Application Programming Interface (API) to provide billing (both electronic and physical distribution) as well as a check printing and distribution service. The solution can support, e.g., debit/credit card processing, direct deposit/withdrawal and, possibly online payment mechanisms, e.g., PAYPAL®. It is contemplated that all parties are able to access their account balance on a real time basis (login is required through the users' respective system interface).

User Accounts

Features and Interfaces

It is contemplated that, in a system consistent with the present invention, end users are able to access the system through a variety of clients, including, but not limited to: a web browser on a desktop or laptop computer, a WAP browser on a smart phone, a phone based automated voice system and a wireless fat client application (such as a J2ME) application.

A menu of exemplary features is illustrated in the exemplary screen views 2300-3000 of FIGS. 23 through 30. It should be recognized by those skilled in the art that not all features will be available on all clients, and some features are conditional on the basis of such criteria as whether the user is registered and logged in (or using the system anonymously), whether the user currently has open claims in the system, and whether the user has entered information required to activate some of the more advanced functionality (as discussed in further detail hereinbelow).

Exemplary main menu options, in one embodiment of the invention, are: home (for login and registration, as illustrated in the exemplary screen view 2300 of FIG. 23), account, browse venue directory, make a remote purchase, unredeemed claims, friends, and rewards program.

In embodiments of the present invention requiring user registration, the home menu may only support end users who have previously registered in the system. In this scenario, unregistered users and recipients of drinks may be guided to a link where they can "take a tour of the system" or register (both touring and registration may first require that a user certifies he or she is of legal drinking age in an alcoholic beverage implementation of the present invention, using an interface such as that illustrated in the exemplary screen view 2310 of FIG. 23a). Also, new promotions, announcements, advertisements, and other information may be displayed at this menu. Cookies may be used to permit registered users to skip the home page entirely and bookmark subpages. Appropriate functionality may be provided for users who have forgotten their userID and/or password, wherein the system looks up the user by primary messaging address and sends a new password to that account.

Figure 24:
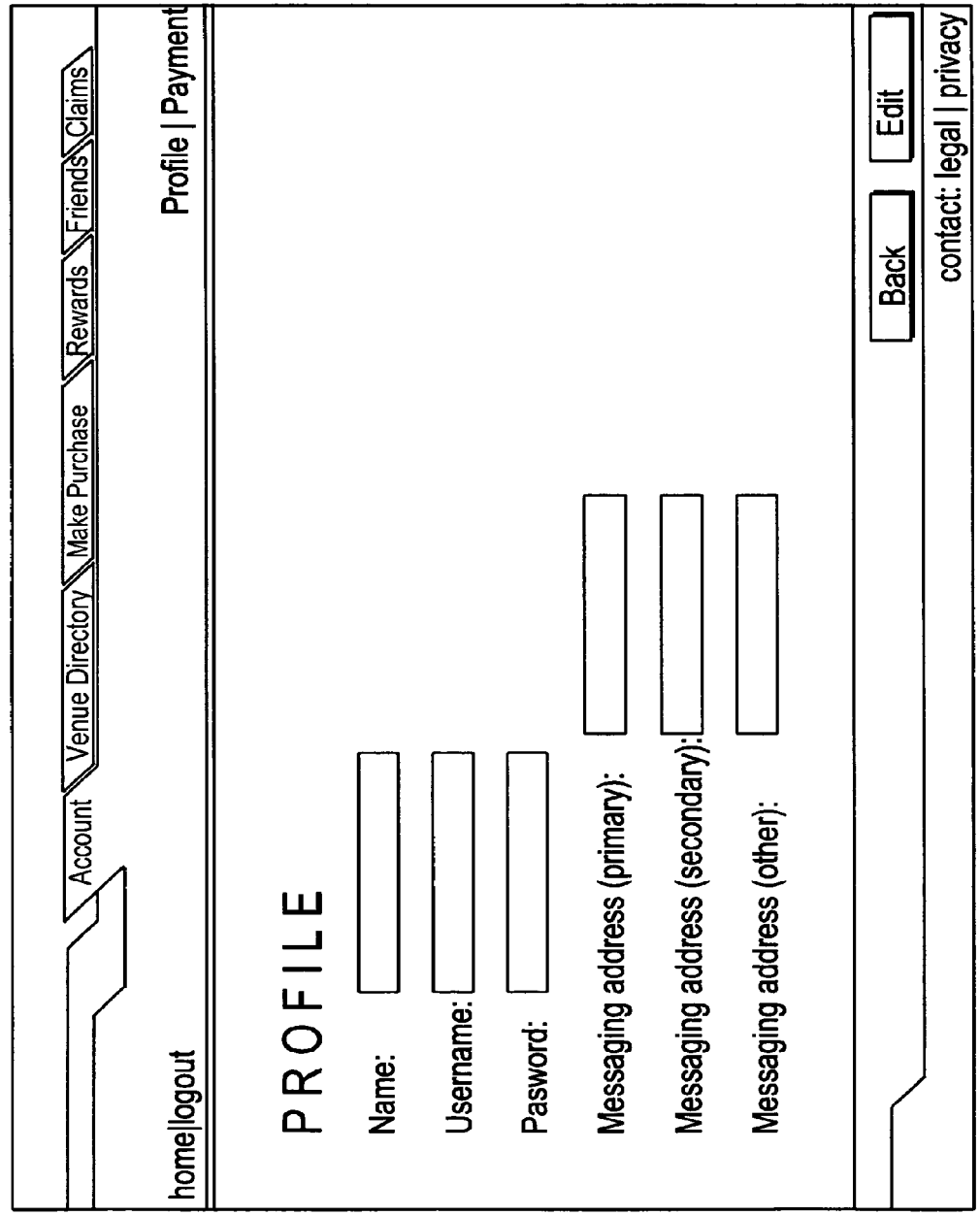
FIG. 24 is a screen view of an exemplary profile submenu screen, in an exemplary system consistent with one embodiment of the present invention.

An exemplary account menu may provide the following selectable options: profile and payment. The profile submenu, as illustrated in the exemplary screen view 2400 of FIG. 24, provides the following selectable options: name, user ID, password, WAP client PIN, and phone/email messaging addresses. Multiple messaging addresses may be specified, and one should desirably be a valid phone or email messaging address, the primary address for receiving claims, and a preferred address may be marked as such. The payment submenu shows current balances and provides the following selectable options: add/delete payment information, as illustrated in the exemplary screen view 2500 of FIG. 25 (e.g., credit card; up to 2 may be specified, with primary indicated, wherein each payment type has a pin # used as a confirmation and to access), purchase more credits, set up automatic debit (on/off, recharge to b when balance goes below c, or automatically charge d each month to primary payment type), and transaction history, as illustrated in the exemplary screen view 2600 of FIG. 26 (e.g., last 50 purchases, unsent claims, recurring claims). The transaction history selection may further provide options to repeat this purchase or make this purchase recurring, or modify (can only be done if claim is unsent or recurring), edit, or cancel a purchase. An alternative transaction history screen view 2.

Figure 26:
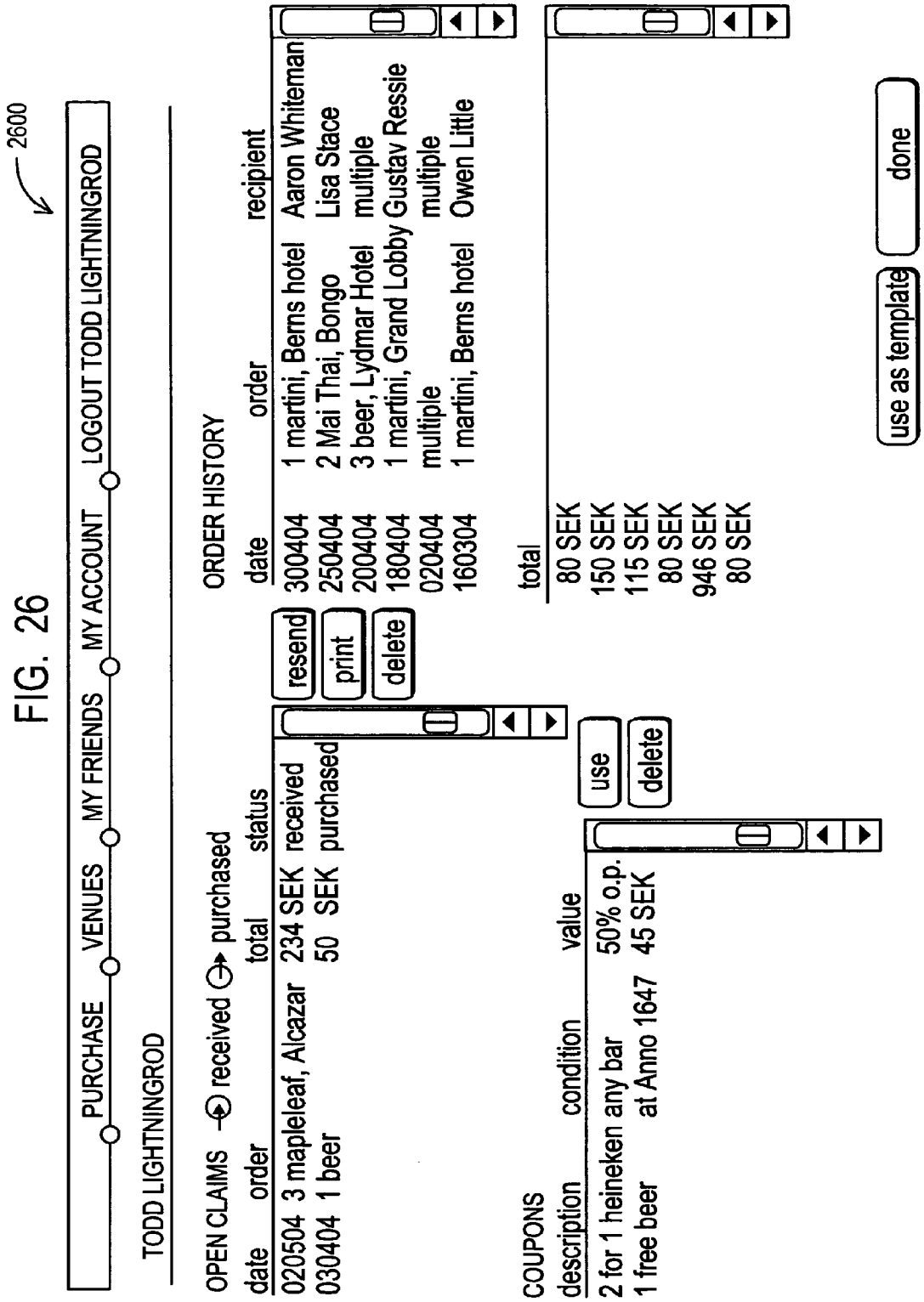
FIG. 26 is a screen view of an exemplary transaction history screen, in an exemplary system consistent with one embodiment of the present invention.
Figure 26A:
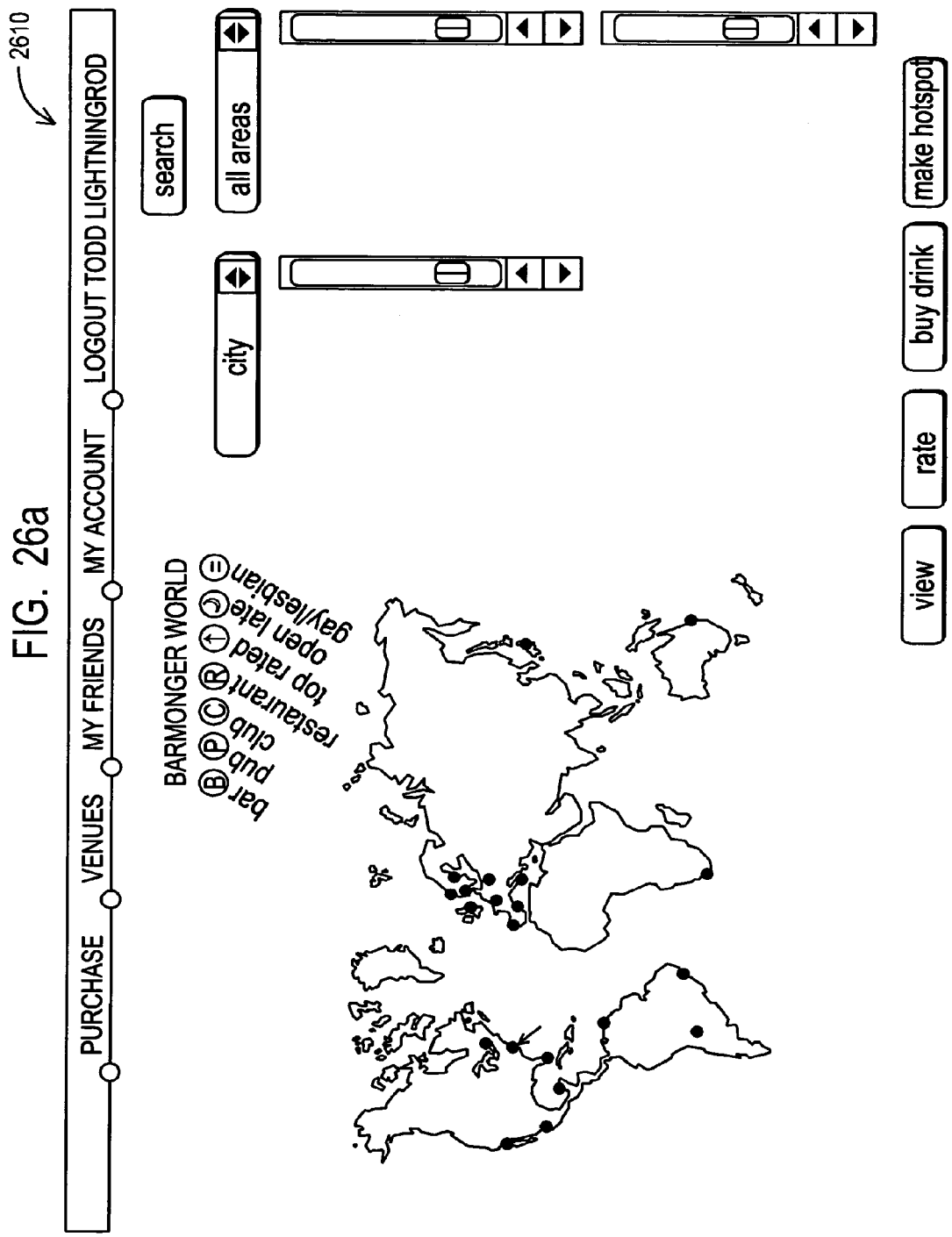
FIG. 26a is a screen view of an exemplary venue world map plot screen, in an exemplary system consistent with one embodiment of the present invention.
Figure 26B:
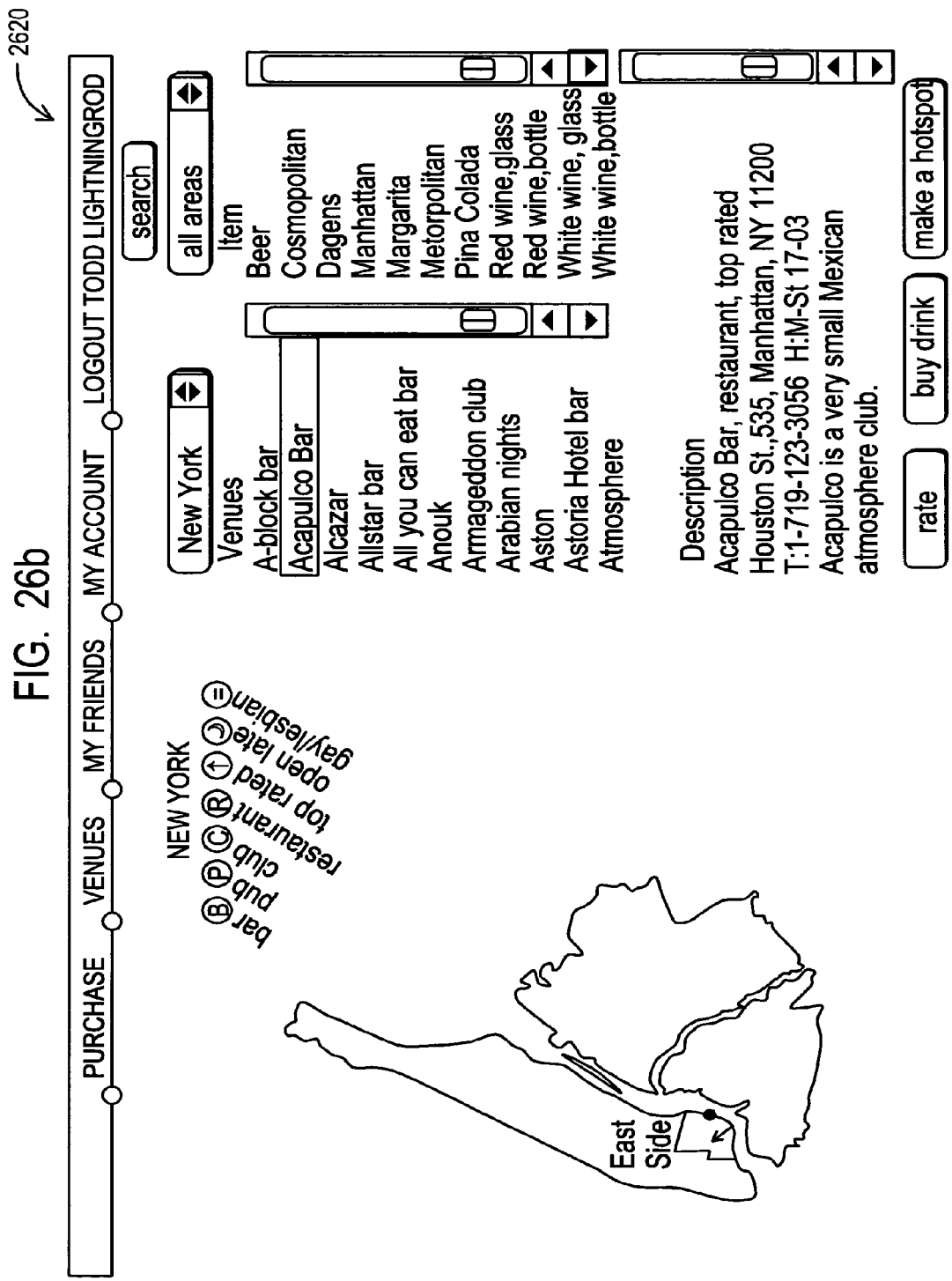
FIG. 26b is a screen view of an exemplary venue regional map plot screen, in an exemplary system consistent with one embodiment of the present invention.
Figure 26C:
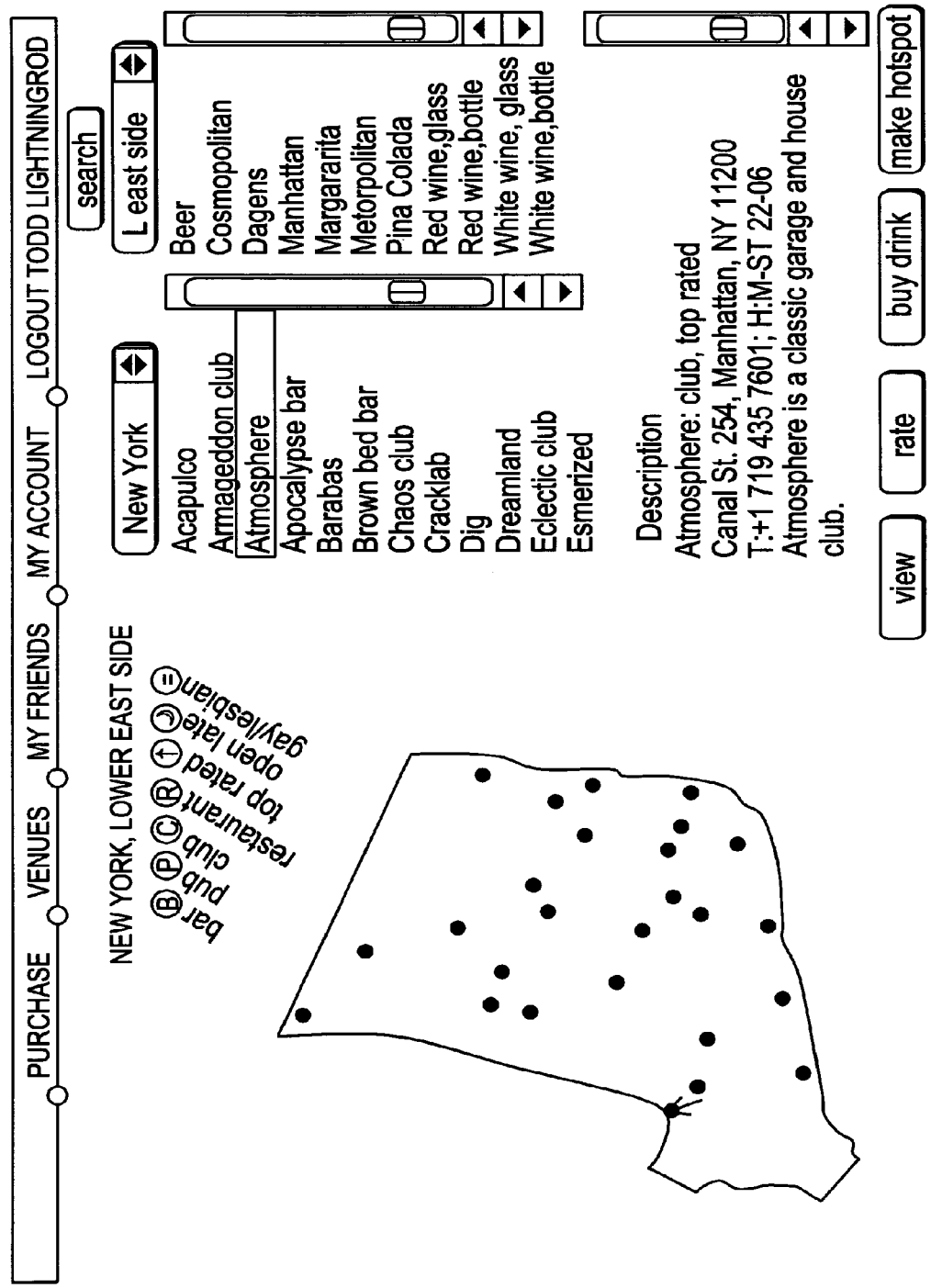
FIG. 26c is a screen view of an exemplary venue neighborhood map plot screen, in an exemplary system consistent with one embodiment of the present invention.

An exemplary browse venue directory menu may provide the following selectable options: initiate purchase, rate this venue (only available to registered users; on a scale of 1-5), and provide feedback about this venue. Venue directory functionality may include using a search field to enter the name of a venue or city, selecting a city from a city list, or clicking on a location on a map graphic (e.g., as shown in the exemplary screen view 2610 of FIG. 26a). Once a city is selected, a map of the city may be displayed, as illustrated in the exemplary screen view 2620 of FIG. 26b, from which a user may select a venue or a region or neighborhood (for larger metropolitan areas, wherein a user would next be shown a map of the region or neighborhood from which a venue may be selected, e.g., as illustrated in the exemplary screen view 2630 of FIG. 26c). Alternatively, a user may select a venue list by category (e.g., pub, bar, restaurant, club, late-night, top rated: top 5% for city, gay/lesbian). A venue list is then shown, including brief descriptions of the venues, as well as detailed venue information. This may be shown, for example, using symbols next to the name of the venue indicating certain information, e.g.: top rated (top 5% of ratings for the city), restaurant/dining, pub, bar or club, open late, gay/lesbian/bisexual, as well as drink (and/or food) menu/pricing for the selected venue. A user-selectable button or other feature is desirably located on the venue information screen, as well, so that a user may initiate a basic purchase.

Selecting the "make a remote purchase" option is another way of initiating the purchasing process, as described above and illustrated in FIGS. 2a-3b.

An exemplary unredeemed claims menu may provide the following selectable options: resend claim and show the venue information page. If the user is an unregistered user, the system will prompt them for the messaging address where they received the claim.

Figure 27:
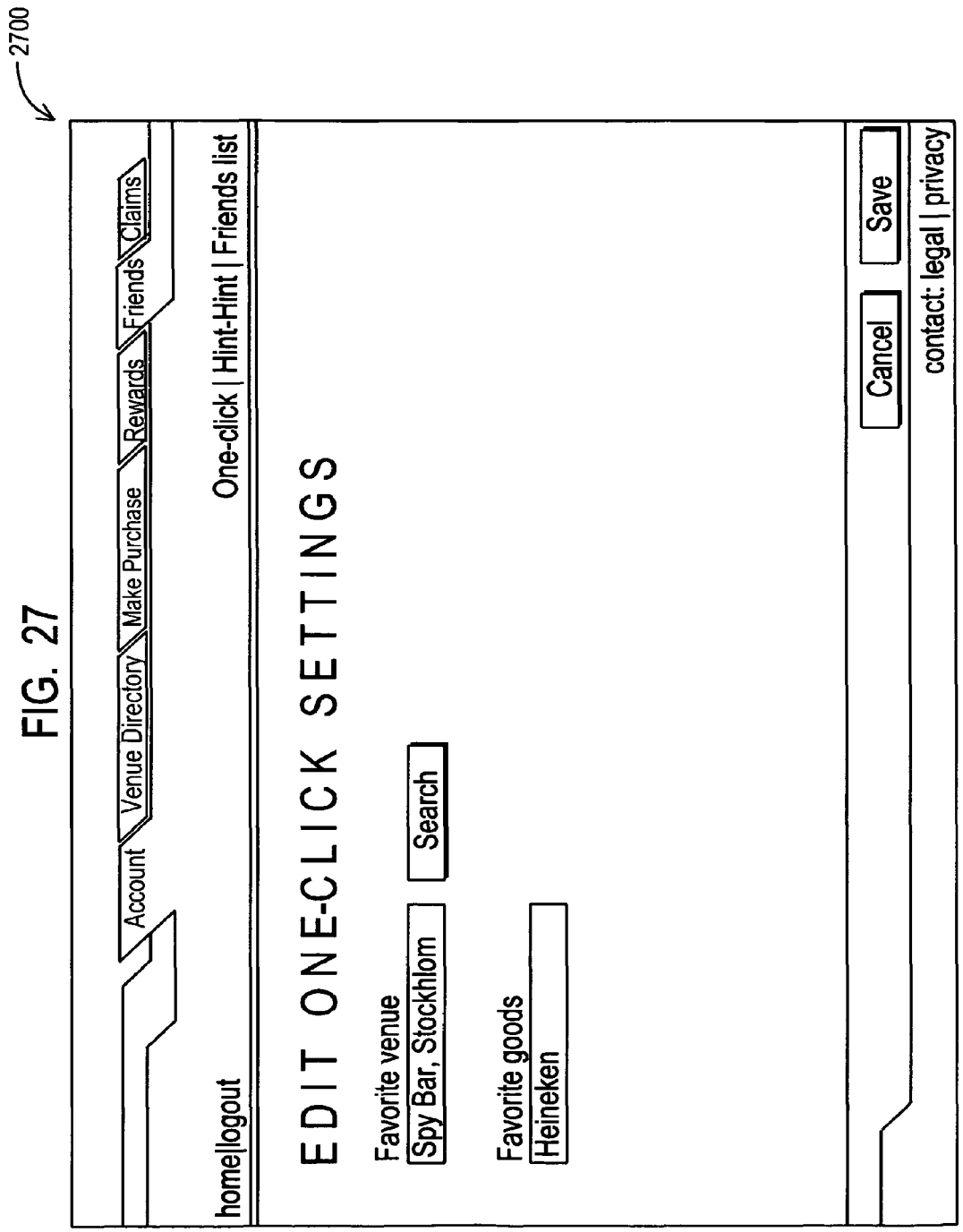
FIG. 27 is a screen view of an exemplary instant reciprocity settings screen, in an exemplary system consistent with one embodiment of the present invention.
Figure 27A:
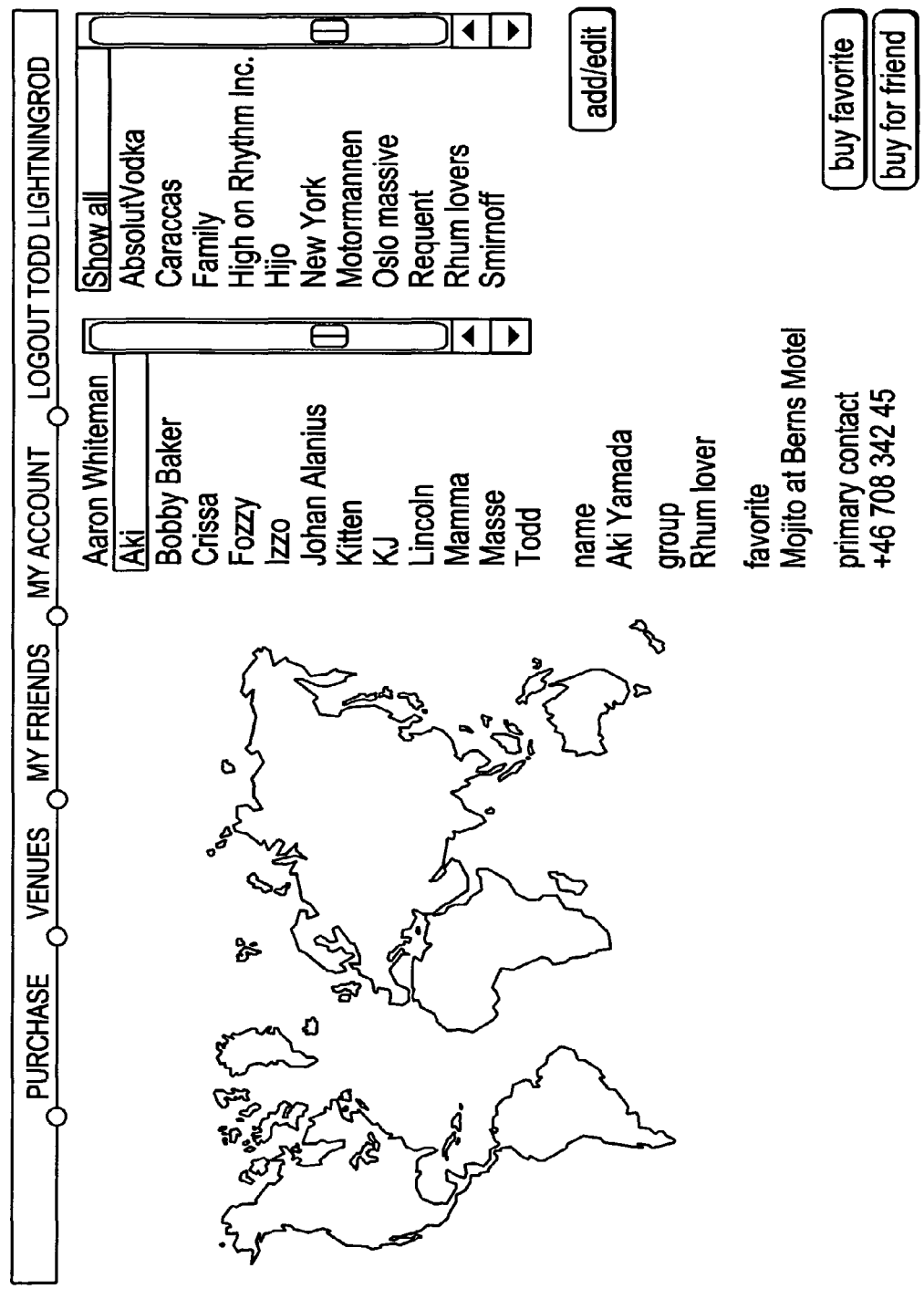
FIG. 27a is a screen view of an exemplary friends list setup screen, in an exemplary system consistent with one embodiment of the present invention.
Figure 27B:
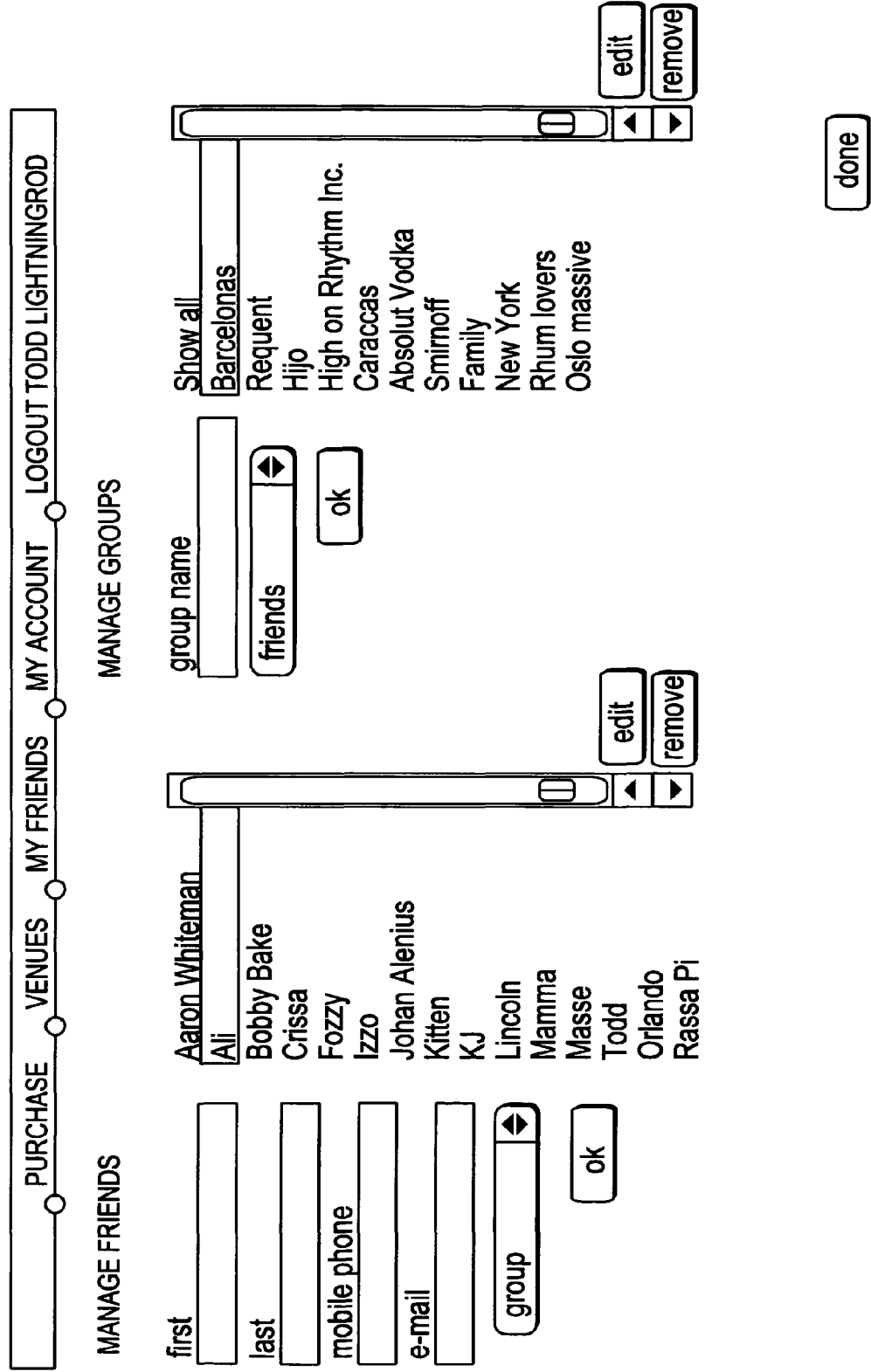
FIG. 27b is a screen view of an exemplary friends/groups display screen, in an exemplary system consistent with one embodiment of the present invention.
Figure 28:
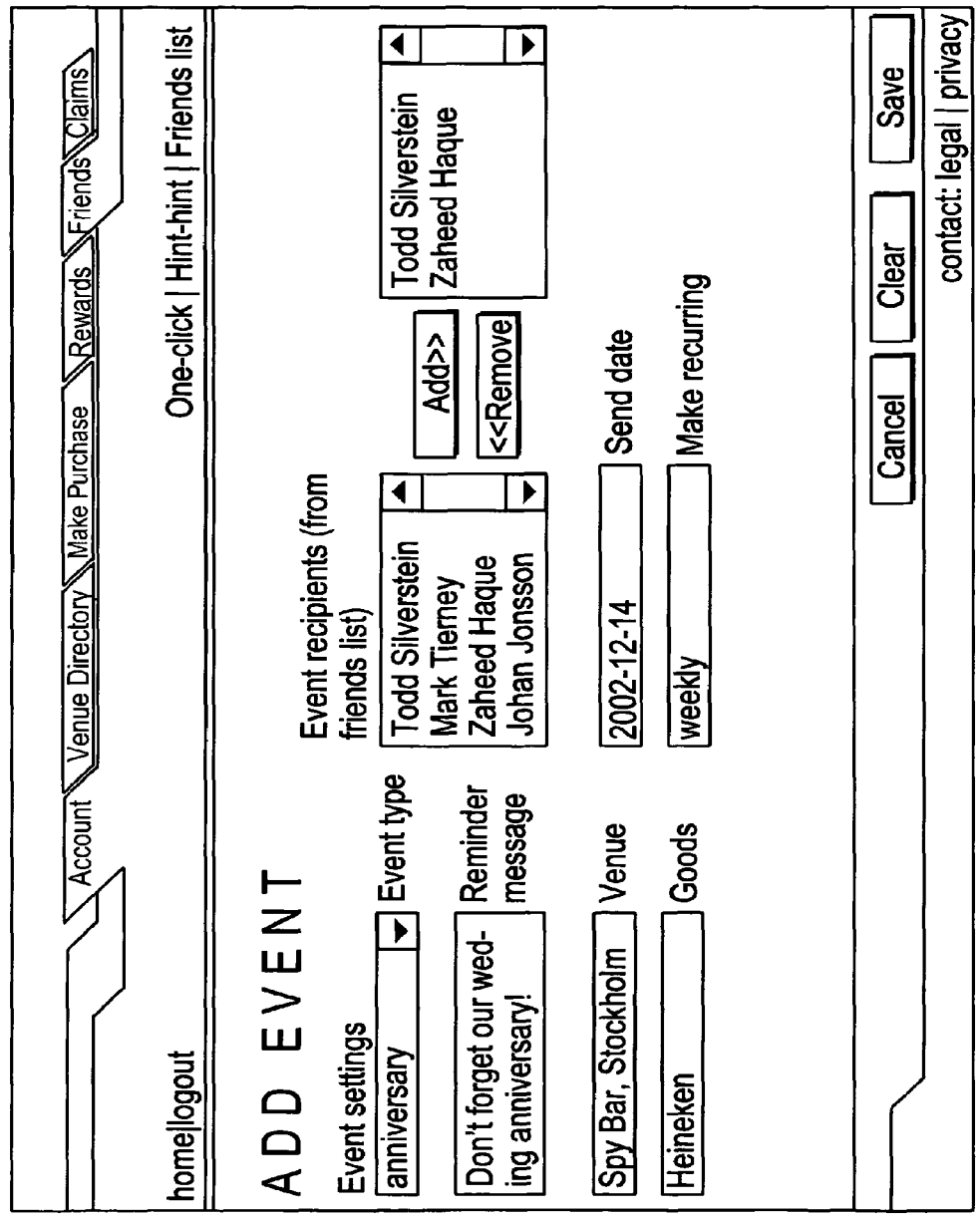
FIG. 28 is a screen view of an exemplary event settings screen, in an exemplary system consistent with one embodiment of the present invention.
Figure 28A:
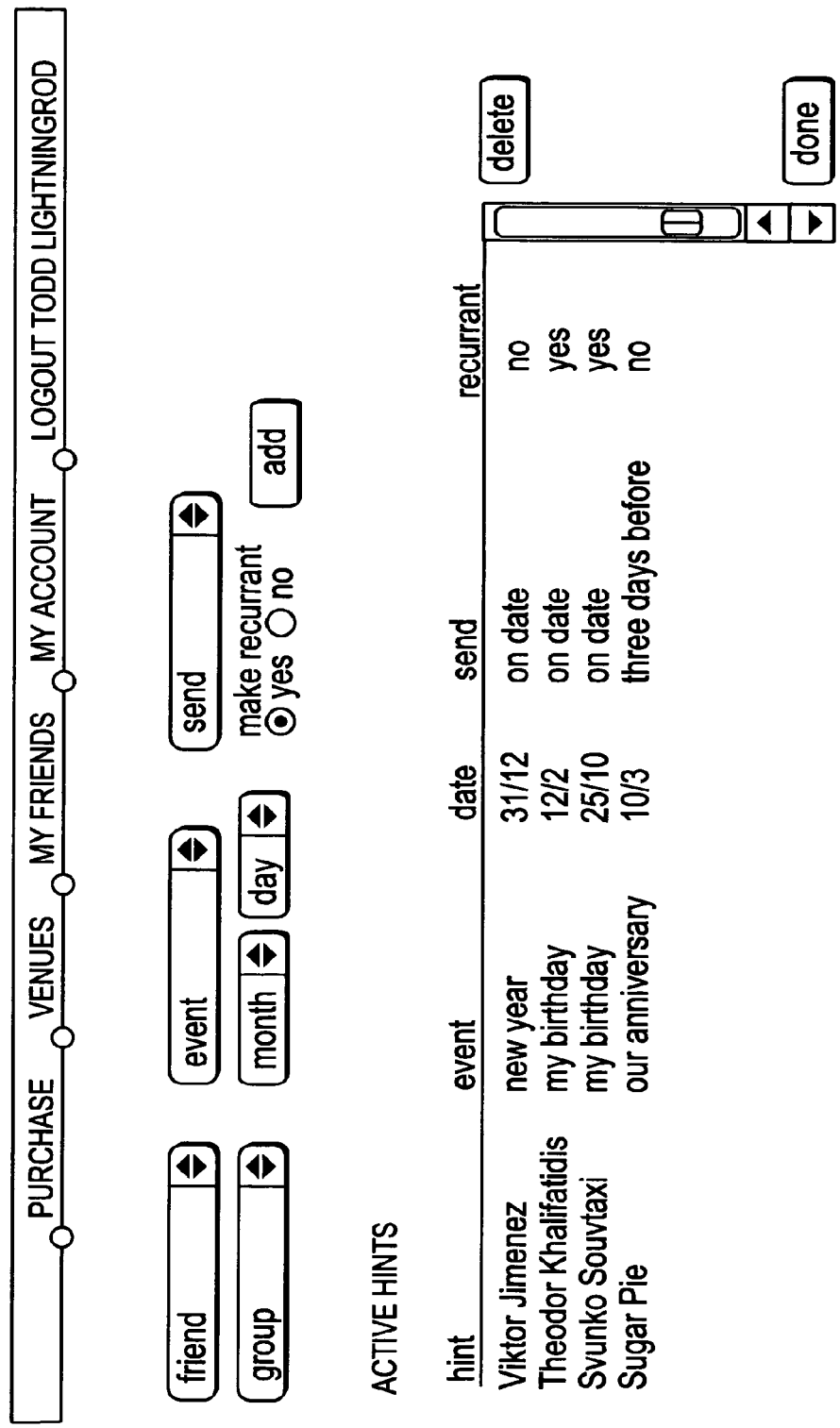
FIG. 28a is a screen view of an exemplary "hint-hint" setup screen, in an exemplary system consistent with one embodiment of the present invention.
Figure 29:
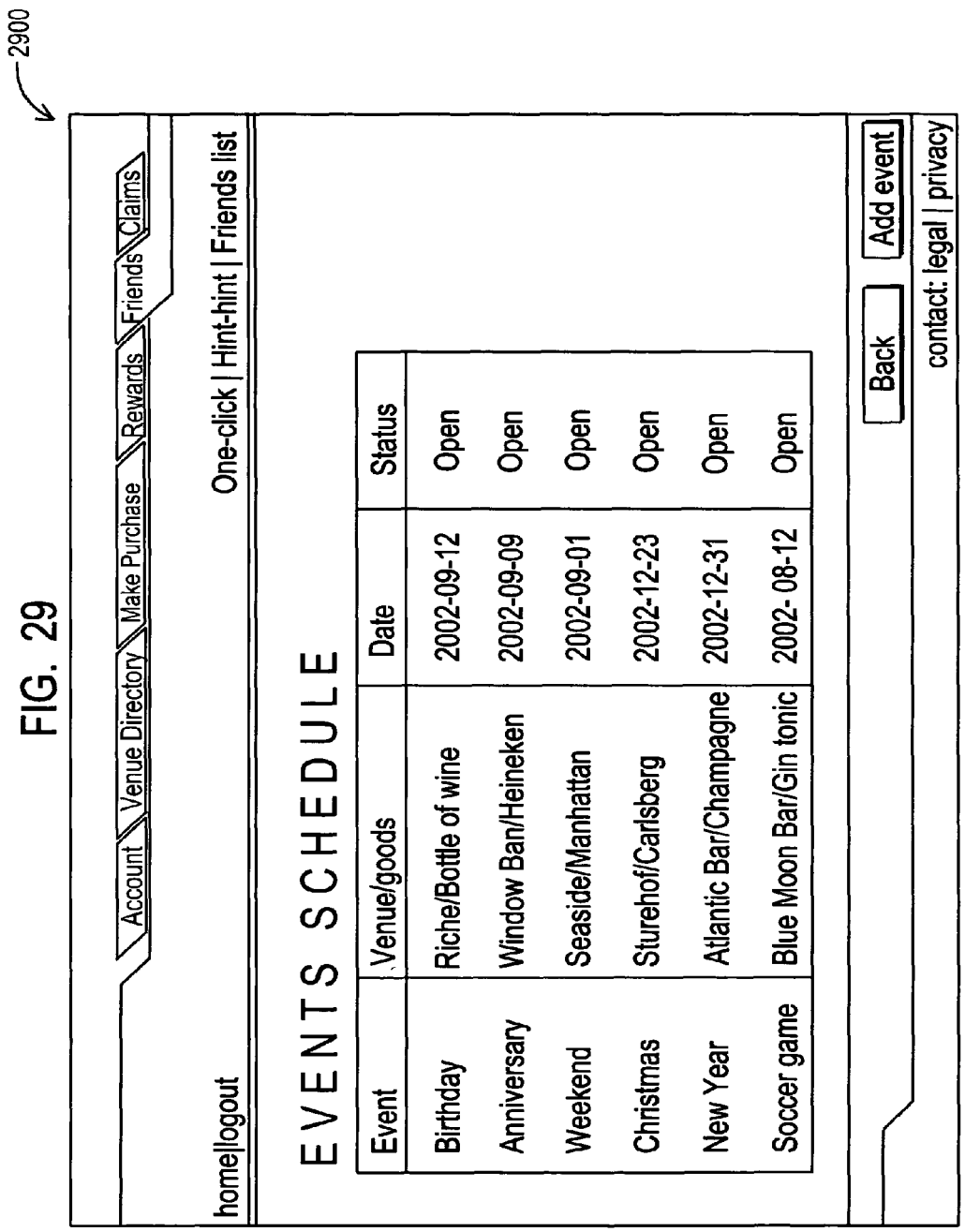
FIG. 29 is a screen view of an exemplary events schedule display screen, in an exemplary system consistent with one embodiment of the present invention.
Figure 30:
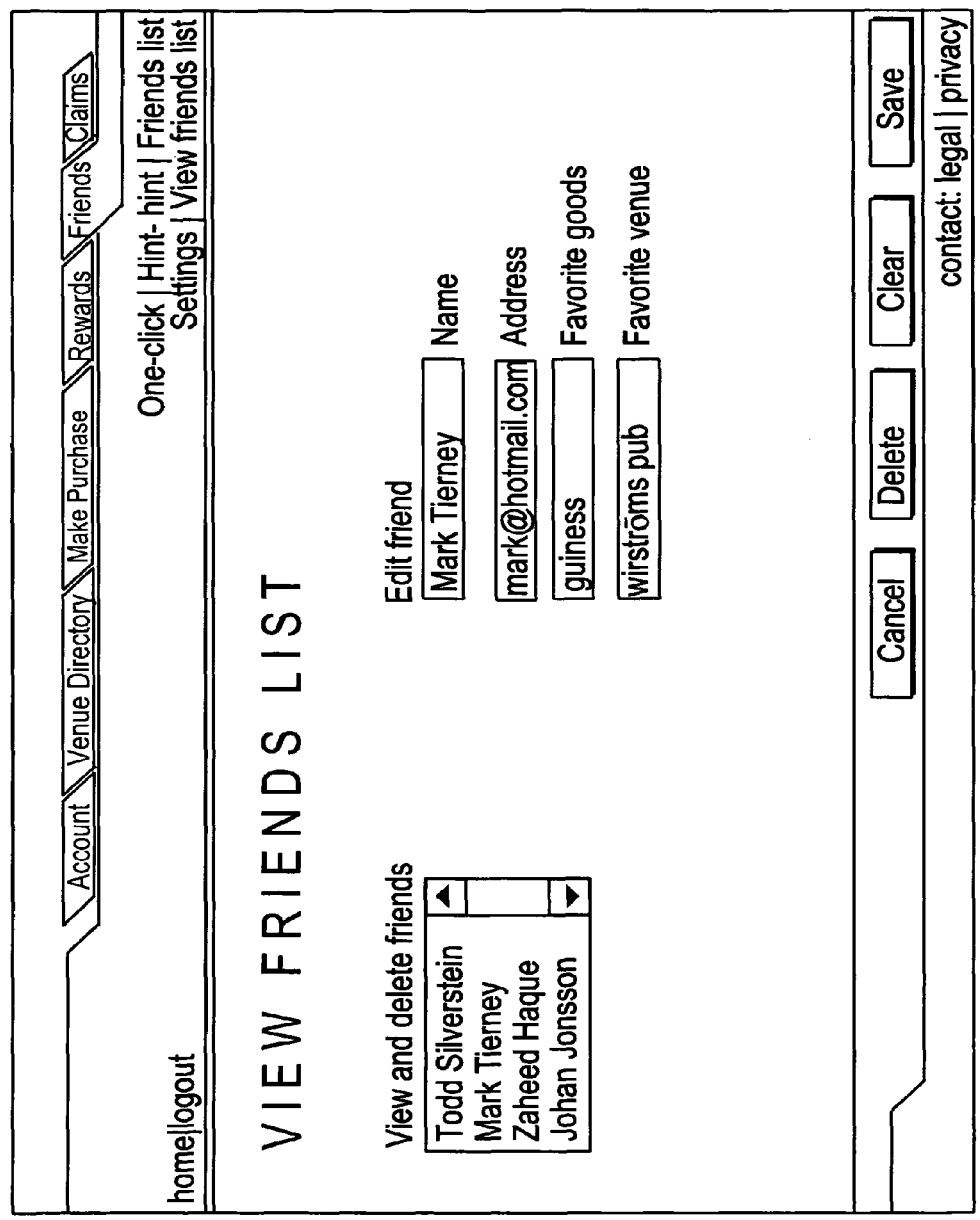
FIG. 30 is a screen view of an exemplary view friends list screen, in an exemplary system consistent with one embodiment of the present invention.
Figure 32:
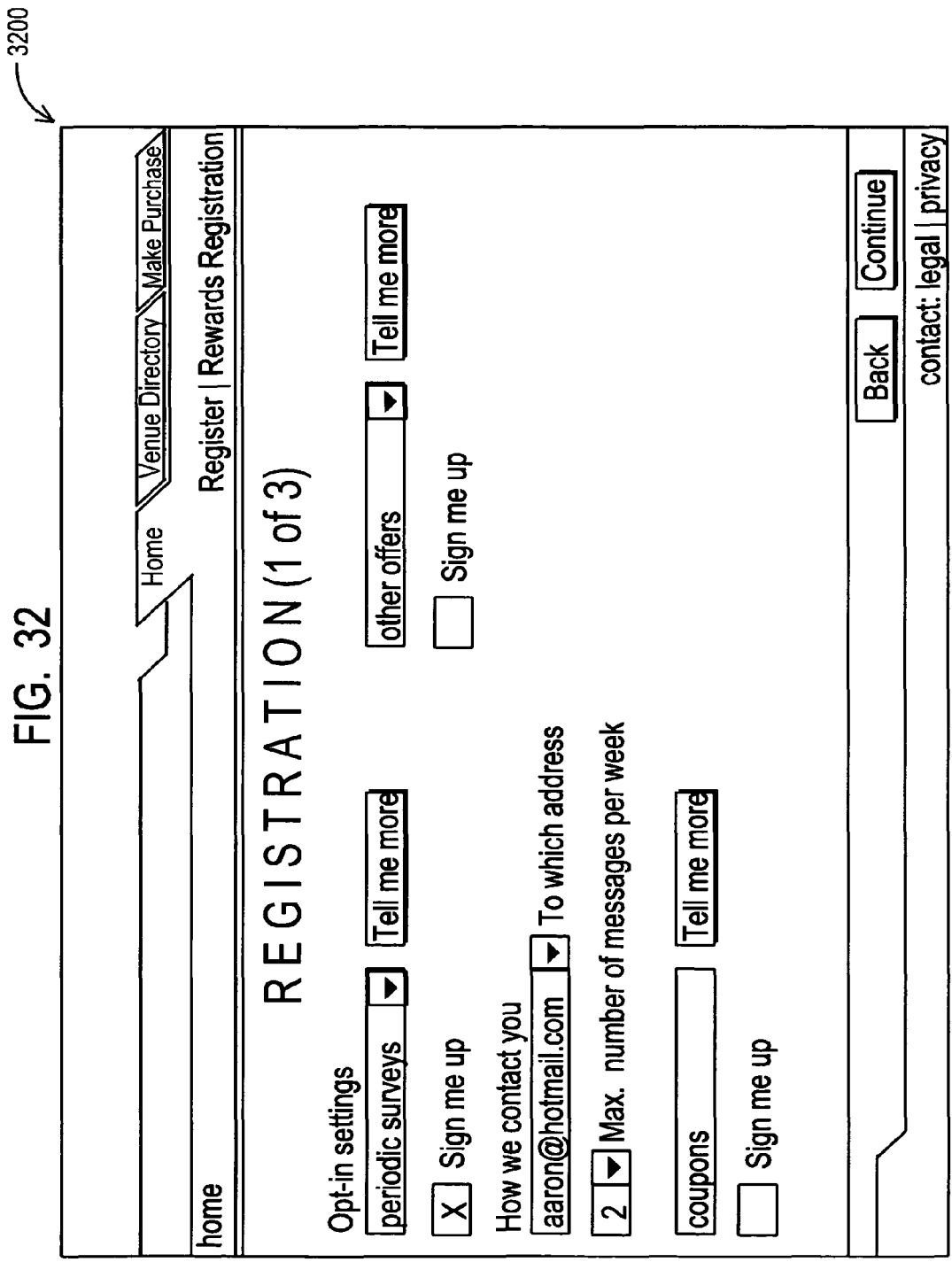
Figure 34:
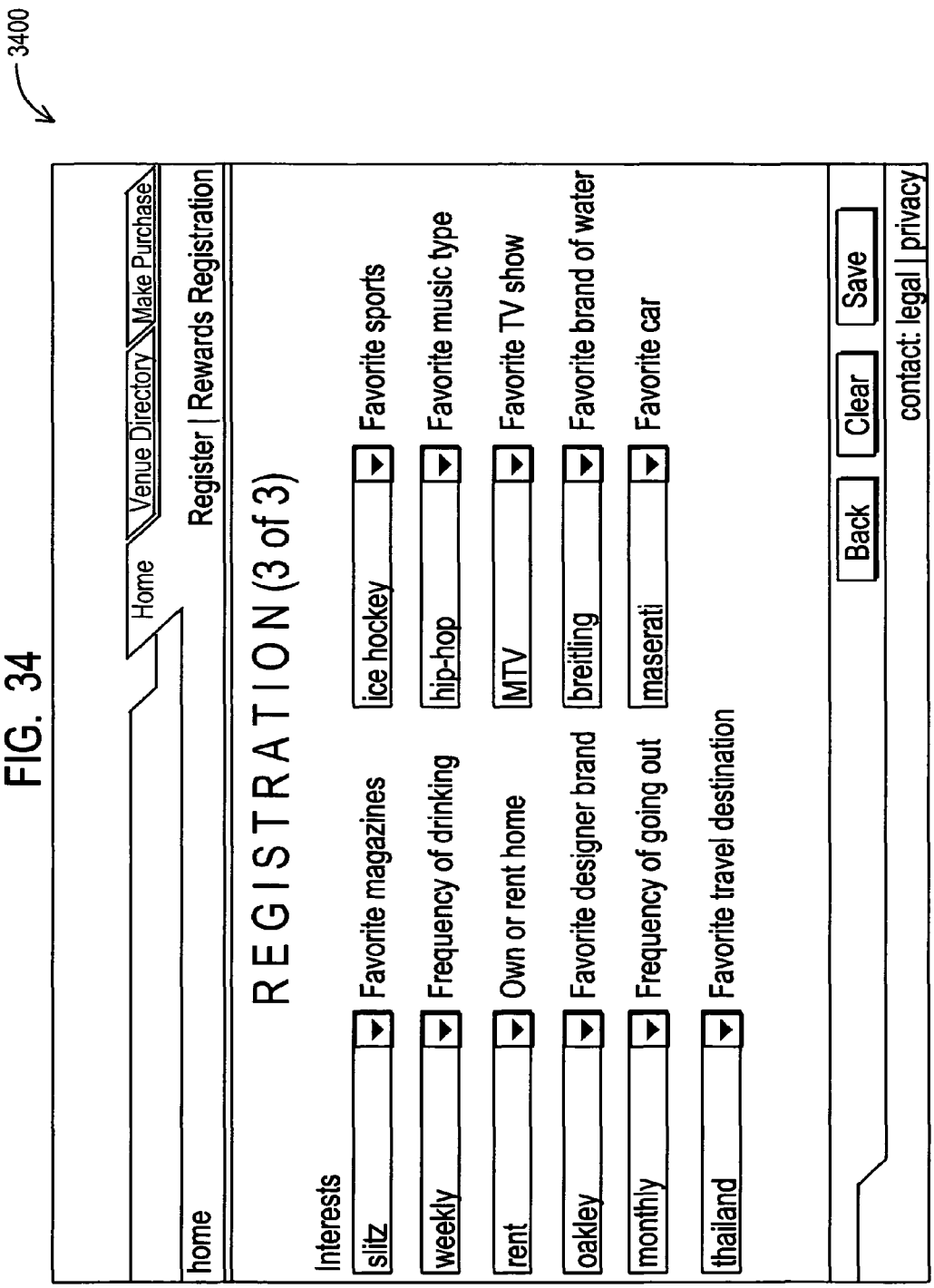

An exemplary friends menu may provide the following selectable options: instant reciprocity settings, as illustrated in the exemplary screen view 2700 of FIG. 27 (which may include, e.g., select/replace my favorite venue and/or product), "hint-hint" submenu (wherein the user broadcasts a message to someone else to purchase something for him/her), and a friends list submenu. The "hint-hint" submenu provides options to add, delete and modify an event, as illustrated in the exemplary screen view 2800 of FIG. 28, which may comprise the following five exemplary fields: type (birthday, anniversary, custom text), reminder message, selected venue and product (automatically fills in instant reciprocity values), recipients, and send date (with an option to make it recurring). Alternatively, a hint-hint screen may appear as shown in the exemplary screen view 2810 of FIG. 28a. As shown in FIG. 29, an exemplary screen view 2900 comprises a list of scheduled events. The friends list submenu may comprise the following options: settings and view friends list. Settings for the friends list may include making the user's profile public/private (when a user adds friends or imports, the system looks for messaging address matches with other system users, and if it finds a match and the profile is public, the friend record will be replaced by a pointer to the friend's, i.e., the other user's, information, thereby allowing for dynamic reflection of changes) and whether to automatically add anyone who purchases a product for the user to his friends list. The view friends list functions (as illustrated in the exemplary screen view 3000 of FIG. 30) may include add a friend (with fields for name, one or two messaging addresses, with the primary address indicated, and venue/drink they like), import addresses from external address book (e.g., Microsoft ENTOURAGE® or OUTLOOK®, wherein fields needed by the system are extracted, i.e., name, messaging addresses, cell phone, secondary email), delete a friend, and making, editing, and deleting groups of friends. In addition to manual entry of information into the friends list, a drag-and-drop interface may be provided for adding single or multiple entries to the friends list from other software packages, e.g., Microsoft ENTOURAGE® or OUTLOOK®. At a minimum, it is contemplated that the following exemplary fields would be part of each entry in the friends list: first name, last name, email messaging address, and/or phone messaging address. Additional functionality may be provided at the friends list menu, such as a graphic of a map with dots plotted thereon in each city, country, region, or neighborhood where the user has a friend or group member, along with the display of a list of all friends and groups, as shown in the exemplary screen view 2710 of FIG. 27a. Other functionality may include a feature for locating a friend who is at a venue (by using RFID find-a-friend to bring up a list of all friends found and then viewing a plot of them on a global map). An exemplary displayed list of friends and/or groups is shown in the exemplary screen view 2720 of FIG. 27b. From the friends list, the user may select a friend and then perform functions such as seeing their location and instant reciprocity information (if the user has permission to do so), initiating a purchase for the friend (including pre-population of fields to the extent possible), editing the listing for that friend, requesting permission to see their location/instant reciprocity information, and deleting the friend from the list. From the groups list, the user may initiate a group purchase (including pre-population of fields to the extent possible), edit the group (i.e., add/delete members), or delete the group. Other friends functionality may include changing sharing/permissions settings (e.g., automatically granting permission to anyone who has made a purchase for the user, or making the user visible, i.e., granting permission to all users in the system), approving or rejecting pending permission approvals, turning all approvals on/off, and turning an individual approval on/off.

As mentioned above, not all of the above functionality is made available for all clients. The chart below details the functionality that might be available on various exemplary clients and under various exemplary circumstances:

Main Menu:
1 to search for a venue (or say "search")
2 to buy remotely (or say "buy")
3 if you are a purchase recipient and need assistance (or say "claim")
4 if you purchased remotely and need assistance (or say "purchase")
(1) Search:
Enter Postal Code for the area in which to search or # to spell out city name if postal code is not known (or speak zip code or city name)
 1 to pick one at random (or say "random")
 2 to pick highest rated in area (or say "high rated")
 3 to look up by name (spelled out using keys) (or say "name")
 4 to look up by category (spelled out using keys) (or say "category")
Matches are returned and presented as a menu (If only one, skip this step). Choose the number of selection or # to go back (or say "name" or "back")
The system reads out the venue information
 1 to buy remotely (or say "buy")
 2 to repeat all info (or say "repeat")
 3 to repeat phone number/initiate call (or say "call")
 4 to repeat address (or say "address")
 5 to start a new search (or say "new")
(2) Buy:
For whom? (this will be recorded via speech to text)
Enter phone number of recipient. Confirm. (manual entry or voice)
Where? (if not already implied by path)

|  | Main Menu Category | | | | | |
| --- | --- | --- | --- | --- | --- | --- |
|  | Registered Users | | | Unregistered Users | | |
| Client Type | Web Browser | WAP Browser | Fat Client | Web Browser | WAP Browser | Fat Client |
| Account | Yes | No | No | N/A | N/A | N/A |
| Venue Directory | Yes | Yes | Yes | Yes | Yes | Yes |
| Make a Remote Purchase | Yes | Yes, if sufficient credits | Yes, if sufficient credits | Yes | No | No |
| Unredeemed Claims | Yes, only appears if user has unredeemed claim | Yes, only appears if user has unredeemed claim | Yes, only appears if user has unredeemed claim | Yes, can be used to reissue a lost claim based on recipient's messaging address | No | No |
| Friends | Yes, only if user has set this up | No | No | N/A | N/A | N/A |

A system consistent with the present invention may also provide end users with the ability to access the system via a telephone call. Two methods of implementation are contemplated. First, such access could be handled through a call center. In this case, call center agents equipped with computers will access as a proxy for taking and entering orders and responding to information requests. A second, less expensive method of implementation calls for using a touchtone and/or voice-driven automated call system. Instead of providing the menu functionality described above, a script or map of the automated voice menu system might provide the following limited exemplary functionality:

See search process above. This process returns after a venue has been selected (before the supplies venue information step)
What? (reads products/prices for selection) (manual selection or voice)
How many? (key in number or voice)
Confirms total cost (key 1 to confirm or say "confirm")
Select payment type (manual selection or voice)
Key in payment number (manual selection or voice)
Record a message for the recipient (this will be recorded via speech to text)
Confirmation message and order number is read by the system (3) If you received a claim:
1 for general explanations/instructions (or say "help")
2 to enter claim number for venue information (or say "claim number")
3 if you lost your claim number (or say "message address" or "phone number")
(4) If you purchased:
Enter claim number (or say claim number)
1 to resend claim to recipient (or say "resend")
2 to modify open claim information (or say "modify")
3 to change recipient phone number (or say "change")
4 to change other (or say "other")

It is contemplated that end users may have a number of ways to become registered members of the system. They can choose to register when they initiate a purchase process, as part of their response to a claims notification and via an invitation initiated by a registered user. Registering gives the end user a number of advantages: it eliminates some of the data entry required during purchasing/responding to transactions, it allows the end user to make real-time purchases instead of having to wait for the charge to clear, and it allows the user to personalize the system in various ways, e.g., build friends list, setting alerts for events (birthdays/anniversaries), opting into and receiving information about special offers from third-party marketers or venues and so on.

As described hereinabove, the administrator defines the information end users need to provide during the registration process and parameters affecting end user system use. Exemplary end user information that might be required at registration (as illustrated in the exemplary screen view 3100 of FIG. 31) includes, e.g.: user ID, user password, payment type and information (and, optionally, the capability to keep such information on file along with additional payment settings), number of credits they wish to purchase initially (there may be a system minimum), contact information (at least a valid email address, and possibly may supply up to 3 messaging addresses, including a telephone number for SMS text messaging and/or MMS communications). Additionally, country and language information may be gathered manually or automatically. The user might also be able to perform the opt-in marketing registration and enter instant reciprocity information and referral information. Further, at the time of registration, functionality may be provided to permit importation of phone numbers and/or email addresses into a friends list. Demographic and marketing information may further be collected, either at the time of registration or at a later time. Such additional exemplary information may include personal information and other settings, as illustrated in the exemplary screen views 3200-3420 of FIGS. 32 through 34*b*. Personal information captured during the opt-in marketing registration may include language, country, state, postal code, gender, age, occupation, income, whether user is planning to switch jobs in the next 6 months, favorite magazines, frequency of drinking daily/weekly, etc.), whether the user owns or rents a home; favorite designer brands (from a list), frequency of going out, favorite travel destination (by country), favorite sports (by type), favorite music type (by genre), favorite TV shows (by category), favorite brand of watch (by type), and favorite car (by manufacturer/type). Initial reward opt-in settings may include: periodic surveys in which the user can win prizes (on/off, to which address, number/week, hours available), coupons (on/off, to which address, number/week, hours available), and other offers (on/off, to which address, number/week, hours available). Users will be able to opt-in/out and change this information either during registration or at any point thereafter.

In order to activate instant reciprocity functionality, the end user will have to designate certain information, e.g., a favorite venue and product from that venue (described in further detail hereinabove).

Venues

As described hereinabove, the administrator typically approves venues that wish to join the system and the information they need to provide during the registration process. In addition to becoming registered members of the system, it is desirable that participating venues be required to install and run the client software necessary for processing claims on-site. The software should therefore run on a device that has a continuous connection with the system's central server via the TCP/IP protocol. Venues may access the system via one of two exemplary interfaces: a web interface for registering and managing the account, including accessing most services, and a claims software interface for receiving and processing claims transactions.

The venue web interface may provide the following exemplary features, grouped into the categories of account, venue directory listing, claims, marketing, and contact administrator. Account information may include profile, payment, and close account options. Profile options may include contact information (an area to modify contact name and details) and employee user IDs and passwords (an area to add/delete users and edit passwords, and whether the employee is a manager). Payment options may include current system balance (includes next anticipated billing/payment date), pay it now (a feature for manually initiating payment in case of a debit balance), payment information (an area to modify payment type and details), tax ID number, and transaction history (which may include features such as show transaction summaries and export transaction data). The close account feature clears the balance and makes the account inactive, and may require approval from an administrator). A venue directory listing option that might be provided is the ability to modify the listing. Claims options may include open claims (itemized list of all open claims), cancel/refund claim (per system administration guidelines), history (e.g., last 120 days of redeemed claims), reopen claim (if accidentally redeemed), export data, and view and/or export summary statistics. Marketing options may include campaigns (itemized list of activities including associated schedule, details, and pricing information), modify (allows a service that has not been delivered to be modified or cancelled), delete/cancel, use as a template for new campaign, and for campaigns that are complete, view summary statistics. A contact administrator function may further be provided.

The system may be configured so that users with an employee ID will not be able to access the venue interface at all unless the venue operator indicates under preferences that they are a manager. If so, they may only be able to access the venue directory listing tab of the interface.

It is contemplated that the venue claims software is run in real time to process claims at the venue site. The software should therefore be running on a device capable of receiving incoming data about claims via the TCP/IP or messaging protocol at real or near real time. The venue claims software should require a userID (or employee ID) and password to be activated. The venue client software may include the following exemplary menus and features, grouped into preferences and claims functions. Preferences may include connection type/speed, batching (allows for completed claims to be batched and uploaded to the system asynchronously), and display claims default (sorted by time, present day's only and other options for the claim display; also whether/when closed claims should no longer be displayed). When the user selects an option to change claims functions, the application may load to this point and display open claims and the following exemplary claim functions as set in the display claims preference: search (string), sort (by time, by date, alphabetically, by number), redeem (indicates the product has been redeemed by the recipient), cancel/refund (according to system administrator presets), and reopen (if a claim has been accidentally closed).

Users with an employee ID should not be able to access the preferences tab in the client software unless they have been designated under preferences that they are a manager. In addition, only employees who have been designated as managers should be able to cancel/refund and reopen claims.

Exemplary venue information that may be required at registration includes user ID, owner password, employee IDs and passwords (gives employees access to the events calendar in the web interface and to the claims software), contact name and details, business name, billing address and payment details, including tax ID number, and venue listing information, including specific products and prices (listing information is available to other system users, as described hereinabove).

Venue Claims Terminal

In certain embodiments, the foregoing described venue interface functionality may be implemented using one or more specially-configured venue claims terminals located in a venue, through which all of the foregoing described venue functionality (in particular, purchase/claim notifications to the venue) may be directly implemented. It should be recognized that the venue claims terminal may be coupled to or integrated into an existing point-of-sale system using appropriate hardware and/or software.

In one embodiment, using the venue claims terminal begins with the user being presented an initial login/home screen showing two user-selectable buttons: begin claim processing and preferences. Clicking on begin claim processing should cause a disconnected modem terminal to begin its dialup cycling, while the venue administrator or employee logs in with his or her userID. The preferences button may be used by the venue administrator to change connection type and/or speed information (e.g., dialup/Ethernet), dialup numbers and backup numbers, and other processing options, e.g., whether employees need to type their user ID each time they process a transaction, and whether the terminal will accept RFID cards as credit cards.

In the claims processing mode, several buttons are presented to the user for selection. If employees need to supply their user ID per transaction, they should be prompted for this information immediately after selecting any of active buttons: claim, coupon, upload/download, credit, help, correct error, and logout. The claim button allows the employee to type in the claim code. If the claim is not in the terminal memory, this will initiate an automatic communication with the central system to find the record. After the claim has been brought up, the employee hits a redeem button to close the transaction and return to the claims processing home screen. The coupon button allows an employee to enter in a redeem at venue coupon number. After the coupon has been called up, the employee hits a redeem button to close the transaction and return to the claims processing home screen. When the upload/download button is selected and the claims terminal is in dialup mode, the terminal initiates an upload/download of new information with the core system (whereas this information may be updated in real time if the terminal is always connected to the system (e.g., via Ethernet). The "credit" button may be used to initiate a purchase where the RFID card is used as a credit card. The amount of the purchase will be keyed in and then the terminal will ask for the card to be held up to the reader. After checking with the central system, the screen will indicate whether or not the card has been accepted. The "help" button may provide phone numbers for support. The "correct error" button may allow the venue manager to review recently redeemed or closed transactions, either to visually review and correct an error or to reopen a transaction. The log out button exits processing mode and modem dialing.

As discussed hereinabove, if a short range RFID reader is provided with the venue claims terminal, a patron may, e.g., hand his or her RFID card (or other token) to a bartender, who waves the RFID card in front of the short range reader, and all claims associated with the user may be shown (or, if none are found, an automatic communication with the central system may be initiated). A venue might also provide its employees with RFID cards or other tokens that may be used to identify the employee, in addition to, or instead of the employee being prompted for login/password information.

Third-Party Marketers

Third-party marketers should be registered users in order to participate in marketing, advertising and data mining activities. As previously described, the administrator typically approves third-party marketers who wish to join the system, and sets the information they need to provide during the registration process. It is contemplated that third-party marketers should be able to access the system and their data only through a web interface, and after supplying a valid user ID and password. The third-party marketer interface may include the following exemplary menus and features: Account, marketing, and contact administrator. Account information functions may include profile information (e.g., contact information, with an area to modify the contact name and details), payment, and close account. Payment features may include current system balance (includes next anticipated billing/payment date), pay it now (a feature for manually initiating payment in case of a debit balance), payment information (an area to modify payment type and details), and transaction history (including show detailed summary and export data). The close account feature, which may require administrator approval, clears the balance and makes the account inactive. Marketing options may include campaigns (itemized list of activities including associated schedule, details, and pricing information), modify (allows a service that has not been delivered to be modified or cancelled), delete/cancel, use as a template for new campaigns, and for campaigns that are complete, view summary statistics. A contact administrator function may further be provided. Exemplary third-party marketer information that may be required at registration (as illustrated in the exemplary screen view 3500 of FIG. 35), includes: unique third-party ID (assigned by system and used as system identifier), user ID, password, contact name and details, business name, business address and details, including tax ID number, and payment type and details (typically an electronic fund transfer number).

Alternative Embodiments

It should be understood that, although most purchases made using a system consistent with the invention will involve the specification of a certain product, recipient, and physical location, it is contemplated that purchases may be made without specifying a product, recipient, or physical location. For example, instead of specifying a product, a purchaser might be able to specify a credit of a particular monetary amount that may be used at one or more venues, as an electronic gift certificate or a bar "tab". Alternatively, it is conceivable that a purchaser might use the system to buy a product or service for himself or herself, in which case there is no third-party recipient. In another scenario, instead of specifying a single physical location, the purchaser might be able to specify a plurality of possible physical locations, or a chain of establishments (e.g., of restaurants, pubs, or consumer electronics stores), whereby the recipient could go to any of the establishments in the chain to claim a product or service, rather than only a single physical location.

Further functionality may be provided to support emerging technologies, and in particular, wireless technologies. For example, it is anticipated that a system consistent with the invention might extend the functionality of claims to allow for claim notification to the recipient via the Multimedia Messaging channel (MMS or picture messaging). Specific functionality may include the ability for the purchaser to attach a live picture/video and short audio clip and/or short animated video or themed picture to the claim notification. It is also anticipated that a system consistent with the invention will support a "fat-client" (device-native) implementation of the system interface for end-users that provides them with functionality as full as that currently available through the web interface. The system may also support location-based (e.g., GPS or RFID) technologies that allow an end-user to pinpoint the location of a friend in order to ensure more precision in choosing a location. Also, a venue search feature may be provided wherein users can ask which venues are close to their current location based on a location-based reading taken. It is further contemplated that network-enabled terminals or other communications devices, e.g., touch-screen kiosks, may be operated in some venues or other physical locations to facilitate the use of a system consistent with the invention for certain users, e.g., individuals without their own personal PDA, wireless phone, or similar device.

It should be noted that, although the exemplary system described herein is adapted for the remote purchase of beverages, the purchase of all types of products other than beverages is contemplated. Further, the use of the term "products" herein is not meant to be interpreted as limiting the invention to products, and it should be noted that the present invention may easily be adapted for the remote purchase of services, as well as products. Also, the term "messaging address" should be interpreted broadly as including email addresses, telephone, pager, SMS, or MMS numbers (including telephone numbers at which a user might be contacted using a synthesized or recorded voice message), and all other identifiers that may be used to address an electronic communication to a user.

It will be appreciated by those skilled in the art that although the functional components of the exemplary embodiments of the system of the present invention described herein may be embodied as one or more distributed computer program processes, data structures, dictionaries and/or other stored data on one or more conventional general purpose computers (e.g., IBM®-compatible, Apple MACINTOSH®, and/or Reduced Instruction Set Computer (RISC) microprocessor-based computers), mainframes, minicomputers, conventional telecommunications (e.g., modem, Digital Subscriber Line (DSL), satellite and/or Integrated Services for Digital Network (ISDN) communications), memory storage means (e.g., Random Access Memory (RAM, Read Only Memory (ROM)) and storage devices (e.g., computer-readable memory, disk array, direct access storage) networked together by conventional network hardware and software (e.g., Local Area Network or Wide Area Network (LAN/WAN) network backbone systems and/or Internet), other types of computers and network resources may be used without departing from the present invention. One or more networks discussed herein may be a local area network, wide area network, internet, intranet, extranet, proprietary network, virtual private network, a TCP/IP-based network, a wireless network (e.g., IEEE® 802.11 or BLUETOOTH®), an e-mail based network of e-mail transmitters and receivers, a modem-based telephonic network, an interactive telephonic network accessible to users by telephone, or a combination of one or more of the foregoing.

The invention as described herein may be embodied in a computer residing on a network transaction server system, and input/output access to the invention may comprise appropriate hardware and software (e.g., personal and/or mainframe computers provisioned with INTERNET® wide area network communications hardware and software (e.g., Channel Quality Indicator (CQI)-based, File Transfer Protocol (FTP), Netscape NAVIGATOR® or Microsoft INTERNET EXPLORER® HTML Internet browser software, and/or direct real-time or near-real-time TCP/IP interfaces accessing real-time TCP/IP sockets) for permitting human users to send and receive data, or to allow unattended execution of various operations of the invention, in real-time and/or batch-type transactions. Likewise, the system of the present invention may be a remote Internet-based server accessible through conventional communications channels (e.g., conventional telecommunications, broadband communications, wireless communications) using conventional browser software (e.g., NETSCAPE NAVIGATOR® or Microsoft INTERNET EXPLORER®). Thus, the present invention may be appropriately adapted to include such communication functionality and Internet browsing ability. Additionally, those skilled in the art will recognize that the various components of the server system of the present invention may be remote from one another, and may further comprise appropriate communications hardware/software and/or LAN/WAN hardware and/or software to accomplish the functionality herein described.

Each of the functional components of the present invention may be embodied as one or more distributed computer program processes running on one or more conventional general purpose computers networked together by conventional networking hardware and software. Each of these functional components may be embodied by running distributed computer program processes (e.g., generated using "full-scale" relational database engines such as IBM DB2®, Microsoft SQL SERVER®, Sybase SQL Server, ORACLE® 7.3, or ORACLE® 8.0 database managers, and/or a JDBC interface to link to such databases) on networked computer systems (e.g., comprising mainframe and/or symmetrically or massively parallel computing systems such as the IBM SB2® or Hewlett-Packard HP 9000® computer systems) including appropriate mass storage, networking, and other hardware and software for permitting these functional components to achieve the stated function. These computer systems may be geographically distributed and connected together via appropriate wide- and local-area network hardware and software. In one embodiment, program data may be made accessible to the user via standard SQL queries for analysis and reporting purposes.

Primary elements of the invention may be server-based and may reside on hardware supporting an operating system such as Microsoft WINDOWS®, NT/2000, or UNIX®.

Clients may include mobile and non-mobile devices. Mobile devices that may be employed in the present invention include personal digital assistant (PDA) style computers, e.g., as manufactured by Palm, Inc., of Santa Clara, Calif., and other computers running the PALM® operating system, Microsoft WINDOWS CE® handheld computers, or other handheld computers (possibly including a wireless modem), as well as wireless or cellular telephones (including GSM phones, J2ME and WAP-enabled phones, Internet-enabled phones and data-capable smart phones, e.g., the iMODET™ phone available from NTT Docomo of Tokyo, Japan), one- and two-way paging and messaging devices, laptop computers, etc. Other telephonic network technologies that may be used as potential service channels in a system consistent with the invention include "2.5G" cellular network technologies such as GPRS and EDGE, as well as "3G" technologies such as CDMA1.times.RTT and WCDMA2000. Although mobile devices are preferred, traditionally non-mobile communications devices are also contemplated by the invention, including personal computers, INTERNET® appliances, set-top boxes, landline telephones, etc. Clients may also comprise a personal computer that supports Apple MACINTOSH®, Microsoft WINDOWS® variants, a UNIX® workstation platform, or other computer capable of TCP/IP or other network-based interaction. In one embodiment, no software other than a web browser may be required on the client platform.

Alternatively, the aforesaid functional components may be embodied by a plurality of separate computer processes (e.g., generated via Microsoft ACCESS® or other "flat file" type database management systems or products) running on IBM IBM-type, Intel PENTIUM® or RISC microprocessor-based personal computers networked together via conventional networking hardware and software and including such other additional conventional hardware and software as may be necessary to permit these functional components to achieve the stated functionalities. In this alternative configuration, since such personal computers typically may be unable to run full-scale relational database engines of the types presented above, a non-relational flat file "table" (not shown) may be included in at least one of the networked personal computers to represent at least portions of data stored by a system according to the present invention. These personal computers may run the UNIX®, or Microsoft WINDOWS® variants operating systems. The aforesaid functional components of a system according to the present invention may also comprise a combination of the above two configurations (e.g., by computer program processes running on a combination of personal computers, RISC systems, mainframes, symmetric or parallel computer systems, and/or other appropriate hardware and software, networked together via appropriate wide- and local-area network hardware and software).

A system according to the present invention may also be part of a larger computerized financial transaction system comprising multi-database or multi-computer systems or "warehouses" wherein other data types, processing systems (e.g., transaction, financial, administrative, statistical, data extracting and auditing, data transmission/reception, and/or accounting support and service systems), and/or storage methodologies may be used in conjunction with those of the present invention to achieve an overall information management, processing, storage, search, statistical and retrieval solution for a particular lock box service provider, e-payment warehouser, biller organization, financial institution, payment system, commercial bank, and/or for a cooperative or network of such systems.

In one embodiment, source code may be written in an object-oriented programming language using relational databases. Such an embodiment may include the use of programming languages such as C++ and toolsets such as Microsoft.NET® framework. Other programming languages that may be used in constructing a system according to the present invention include JAVA™, HTML, PERL®, UNIX® shell scripting, assembly language, Fortran, Pascal, and Basic. Those skilled in the art will recognize that the present invention may be implemented in hardware, software, or a combination of hardware and software.

A system consistent with the present invention may interact with established payment networks, e.g., the Automated Clearing House (ACH) to provide payment options such as ACH debits, credit or procurement card payments, and/or paper checks. Paper checks may be generated internally or by an external software module, wherein an output file in a format capable of being read by the external module may be generated. Payment by a payer system user using a credit or procurement card may also be effected, to be processed by Internet or other means. In this scenario, additional security levels may be included, e.g., for initiating credit card payments (along with a dollar amount limit) and approving credit card payments, and such appropriate credit card payment processing functionality as may be appropriate may be included, as well.

It should also be appreciated from the outset that one or more of the functional components may alternatively be constructed out of custom, dedicated electronic hardware and/or software, without departing from the present invention. Thus, the present invention is intended to cover all such alternatives, modifications, and equivalents as may be included within the spirit and broad scope of the invention.

What is claimed is:

1. A method, comprising:
    presenting, via a communications device, a menu listing at least one product or at least one service that does not necessitate supplying any content either appearing on the at least one product or being displayed while providing the at least one service;
    enabling, via the communications device, a selection of a product or a service selected from the menu;
    purchasing, via the communications device, the selection from a venue having a specific physical location in response to receiving location-based information configured to locate a recipient device in a vicinity of the venue; and
    generating a notification configured to notify the recipient device of a gift of the purchased selection available for claiming at the venue subsequent to the purchasing.

2. The method of claim 1, wherein the notification comprises an identifier configured to be provided at the venue to receive the purchased selection.

3. The method of claim 1, wherein the venue comprises any of a plurality of sites associated with a chain of establishments.

4. The method of claim 1, further comprising presenting, via the communications device, a plurality of selected products or services gifted to a same recipient.

5. The method of claim 1, wherein the recipient device comprises an RFID tag.

6. The method of claim 1, wherein the recipient device comprises a device operating according to an 802.11 standard or a location-enabled mobile telephone.

7. A system, comprising:
a server configured to communicate with a communications device via a network, wherein the server is configured to:
- present, via the communications device, at least one product or at least one service that:
  - is available for purchase in person when presented, and
  - does not necessitate supplying any content either appearing on the at least one product or being displayed while providing the service;
- receive, via the communications device, a selection from the at least one product or the at least one service;
- receive, via the communications device, an instruction to purchase the selection from the venue having a specific physical location in response to having received location-based information from a recipient device configured to locate the venue near the recipient device; and
- transmit a notification to the recipient device indicating the purchased selection is available for claiming at the venue.

8. The system of claim 7, wherein the notification comprises an identifier configured to be provided at the venue to receive the selection.

9. The system of claim 7, wherein the venue comprises a plurality of sites associated with a chain of establishments.

10. The system of claim 7, wherein the server is further configured to track gifts to a same recipient or to track selections from a same venue.

11. The system of claim 7, wherein the server is further configured to receive the location-based information from an RFID tag associated with the recipient device.

12. The system of claim 7, wherein the server is further configured to receive the location-based information from a device operating according to an 802.11 standard or a location-enabled mobile telephone.

13. A memory device having instructions stored thereon that, in response to execution by a processing device, cause the processing device to perform operations comprising:
- presenting, via a communications device, a menu listing at least one product or at least one service that does not necessitate supplying any content either appearing on the at least one product or being displayed while providing the at least one service;
- receiving, via the communications device, a selection of a product or a service selected from the menu;
- purchasing, via the communications device, the selection from a venue having a specific physical location in response to receiving location-based information configured to locate a recipient device in a vicinity of the venue; and
- generating a notification configured to notify the recipient device of a gift of the purchased selection available for claiming at the venue subsequent to the purchase.

14. The memory device of claim 13, wherein the notification comprises an identifier configured to be provided in person at the venue to receive the selection.

15. The method of claim 1, further comprising instantiating a claims record for the purchased selection, wherein the claims record is provided to the venue.

16. The system of claim 7, wherein the server is further configured to instantiate a claims record for the purchased selection, wherein the claims record is provided to the venue.

17. The memory device of claim 13, further storing instructions that cause the processing device to instantiate a claims record for the purchased selection, wherein the claims record is provided to the venue.

18. The method of claim 1, further comprising receiving, via the communications device, notification of a reciprocal gift from the recipient device purchased in response to receiving the notification of the gift of the purchased selection.

* * * * *